US012176668B2

(12) United States Patent
Sutter

(10) Patent No.: US 12,176,668 B2
(45) Date of Patent: Dec. 24, 2024

(54) LEVER CONNECTOR FOR ELECTRICAL CONDUCTORS

(71) Applicant: IDEAL Industries Inc, Sycamore, IL (US)

(72) Inventor: Robert W. Sutter, DeKalb, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 18/195,661

(22) Filed: May 10, 2023

(65) Prior Publication Data

US 2023/0420873 A1 Dec. 28, 2023

Related U.S. Application Data

(63) Continuation of application No. 17/964,738, filed on Oct. 12, 2022, now Pat. No. 11,695,224, which is a (Continued)

(51) Int. Cl.
*H01R 4/48* (2006.01)

(52) U.S. Cl.
CPC .......... *H01R 4/4821* (2023.08); *H01R 4/483* (2023.08); *H01R 4/485* (2023.08); *H01R 4/484* (2023.08)

(58) Field of Classification Search
None
See application file for complete search history.

(56) References Cited

U.S. PATENT DOCUMENTS 9,543,700 B2 1/2017 Köllmann et al.
9,825,402 B2 11/2017 Köllmann et al.
(Continued)

FOREIGN PATENT DOCUMENTS

DE 102014119420 B3 5/2016
DE 102018131757 A1 3/2020
(Continued)

OTHER PUBLICATIONS

Feb. 28, 2022—(EP) ESR—App. No. 21 20 0413.
Mar. 22, 2023—(WO) ISR & WO—PCT/US22/35148.

*Primary Examiner* — Ross N Gushi
(74) *Attorney, Agent, or Firm* — Greenberg Traurig, LLP

(57) ABSTRACT

A lever connector for contacting electrical conductors may include features and improvements over other lever connectors. The lever connector includes a housing, a busbar located within the housing, one or more lever mechanisms, and one or more resilient members that connect the lever mechanisms to the busbar. The lever mechanism includes a lever located on a near side of the busbar bridge and a lifting mechanism located on a far side of the busbar bridge opposite the near side of the busbar bridge. The resilient member includes a fixed section connected to the busbar bridge and a clamping section connected to the lifting mechanism. When the lever is actuated and lifted upwards and away from the housing, the lifting mechanism moves the clamping section of the resilient member to release away from the busbar base surface. When the lever is closed and pushed downward toward the housing, the lifting mechanism moves the clamping section of the resilient member downward to push the electrical conductor against the busbar base surface, thereby making electrical contact between the electrical conductor and the busbar.

13 Claims, 33 Drawing Sheets

Related U.S. Application Data continuation of application No. PCT/US2022/035148, filed on Jun. 27, 2022.

(56) References Cited

U.S. PATENT DOCUMENTS

| | | | | |
|---|---|---|---|---|
| 10,033,119 | B2 * | 7/2018 | Koellmann | H01R 13/506 |
| 10,418,727 | B1 | 9/2019 | Wu | |
| 10,505,295 | B2 | 12/2019 | Moser | |
| 11,043,759 | B2 | 6/2021 | Ober-Woerder | |
| 11,217,913 | B1 | 1/2022 | Wu | |
| 2013/0157520 | A1 | 6/2013 | Koellmann et al. | |
| 2015/0349437 | A1 | 12/2015 | Kollmann et al. | |
| 2016/0352028 | A1 | 12/2016 | Meyer | |
| 2022/0109271 | A1 | 4/2022 | Moser | |

FOREIGN PATENT DOCUMENTS

| | | | |
|---|---|---|---|
| DE | 202018106899 | U1 | 3/2020 |
| DE | 102018010359 | A1 | 4/2020 |
| DE | 202015009815 | U1 | 4/2020 |
| JP | 4798277 | B2 | 10/2011 |
| JP | 5102480 | B2 | 12/2012 |
| JP | 5958680 | B2 | 8/2016 |
| WO | 2021258043 | A1 | 12/2021 |

* cited by examiner

LEVER CONNECTOR FOR ELECTRICAL CONDUCTORS

CROSS-REFERENCE TO RELATED APPLICATION

This application is a continuation of U.S. patent application Ser. No. 17/964,738, filed Oct. 12, 2022, which is a continuation of a U.S. National Stage application under 35 U.S.C. § 371 of International Application PCT/US22/35148, filed Jun. 27, 2022 which are hereby incorporated by reference in their entirety.

TECHNICAL FIELD

Aspects described herein generally relate to electrical conductors. More specifically, aspects of this disclosure relate to lever connectors for electrical conductors and methods for assembling lever connectors for electrical conductors. One or more aspects of this disclosure describe lever connectors with improved lever opening forces, a lever connector that may be shipped with the levers open, and/or a lever connector that is smaller in size, such as height and/or width.

BACKGROUND

Lever connectors may be utilized for electrically connecting electrical wiring, such as with splicing wires. While other types of electrical connectors for wires and conductors exist, such as twist-on connectors, crimp connectors, and/or push-in connectors, lever connectors are generally known to provide various advantages over these other methods for connecting wires. Nevertheless, the current state of lever connectors has various shortcomings that are addressed by one or more embodiments disclosed herein.

SUMMARY

In a first aspect, a lever connector may be configured with a lever mechanism positioned to improve the lever connector. The lever connector may contact electrical conductors and/or electrical terminals. The lever connector may comprise: a housing, a busbar located within the housing, a lever mechanism, and a resilient member located within the housing. The housing may include an insulating material. The busbar may include a base surface and a busbar bridge extending away from the base surface. The lever mechanism may include a lever located on a near side of the busbar bridge and a lifting mechanism located on a far side of the busbar bridge opposite the near side of the busbar bridge and opposite a lever location. The resilient member may include a fixed section connected to the busbar bridge and a clamping section connected to the lifting mechanism. The lifting mechanism may be connected to the clamping section of the resilient member which is located on the far side of the busbar bridge opposite the near side of the busbar bridge. When the lever is actuated and lifted upwards and away from the housing, the lifting mechanism may move the clamping section of the resilient member to release away from the busbar base surface. When the lever is closed and pushed downward toward the housing, the lifting mechanism may move the clamping section of the resilient member downward to push the electrical conductor against the busbar base surface, thereby making electrical contact between the electrical conductor and the busbar.

In another aspect, a lever connector may be configured with a lever mechanism positioned to improve the lever connector. The lever connector may contact electrical conductors and/or electrical terminals. The lever connector may comprise a housing, a busbar located within the housing, a lever mechanism, and a resilient member. The housing may include an insulating material. The busbar may include a base surface and a busbar bridge extending away from the base surface. The lever mechanism may include a lever and a lifting mechanism. The lifting mechanism may slide parallel along the busbar bridge when the lever is actuated with the lifting mechanism guided along the busbar bridge by a back support surface of the lever mechanism. The lever mechanism may interface with a housing support surface on the housing that supports the lever mechanism when the lever is actuated and lifted upwards away from the housing. The resilient member may include a fixed section connected to the busbar bridge and a clamping section connected to the lifting mechanism. When the lever is actuated and lifted upwards and away from the housing, the lifting mechanism may slide upward along the busbar bridge moving the clamping section of the resilient member to release away from the busbar base surface. When the lever is closed and pushed downward toward the housing, the lifting mechanism may move the clamping section of the resilient member downward to push the electrical conductor against the busbar base surface, thereby making electrical contact between the electrical conductor and the busbar.

With another aspect, a method for assembling a lever connector configured for contacting electrical conductors and/or electrical terminals the method may comprise: sliding a clamping section of a resilient member into a top end of a busbar bridge; hooking a fixed section of the resilient member through a gap in the busbar bridge; lifting the clamping section of the resilient member up and sliding a lifting mechanism of a lever mechanism under the clamping section of the resilient member; placing a subassembly unit comprising the resilient member, the busbar, and the lever mechanism in a first housing section; lifting the levers of the lever mechanism; inserting a cover portion of the housing to the first housing section; and fastening the first housing section to the cover portion of the housing by one of the following: welding, snapping, heat staking, gluing, or some other fastening method.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

DETAILED DESCRIPTION

In the following description of various examples of a lever connector for contacting electrical conductor terminals and components according to the present technology, reference is made to the accompanying drawings, which form a part hereof, and in which are shown by way of illustration various example structures and environments in which aspects of this technology may be practiced. It is to be understood that other structures and environments may be utilized and that structural and functional modifications may be made to the specifically described structures, functions, and methods without departing from the scope of the present disclosure.

According to an aspect of the embodiments, a lever connector for contacting electrical conductor terminals may include features and improvements over other lever connectors. For example, the features of the lever connector may include improved lever opening forces. In another example, the features of the lever connector may include a lever connector that may be shipped with the levers in the open configuration when that is desired by OEMs. Additionally, in another example, the features of the lever connector may allow for the lever connector to be smaller and/or shorter in height.

Figure 1:
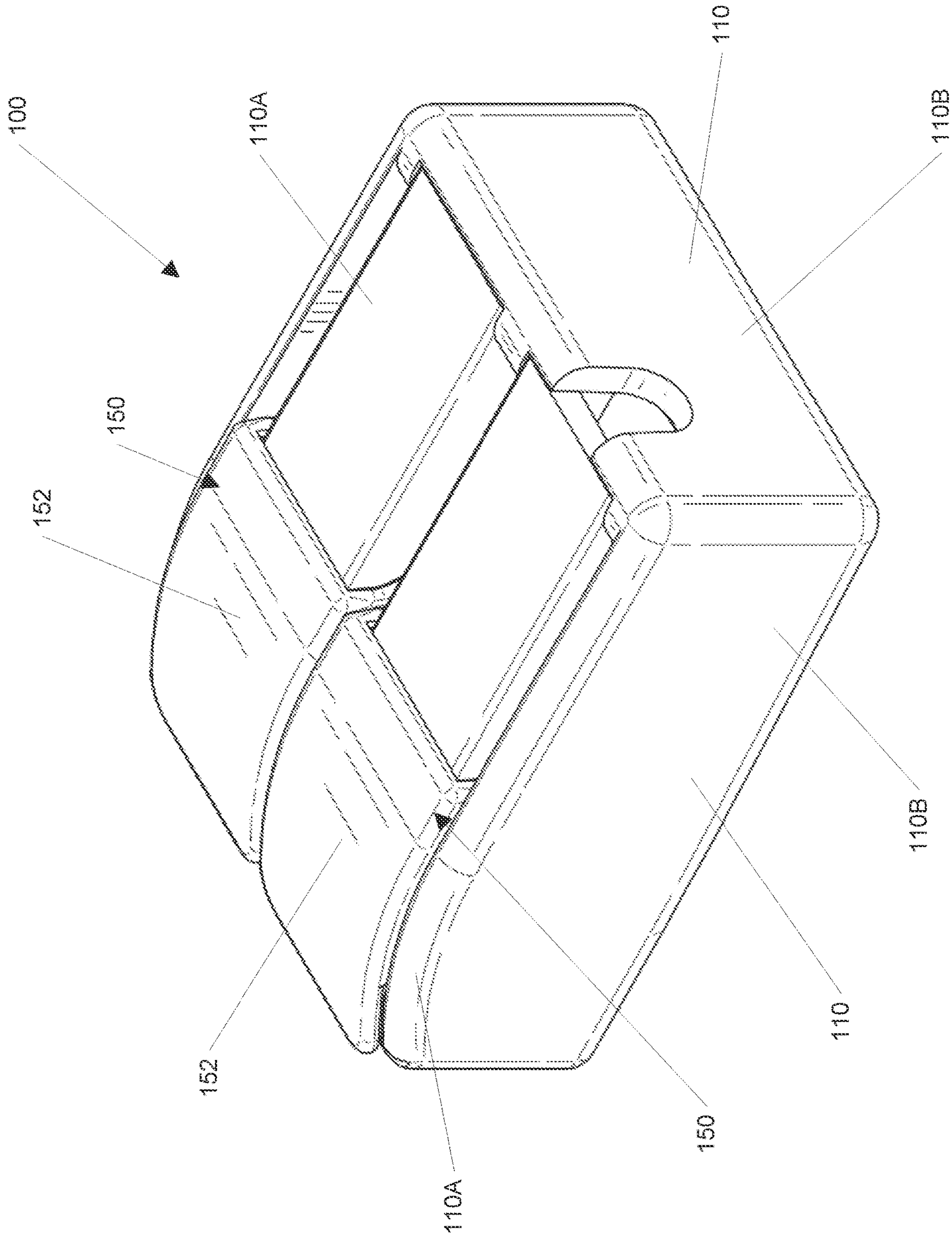
FIG. 1 shows a perspective view of a lever connector in accordance with an embodiment.

FIG. 1 shows an exemplary lever connector 100 configured for contacting electrical conductors and/or electrical terminals. The lever connector 100 may be utilized for various electrical connection applications. Types of electrical connectors for wires and conductors may include lever connectors, twist-on connectors, crimp-on connectors, and/or push-in connectors. Lever connectors 100 are generally known to provide various advantages over these other methods for connecting wires. For example, lever connectors 100 may provide a beneficial and advantageous connection method for higher gauge and/or smaller diameter wires. Additionally, lever connectors 100 may provide a connection mechanism for applications when the electrical wires are removed from the connection mechanism. The lever connector 100 may be utilized for the splicing of any electrical wiring, such as for example 10 to 20 gauge (AWG) wires (or equivalent sizes in $mm^2$) and other size wires without departing from the invention.

Figure 2A:
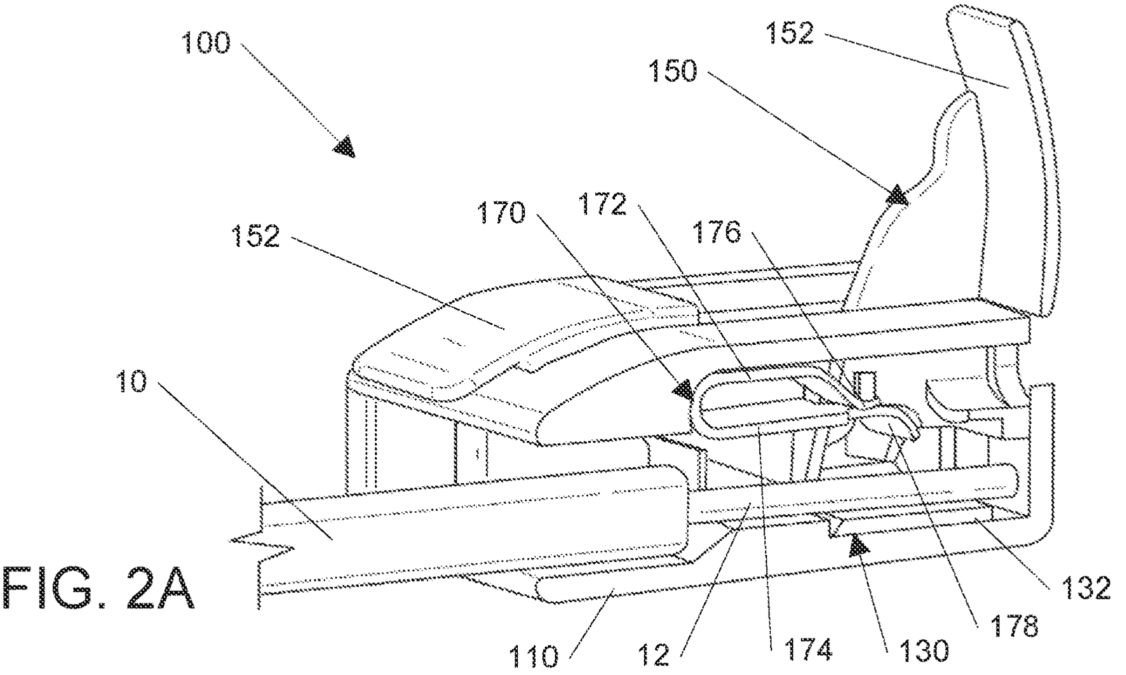
FIGS. 2A-2C show various views of an exemplary lever connector from FIG. 1 with a wire inserted into the lever connector in accordance with an embodiment.
Figure 2B:
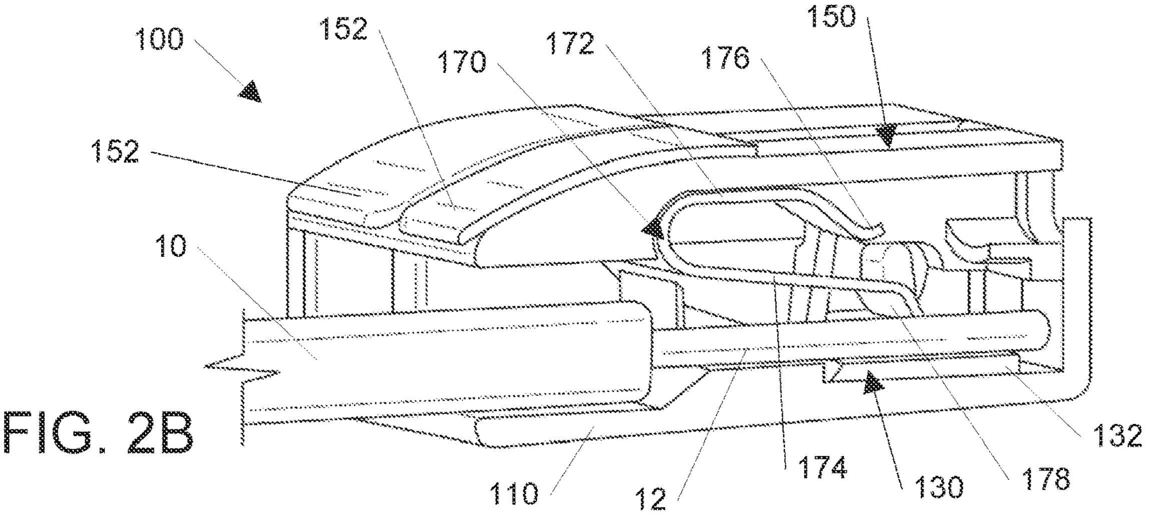
Figure 2C:
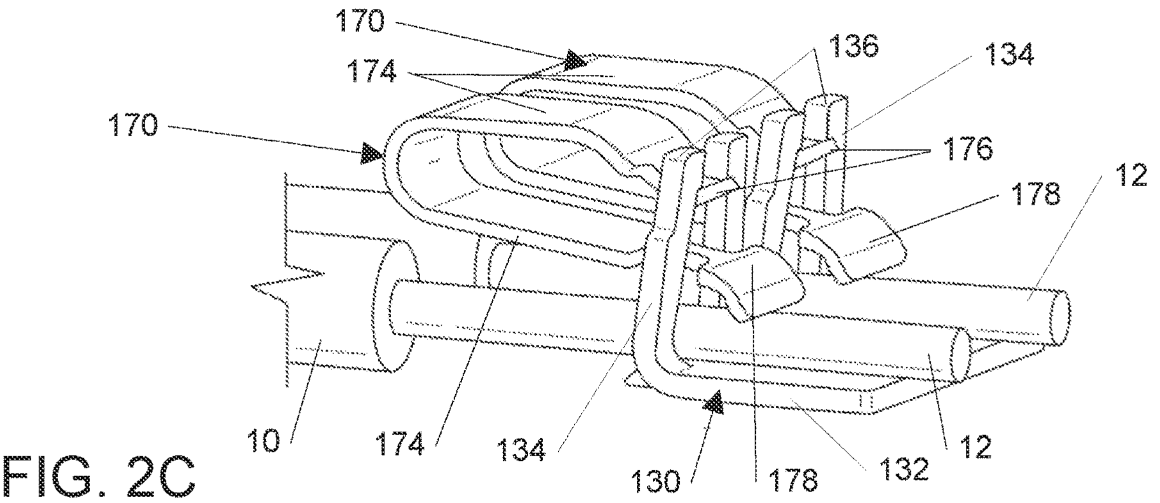

FIGS. 2A-2C illustrate how an exemplary lever connector 100 may operate and work. As illustrated in FIG. 2A, the lever connector 100 may be utilized with a lever 152 to allow for a wire 10 that includes an exposed conductor 12 to be inserted into the lever connector 100. The conductor 12 may be a copper conductor or other type conductor without departing from this invention. As illustrated in FIG. 2B, the lever 152 may be flipped and/or pressed downward. Flipping the lever 152 in the closed position with the wire 10 in it allows for a resilient member or spring 170 to push the wire 10 firmly against a base surface 132 of a busbar 130. When the resilient member 170 pushes the conductor 12 of the wire 10 against the base surface 132 of the busbar 130, the conductor 12 of the wire 10 makes electrical contact with the busbar 130. Additionally, the resilient member 170 may also "bite" and capture the conductor 12 of the wire 10 to hold the wire 10 in the lever connector 100. FIG. 2C illustrates two conductors 12 of two wires 10 in contact with each other through the busbar 130 (with the housing and levers hidden). When the procedure described with respect to FIG. 2B is repeated with additional wires in other ports of the lever connector 100, the conductors 12 of the wires 10 all make electrical contact with the busbar 130, and therefore with each other because the current is carried by the busbar 130. The plurality of resilient members 170 in FIG. 2C are shown as not connected to each other and without any traverse connecting piece. It should be noted that the resilient members 170 can be connected to each other without departing from the spirit of the invention.

Figure 3A:
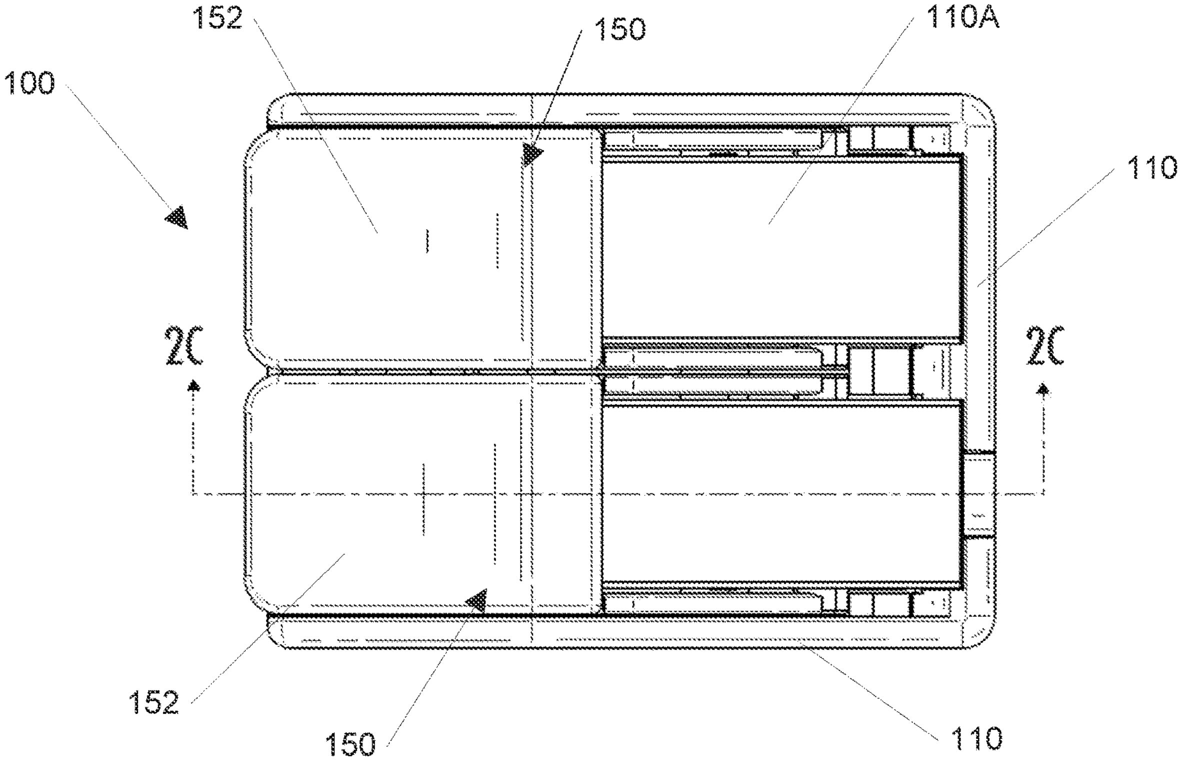
FIGS. 3A-3C show various views of the lever connector from FIG. 1 in accordance with an embodiment.
Figure 3B:
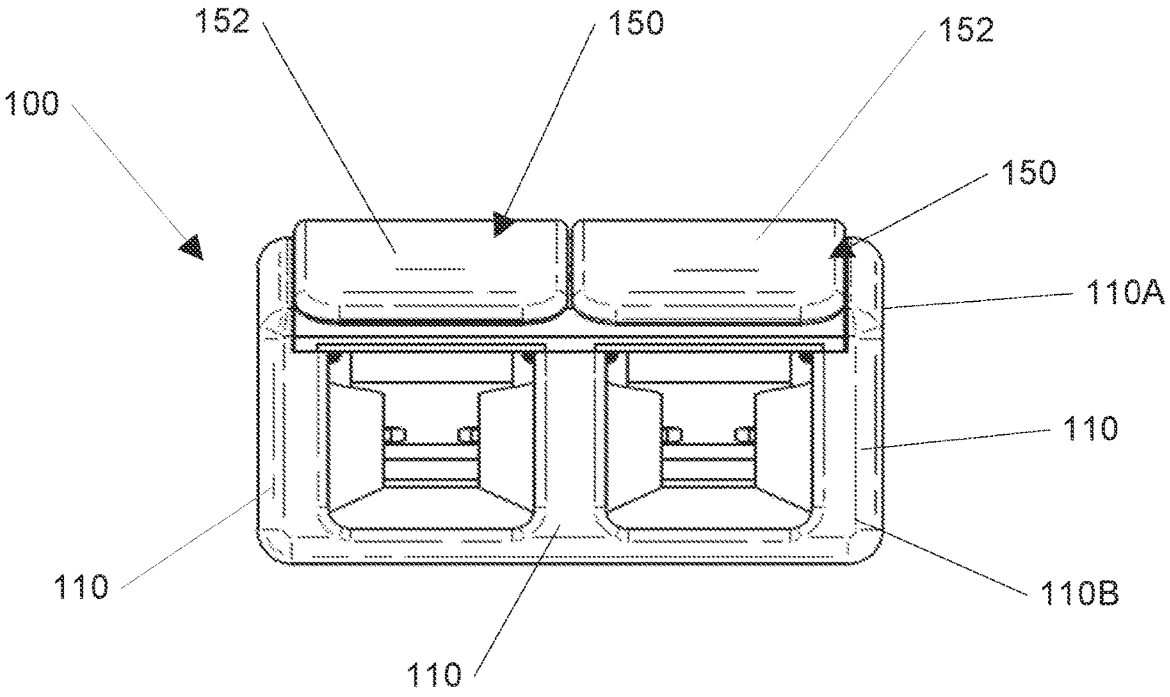
Figure 3C:
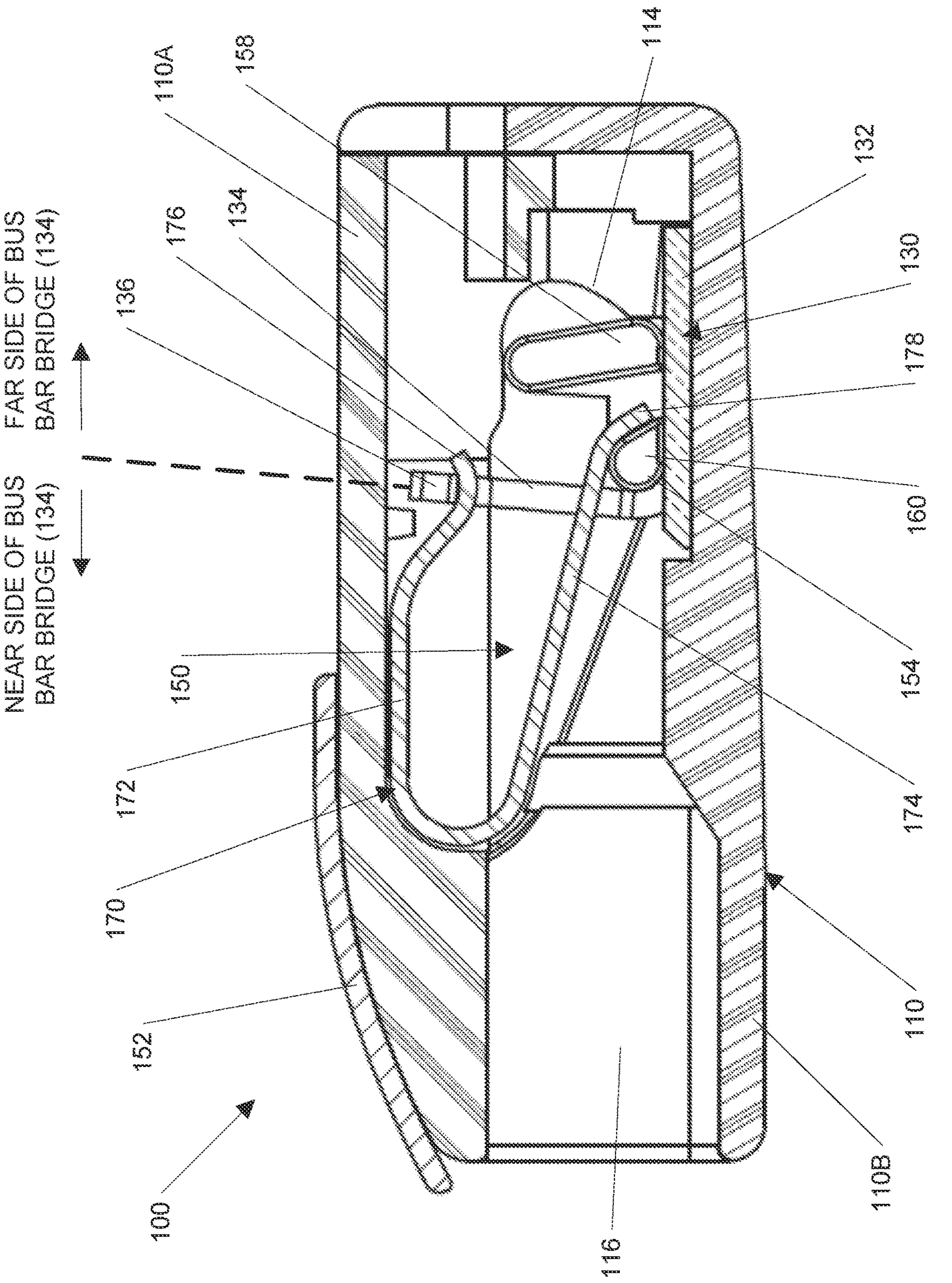

The lever connector 100 may assume different types of devices and configurations including, but not limited to, 2-port connectors, 3-port connectors, 5-port connectors, etc. FIGS. 3A-3C illustrate various other views of the lever connector 100 from FIG. 1. The lever connector 100 from FIGS. 1 and 3A-3C may be a side-by-side lever connector, with two or more different ports next to and/or adjacent to each other.

Figure 6A:
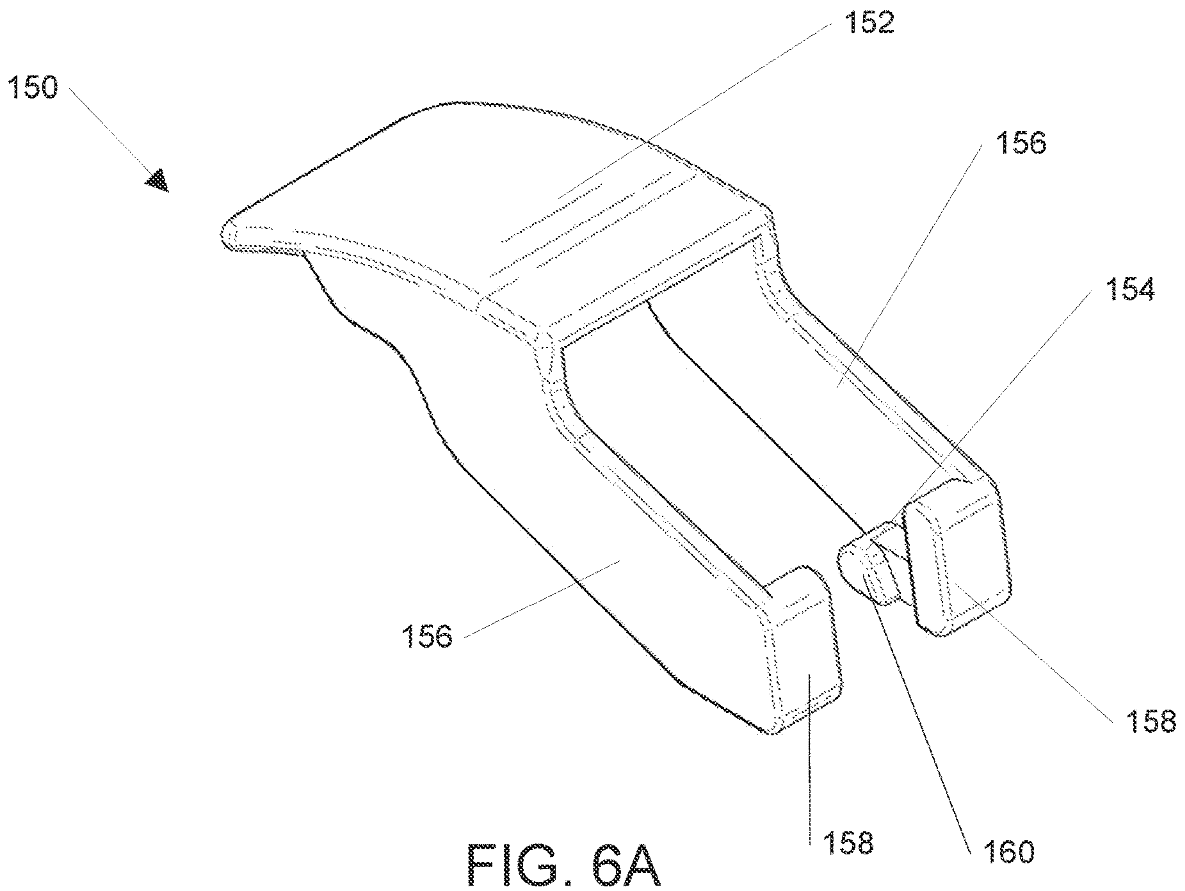
FIGS. 6A and 6B show various views of a lifting mechanism from the lever connector from FIG. 1 in accordance with an embodiment.
Figure 6B:
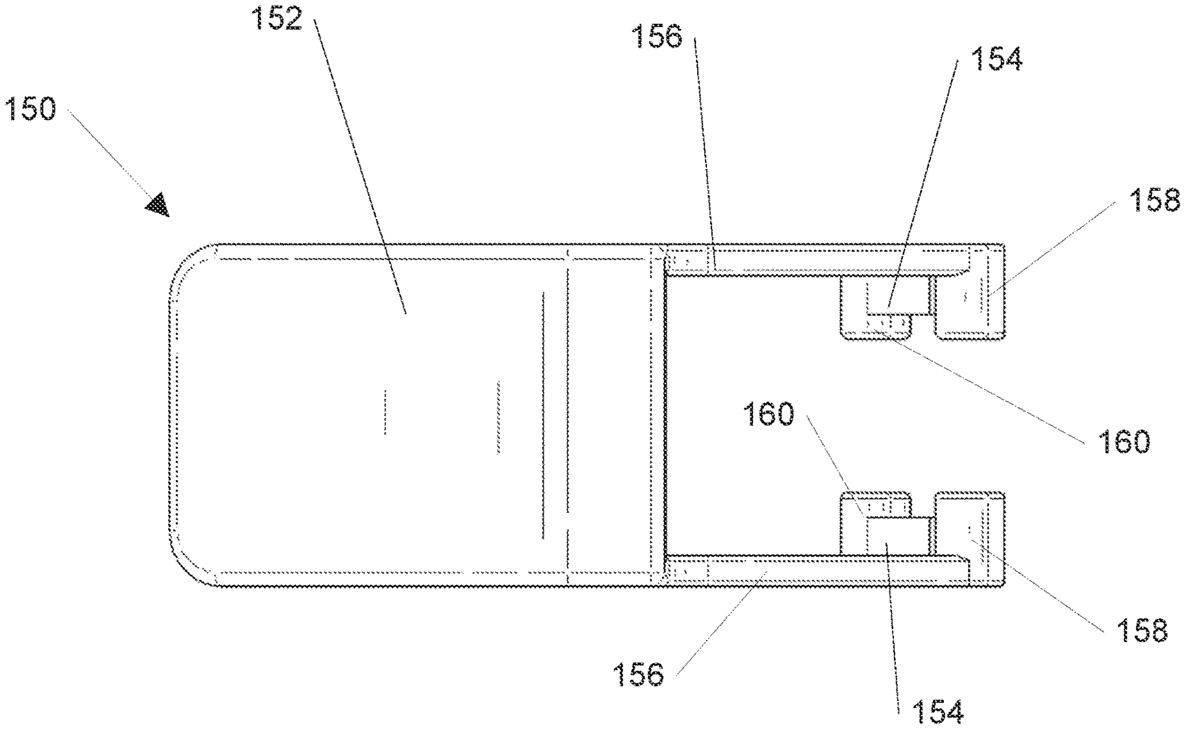
Figure 7A:
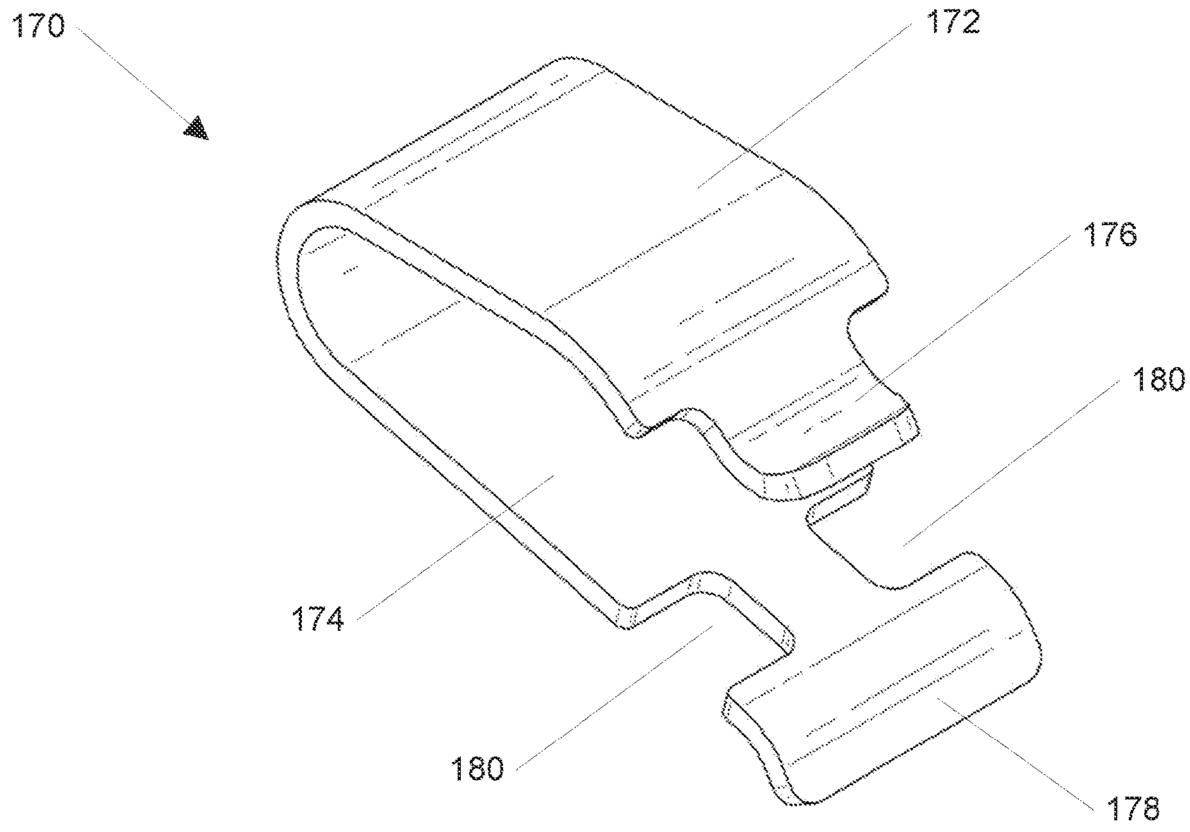
FIGS. 7A and 7B show various views of a resilient member from the lever connector from FIG. 1 in accordance with an embodiment.
Figure 7B:
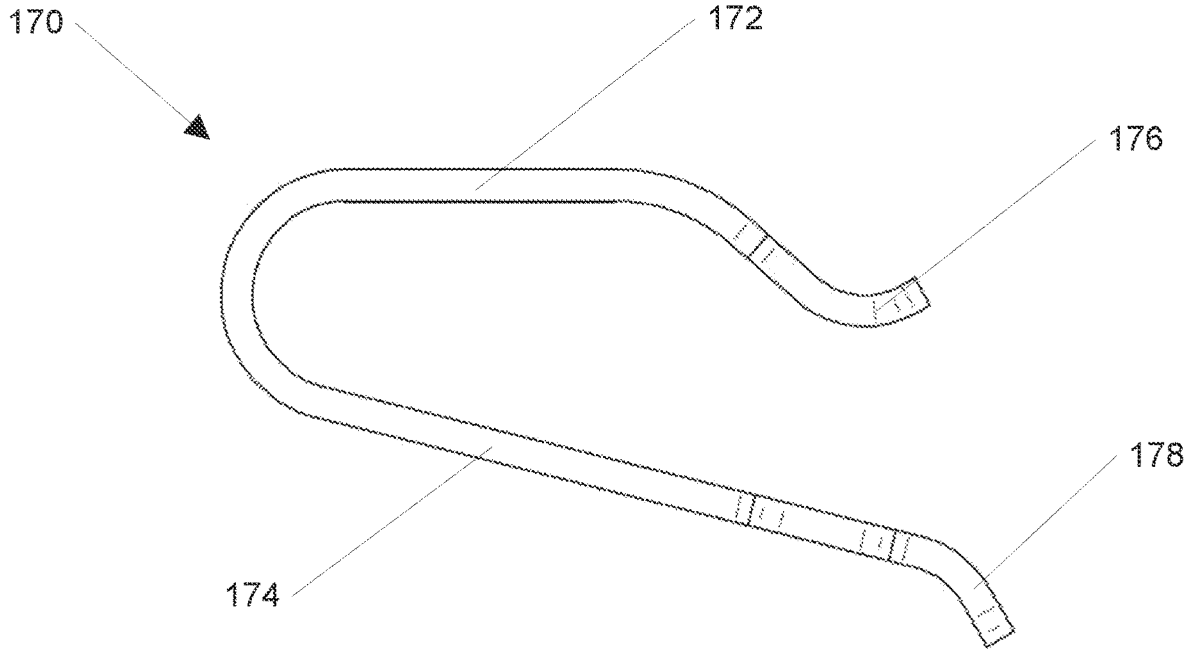
Figure 8A:
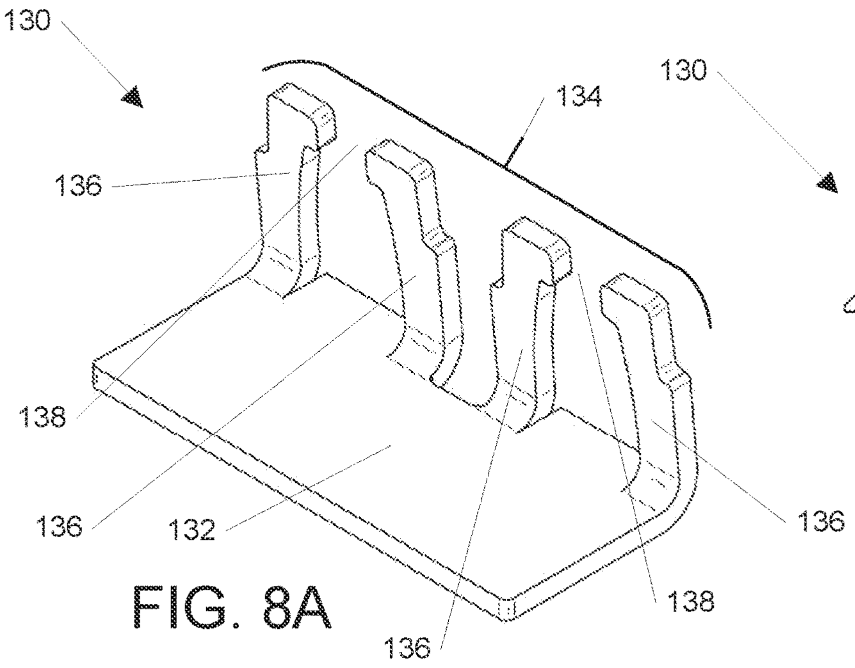
FIGS. 8A-8D show various views of a busbar from the lever connector from FIG. 1 in accordance with an embodiment.
Figure 8B:
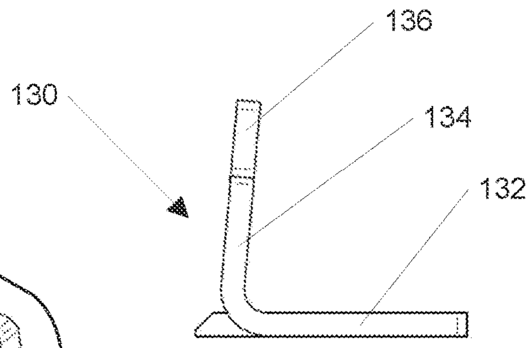
Figure 8C:
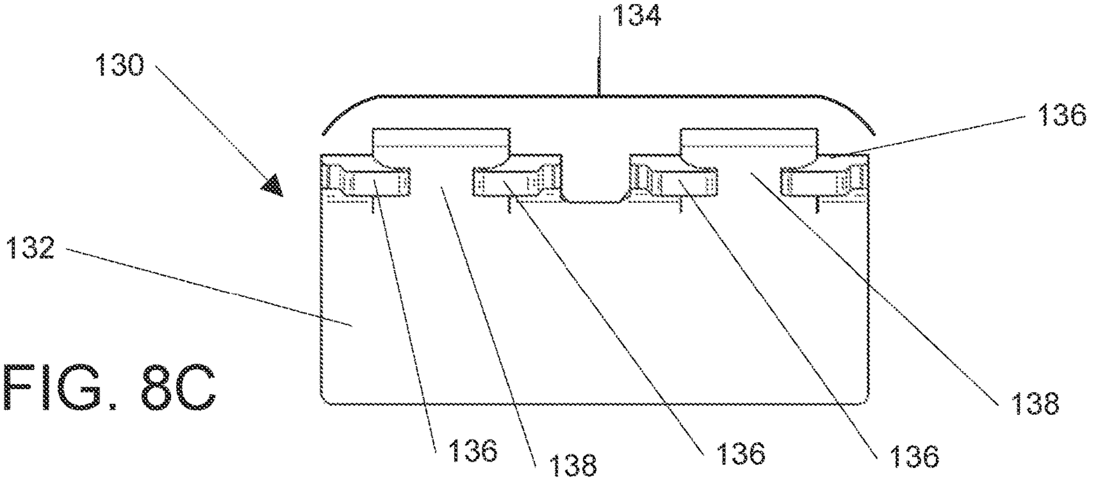
Figure 8D:
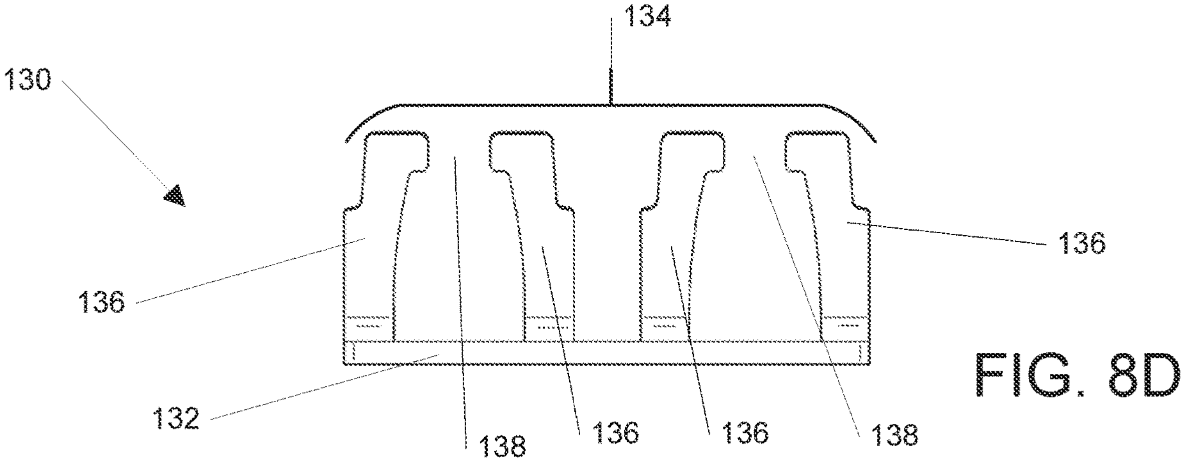

As illustrated in FIGS. 1 and 3A-3C, the lever connector 100 may include various components. For example, the lever connector 100 may include a housing 110, a busbar 130 located within the housing 110, one or more lever mechanisms 150, and one or more resilient members 170 located within the housing 110 that connect the lever mechanisms 150 to the busbar 130. FIGS. 4A-4C, 5A-5B, 6A-6B, 7A-7B, and 8A-8D illustrate various views of these components of the lever connector 100. Specifically, FIGS. 4A-4C and 5A-5B show various views of the housing 110 from the lever connector 100. FIGS. 6A and 6B show various views of the lever mechanism 150 from the lever connector 100. FIGS. 7A and 7B show various views of the resilient member 170 from the lever connector 100. FIGS. 8A-8D show various views of the busbar 130 from the lever connector 100.

FIG. 3C illustrates a cross-sectional view of the lever connector 100 from FIG. 3A. FIG. 3C illustrates many of the various components within the lever connector 100. As illustrated, the lever connector 100 includes a housing 110. The housing 110 may be made of an insulating material to insulate the electrical connections within the housing 110 and the lever connector 100. The housing 110 may include various components. The housing 110 may include various housing sections, such as a top housing section 110A and a bottom housing section 110B. There may be multiple housing sections as part of the housing 110 without departing from this invention. The housing 110 may include lateral side housing sections, top and bottom housing sections, or other various types of housing sections. The housing sections 110A, 110B may be mechanically connected together by various methods known and used in the art, such as snapping, welding, fastening, gluing, etc. In another embodiment, the housing sections 110A, 110B may be welded together. The housing 110 may also include one or more conductor openings 116 where the electrical wires 10 can be placed to electrically connect the electrical wires 10. The housing 110 may also include a housing support surface 114. The housing support surface 114 may interface with a portion of the lever mechanism 150. As will be explained in more detail below, the housing support surface 114 may help guide the lever mechanism 150 along the busbar 130 to ensure that the lever mechanism 150 follows a path along the busbar 130 when a lever 152 on the lever mechanism 150 is actuated.

The busbar 130 may be located within the housing 110. The busbar 130 may include a base surface 132 and one or more busbar bridges 134 extending away from the base surface 132. Additionally, the busbar bridge 134 may include one or more arms 136 extending away from the base surface 132. The busbar 130 may be made from a highly conductive material to carry the current between the conductors 12 of the wires 10. For example, the busbar 130 may be made from copper.

A lever mechanism 150 may also be located at least partially within the housing 110. The lever mechanism 150 may include a lever 152 and a lifting mechanism 154. The lever 152 may lay flat on a top portion of the housing 110 when the lever mechanism 150 is in a closed configuration. The lever 152 may be actuated and lifted upwards and away from the housing 110 to move the lever connector 100 and lever mechanism 150 to an open configuration. As illustrated in FIG. 3C, the lever 152 may be located on a near side of the busbar bridge 134 and the lifting mechanism 154 may be located on a far side of the busbar bridge 134 on an opposite side of the busbar bridge 134.

A resilient member 170 may also be located within the housing 110. The resilient member 170 may be a spring, such as a leaf spring. The resilient member 170 may be other resilient structures without departing from the invention. The resilient member 170 may include a fixed section 172 and a clamping section 174. The fixed section 172 may be connected to the busbar bridge 134 via a curved tab 176 of the resilient member 170. The clamping section 174 may be connected to the lifting mechanism 154 of the lever mechanism 150 via a second end 178 of the resilient member 170. The lifting mechanism 154 connected to the clamping section 174 of the resilient member 170 may be located on the far side of the busbar bridge 134 opposite the near side of the busbar bridge 134. When the lever 152 is actuated and lifted upwards and away from the housing 110, the lifting mechanism 154 may move the clamping section 174 of the resilient member 170 to release away from the busbar base surface 132. When the lever 152 is closed and pushed downward, the clamping section 174 of the resilient member 170 moves downward to push the conductor 12 of the wire 10 firmly against the busbar 130, thereby making electrical contact between the conductor 12 of the wire 10 and the busbar 130.

The resilient members 170 or springs may be made from a high strength material, which allows the resilient members 170 to bend a large amount without permanently deforming. The spring material may also be harder than the copper conductor 12 in the wires 10, which will allow the resilient member 170 and the second end 178 of the resilient member 170 to "bite" into the copper conductor 12 of the wire 10. The spring material may not be excellent at conducting current.

Figure 4A:
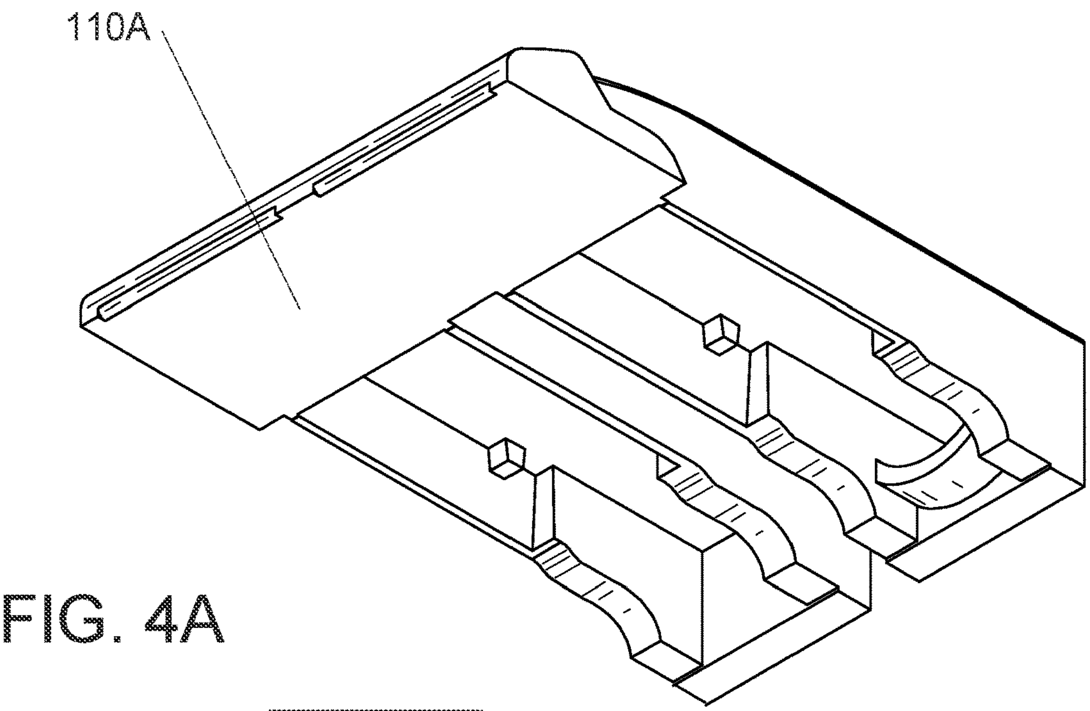
FIGS. 4A-4C and 5A-5B show various views of a housing from the lever connector from FIG. 1 in accordance with an embodiment.
Figure 4B:
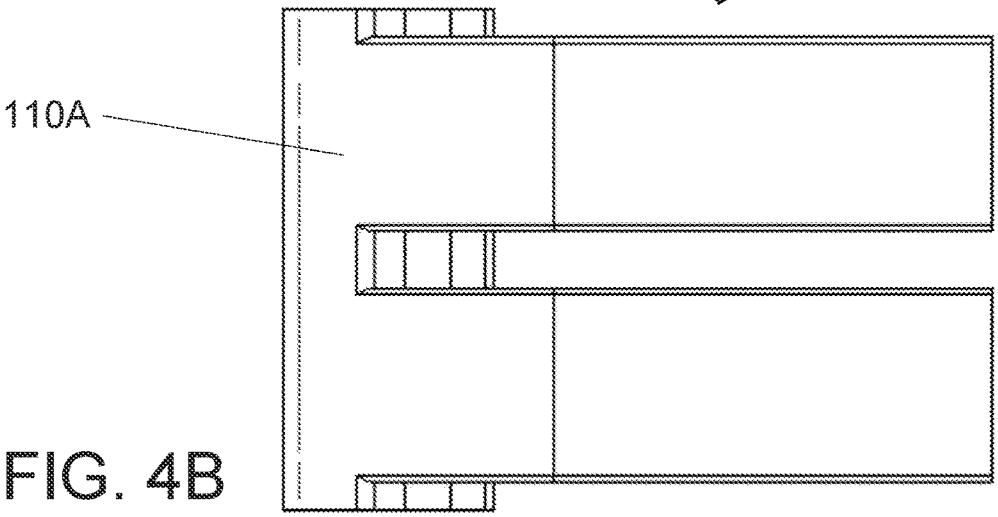
Figure 4C:
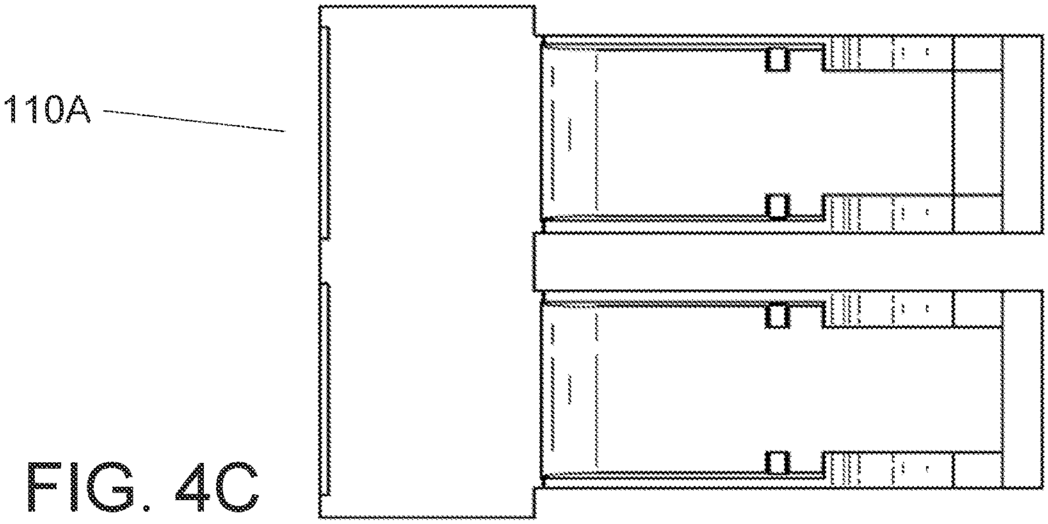
Figure 5A:
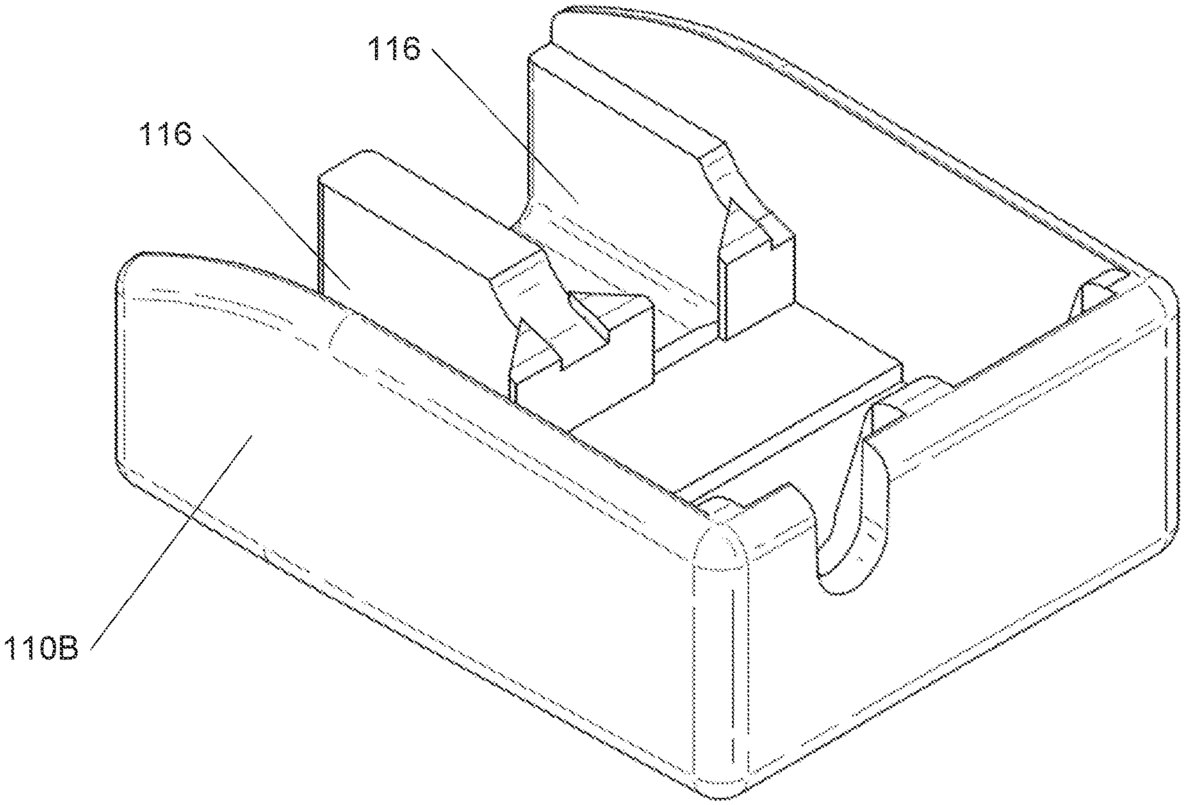
Figure 5B:
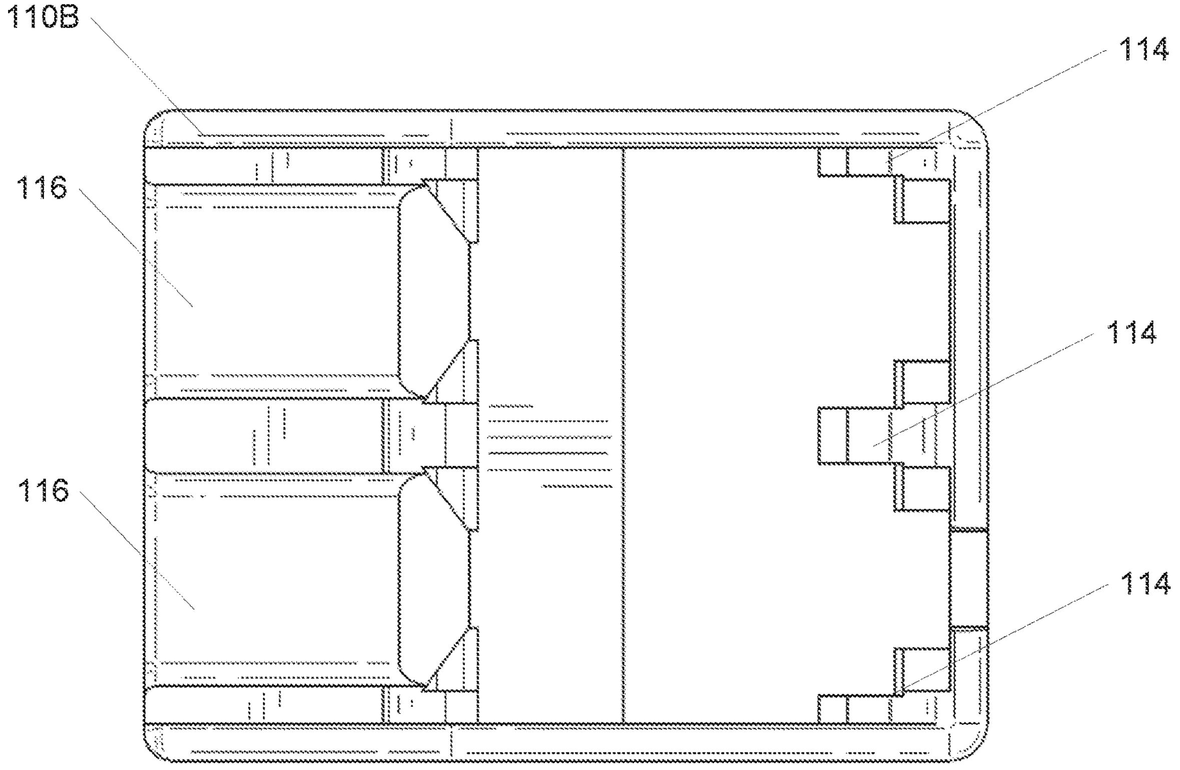

Referring to FIGS. 4A-4C and 5A-5B, the lever connector 100 may include a housing 110 to hold the components of the lever connector 100. The housing 110 may be made from various insulating materials known and used in the art. As illustrated in FIGS. 4A-4C, the housing 110 may include a top portion 110A or a cover. As illustrated in FIGS. 5A and 5B, the housing 110 may include a bottom portion 110B. The housing 110 may include a conductor opening 116 where the electrical wires can be placed to electrically connect the electrical wires. The housing 110 may also include one or more housing support surfaces 114. The housing support surface 114 may interface with a portion of the lever mechanism 150, such as with the back support surface 158, thereby guiding the lifting mechanism 154 to ensure the lifting mechanism 154 follows a path along the far side of the busbar bridge 134.

Referring to FIGS. 6A and 6B, the lever connector 100 may include a lever mechanism 150. The lever mechanism 150 may include a lever 152 that may be actuated and pushed downward and towards the housing 110 to make the electrical connection for the lever connector 100. The lever mechanism 150 may also include one or more spring lifting lever arm sections 156. The spring lifting lever arm sections 156 may extend away from the lever 152 and into the housing 110. At the end of the spring lifting lever arm sections 156, the lever mechanism includes a lifting mechanism 154. As explained above, the lifting mechanism 154 connects to the clamping section 174 of the resilient member 170. Lastly, the lever mechanism 150 and the lifting mechanism 154 may include a back support surface 158. The back support surface 158 may rest against and abut to the housing support surface 114 in the housing 110 to support the lever mechanism 150 and to help ensure the lifting mechanism 154 follows a path along the far side of the busbar bridge 134.

In addition, in some embodiments, the lever mechanism 150 may be constructed from a strong material so that the actuating element can be positioned to be on only one side of the resilient member 170 (e.g., spring). At least one benefit of such positioning is that it may allow for the lever connector to be smaller/shorter in dimension. For example, when an actuating section of the lever mechanism 150 is on more than one side of the spring (e.g., above, under, left, and/or right), this may cause the lever connector 100 to likely grow in dimension. A smaller/shorter dimension lever connector 100 is desirable for numerous reasons, including but not limited to being able to fit in smaller spaces and being able to fit a plurality of lever connectors into a space.

Referring to FIGS. 7A and 7B, the lever connector 100 may include a resilient member 170. As described above, the resilient member 170 may be a spring, such as a flat spring or a leaf spring. The resilient member 170 may be one or more strips, bars, or sections of metal (or other resilient materials), or assemblies of such, that are formed to produce a repeatable counterforce when compressed or displaced and used for positioning or contacting. The resilient member 170 may provide a repeatable counterforce to control motion or load by making contact and applying force. The resilient member 170 may be various sizes, type, materials, as well as mounting types, or shapes. The resilient member 170 may include a fixed section 172 and a clamping section 174. The fixed section 172 may include a curved tab 176 that connects to the arms 136 of the busbar bridge 134. The clamping section 174 may include a curved end 178 that connects to the lifting mechanism 154. As illustrated in FIG. 7A, the clamping section 174 may also include a pair of gaps 180 located between clamping section 174 and the curved end 178. The gaps 180 may be sized and shaped to pass through the busbar bridge 134. The clamping section 174 and the curved end 178 may be configured to bite and hold a conductor 12 of a wire against a base surface 132 of a busbar 130.

Referring to FIGS. 8A-8D, the lever connector 100 may include a busbar 130. The busbar 130 may include a base surface 132. The base surface 132 may lay flat within the housing 110. The base surface 132 may include one or more busbar bridges 134 that extend away from the base surface 132. The busbar bridge 134 may extend perpendicular or approximately perpendicular from the base surface 132. As illustrated in FIGS. 8A-8D, the busbar 130 includes two busbar bridges 134 both located on one side of the base surface 132 with both busbar bridges 134 extending away from the base surface 132 in the same direction. The busbar bridge 134 may include one or more arms 136 separated by a gap 138. The curved tab 176 of the fixed section 172 of the resilient member 170 may hook on the one or more arms 136. The gap 138 may be sized such that a narrow portion of the clamping section 174 of the resilient member 170 may pass through the gap 138.

FIGS. 9A-9D and 10A-10D illustrate various views of a second embodiment of a lever connector 200 configured for contacting electrical conductors and/or electrical terminals. Specifically, FIGS. 9A-9D show the lever connector 200 in the open configuration and FIGS. 10A-10D show lever connector 200 in the closed configuration. The lever connector 200 from FIGS. 9A-9D and 10A-10D may be a double-sided staggered lever connector, with one lever mechanism 250 each on opposing sides of a busbar 230.

Figure 12A:
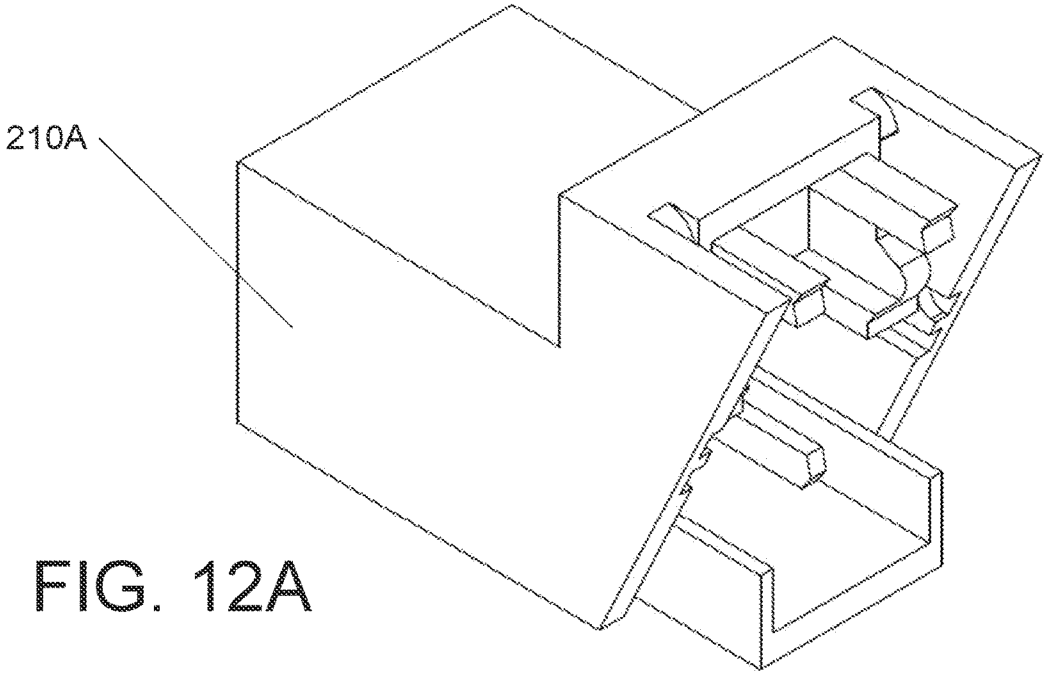
FIGS. 12A-12C show various views of a first housing section from the lever connector from FIGS. 9A-9D and 10A-10D in accordance with an embodiment.
Figure 12B:
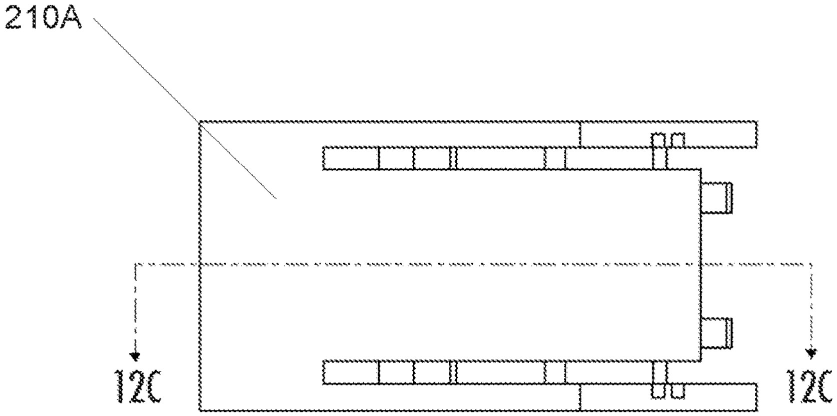
Figure 12C:
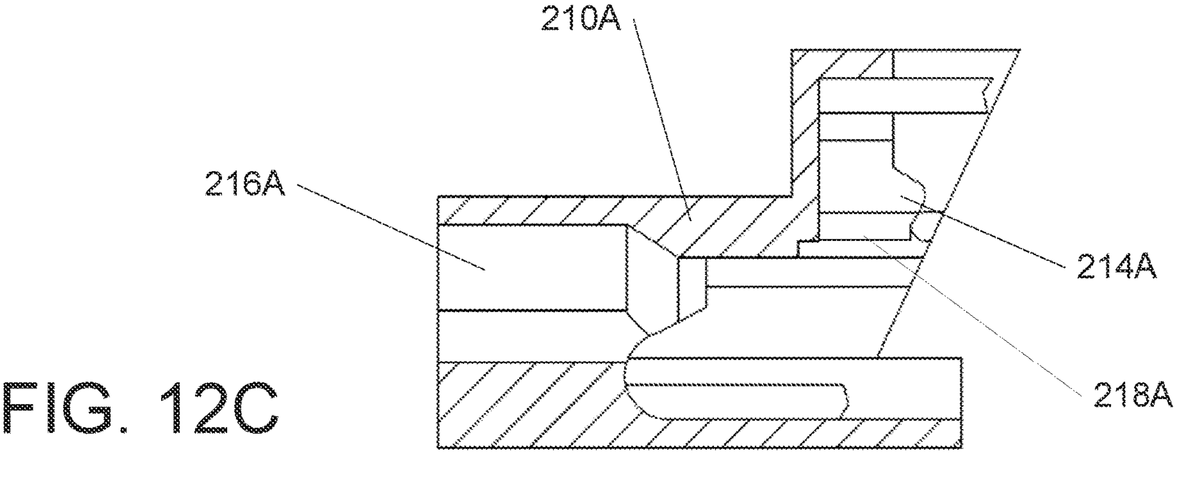
Figure 12D:
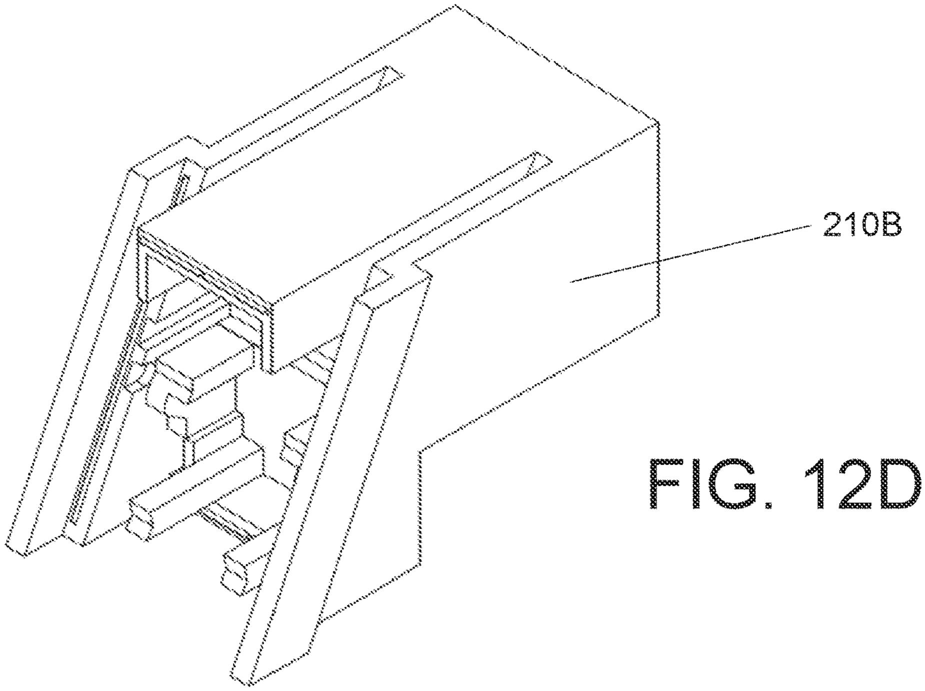
FIGS. 12D-12F show various views of a second housing section from the lever connector from FIGS. 9A-9D and 10A-10D in accordance with an embodiment.
Figure 12E:
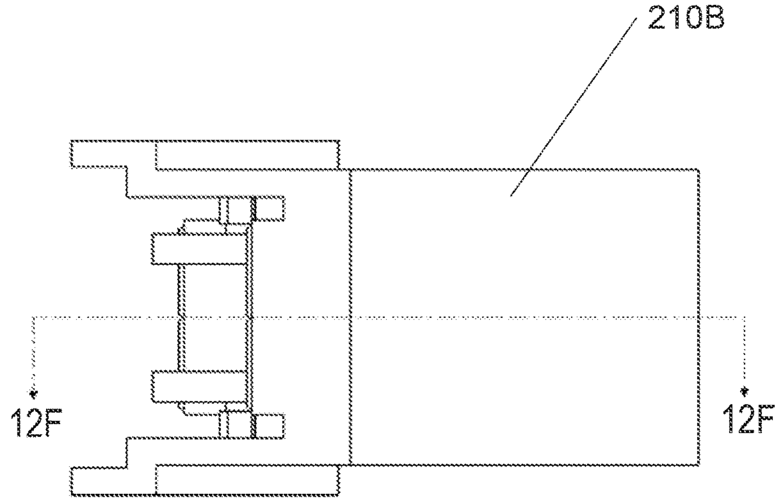
Figure 12F:
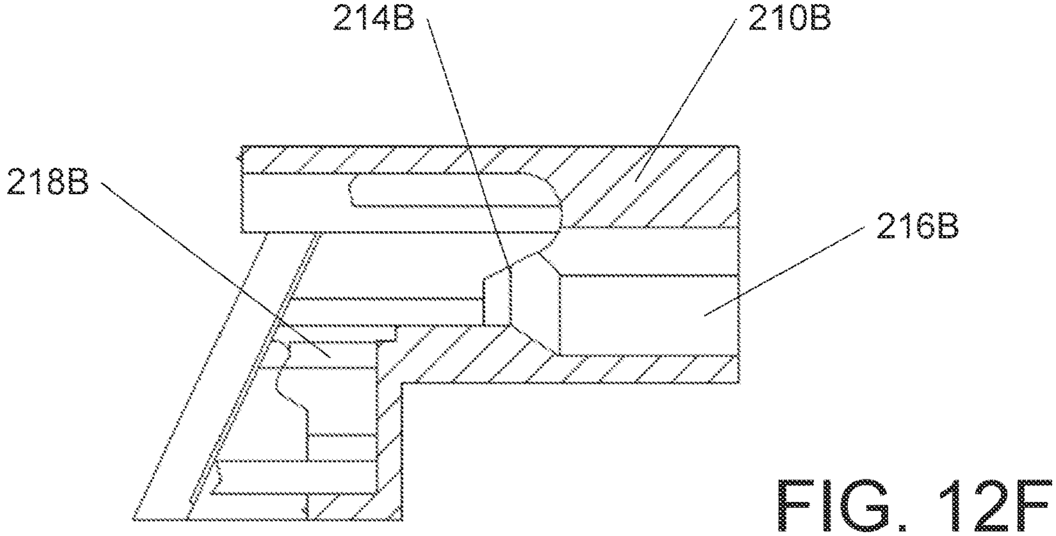
Figure 13:
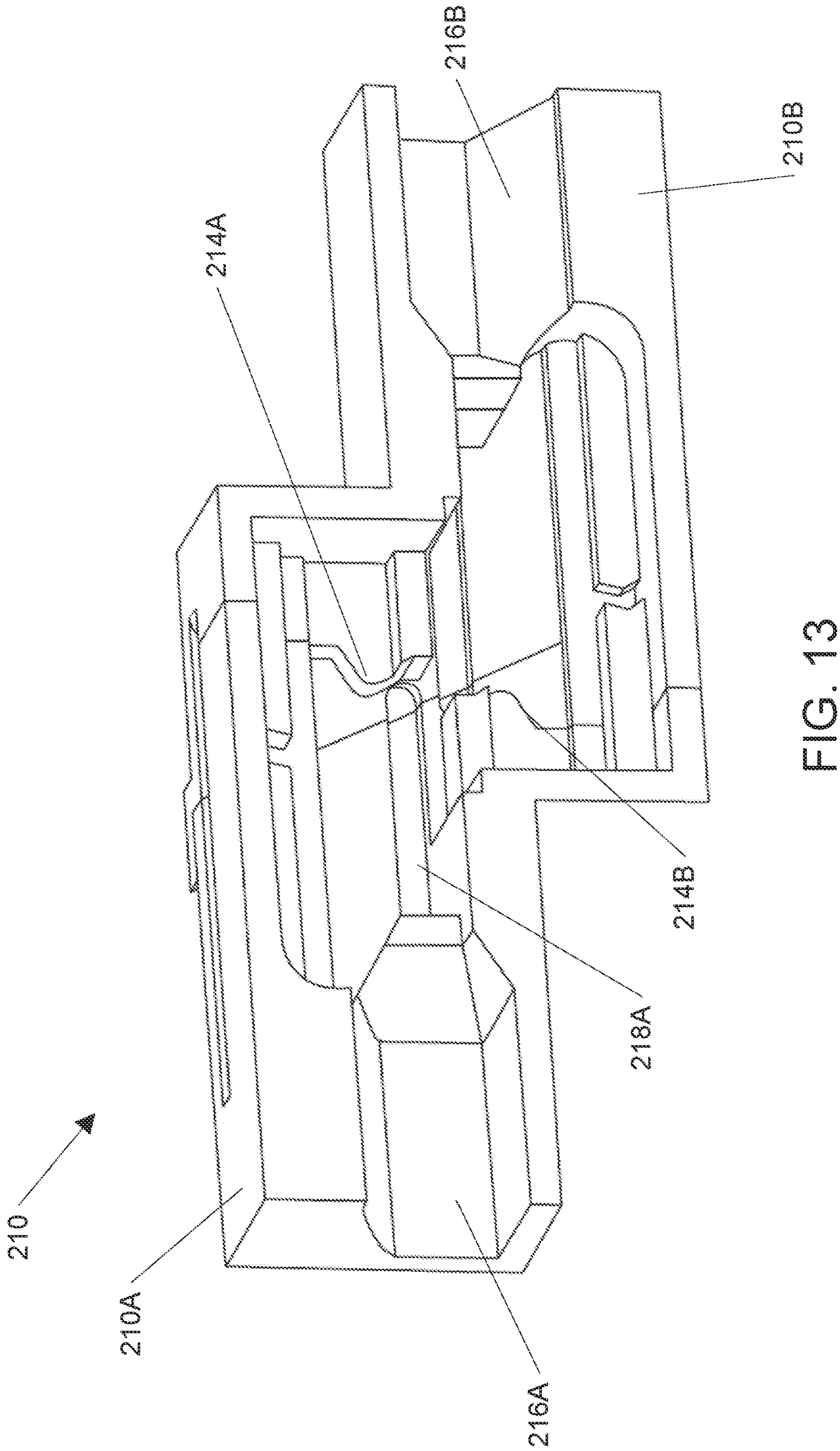
FIG. 13 shows the first housing section and second housing section from FIGS. 12A-12F in accordance with an embodiment.
Figure 14A:
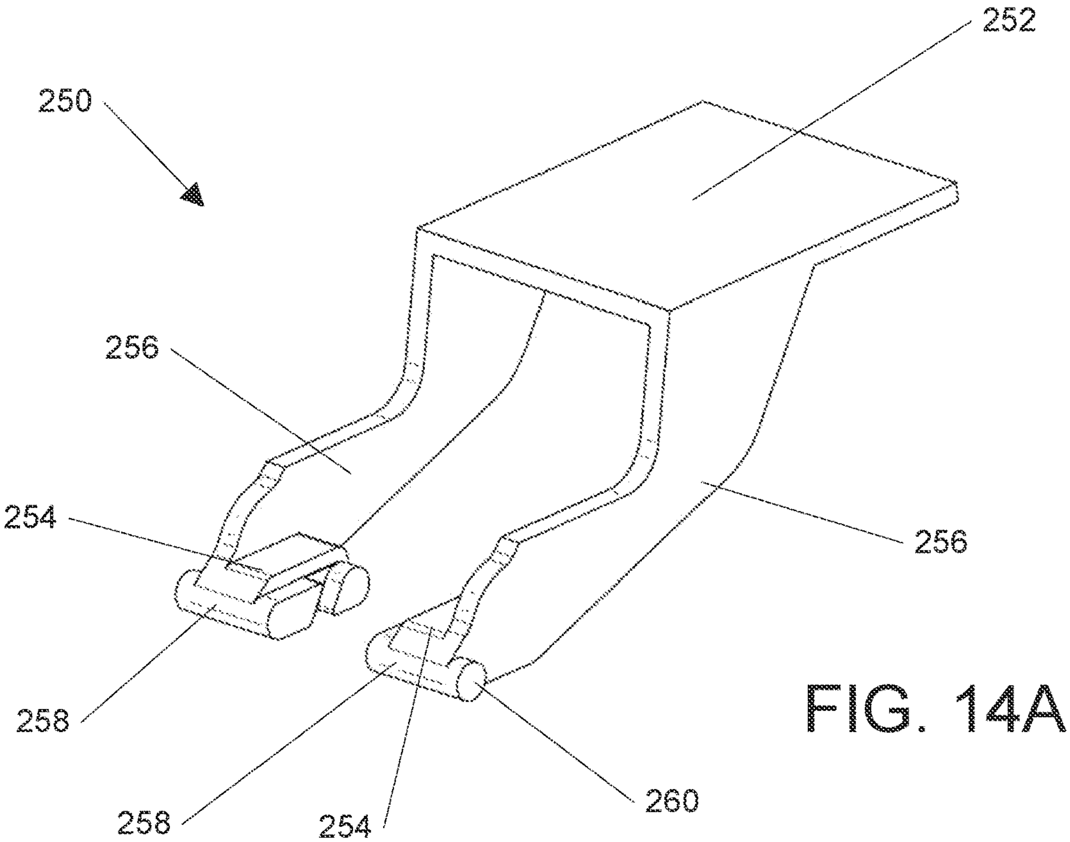
FIGS. 14A-14D show various views of a lifting mechanism from the lever connector from FIGS. 9A-9D and 10A-10D in accordance with an embodiment.
Figure 14B:
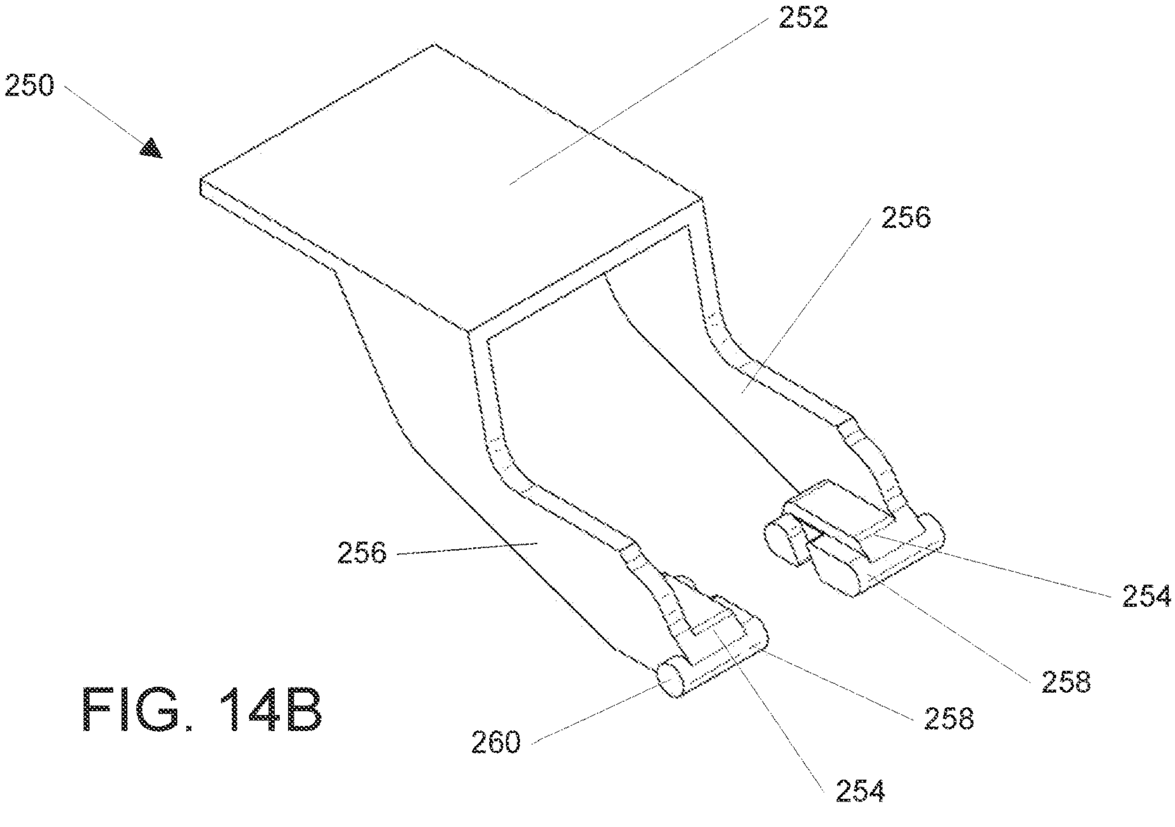
Figure 14C:
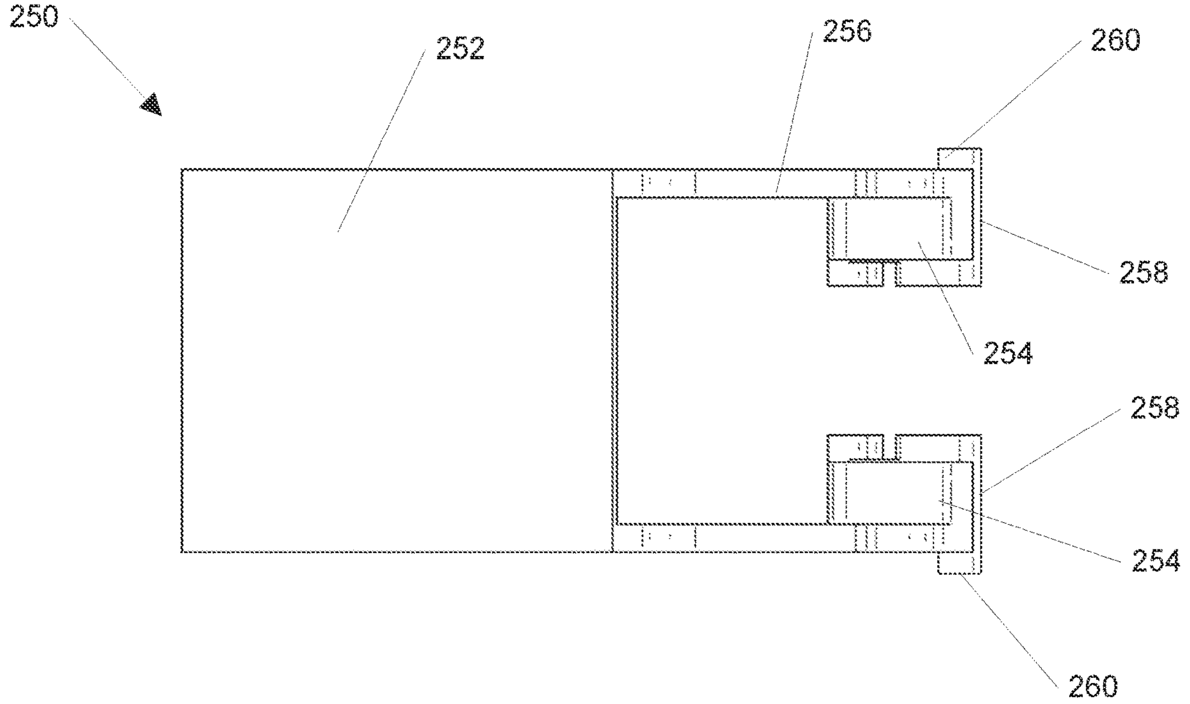
Figure 14D:
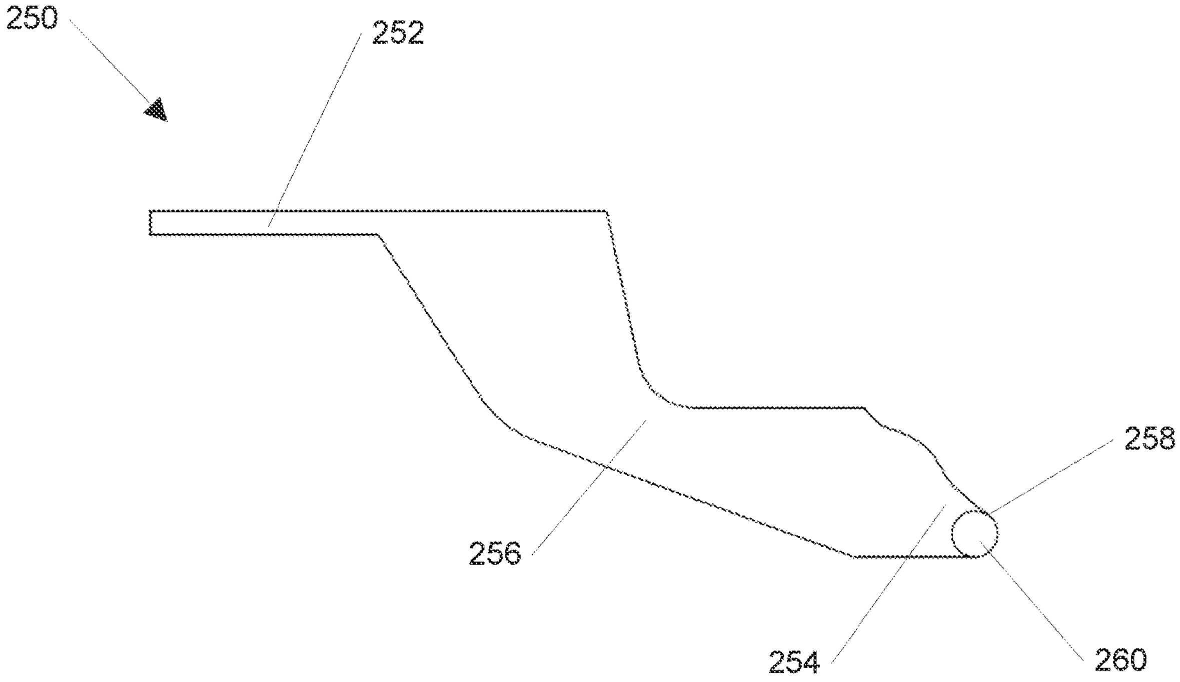
Figure 15A:
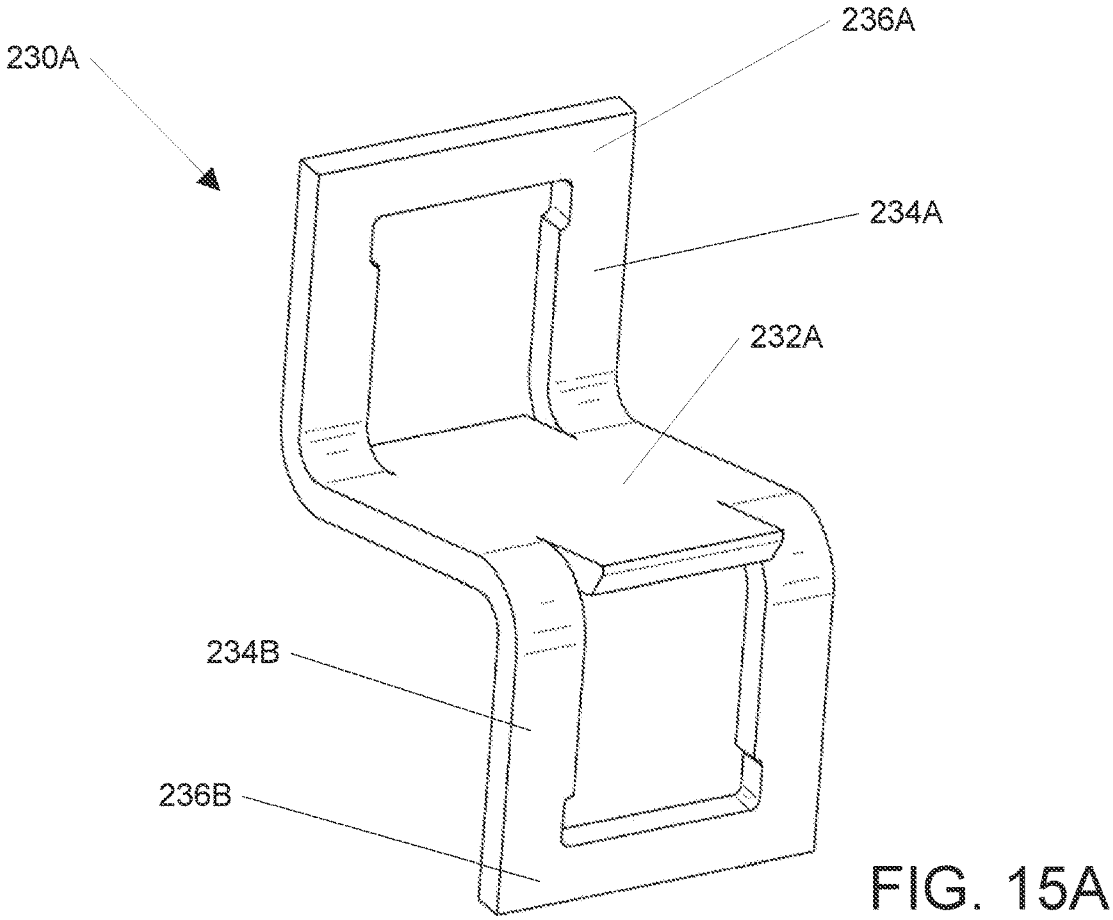
FIGS. 15A and 15B show various views of a busbar for a lever connector in accordance with an embodiment.
Figure 15B:
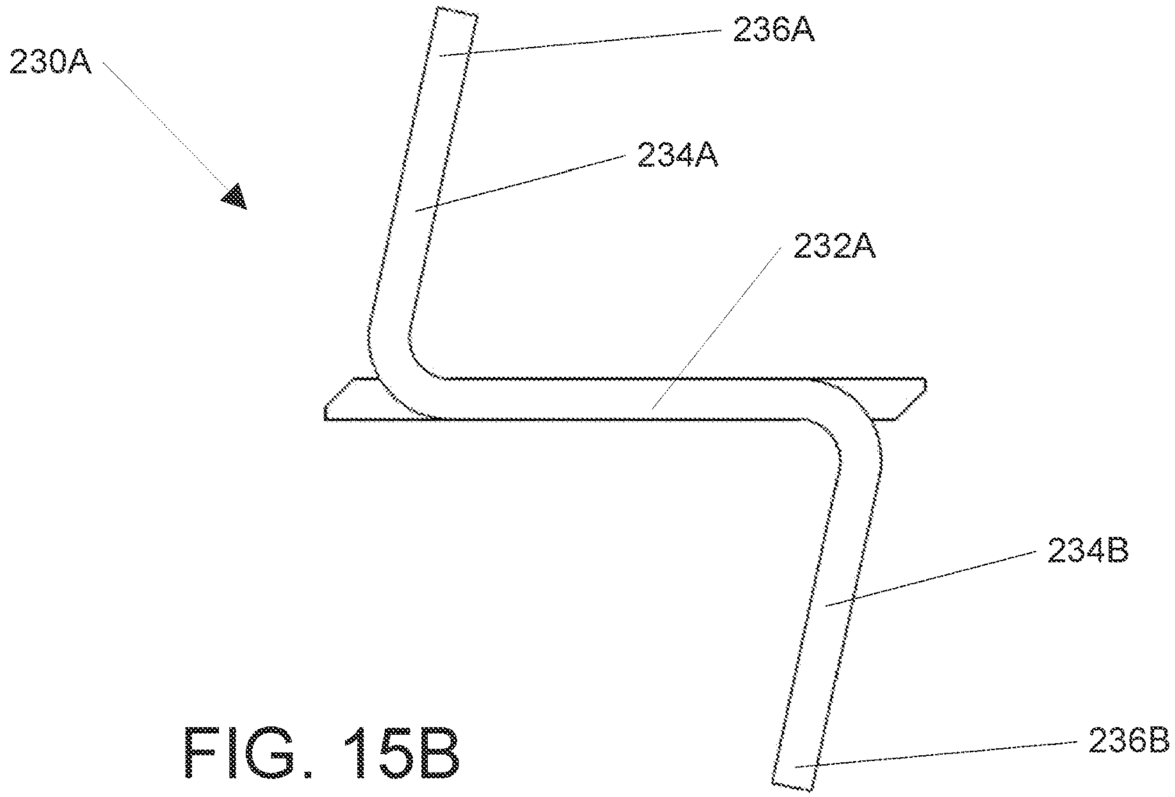
Figure 16A:
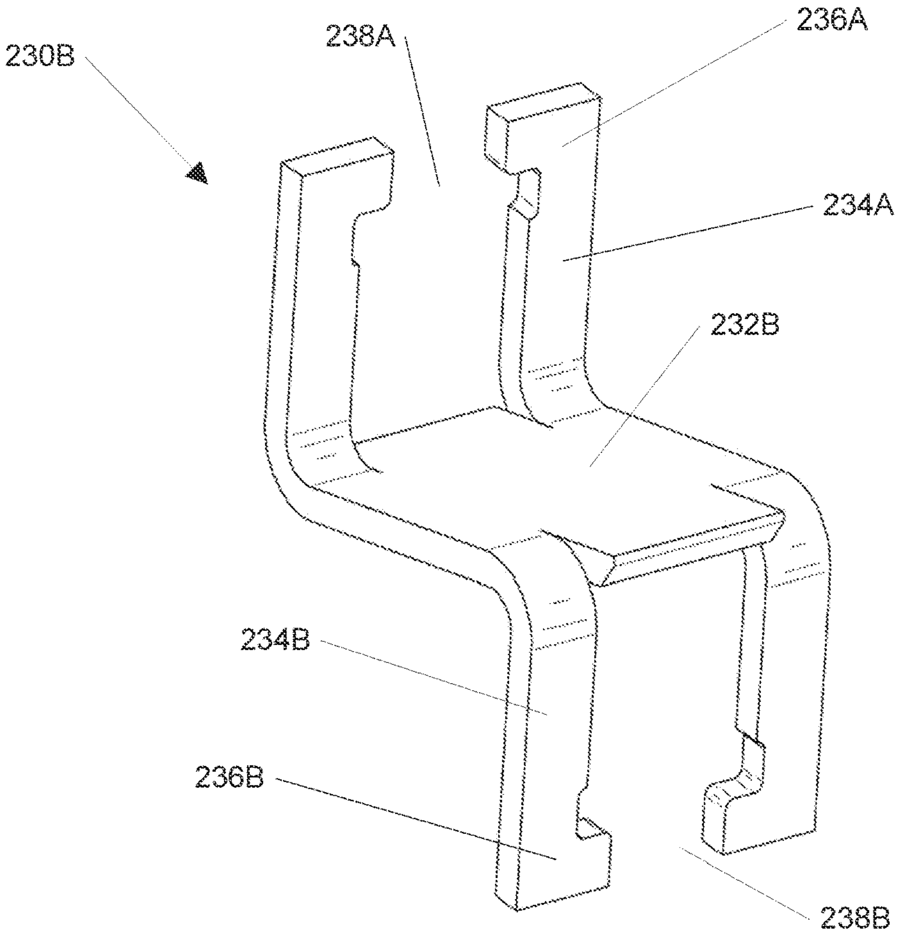
FIGS. 16A and 16B show various views of another busbar for a lever connector in accordance with an embodiment.
Figure 16B:
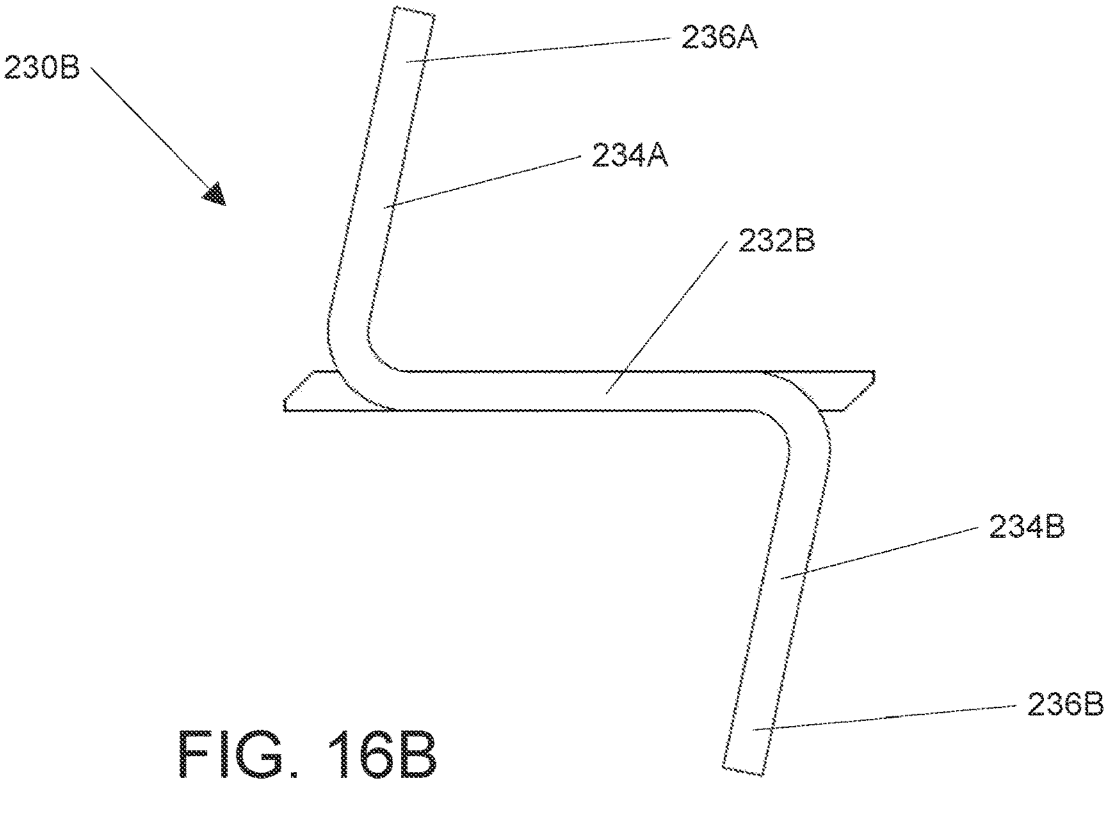
Figure 17A:
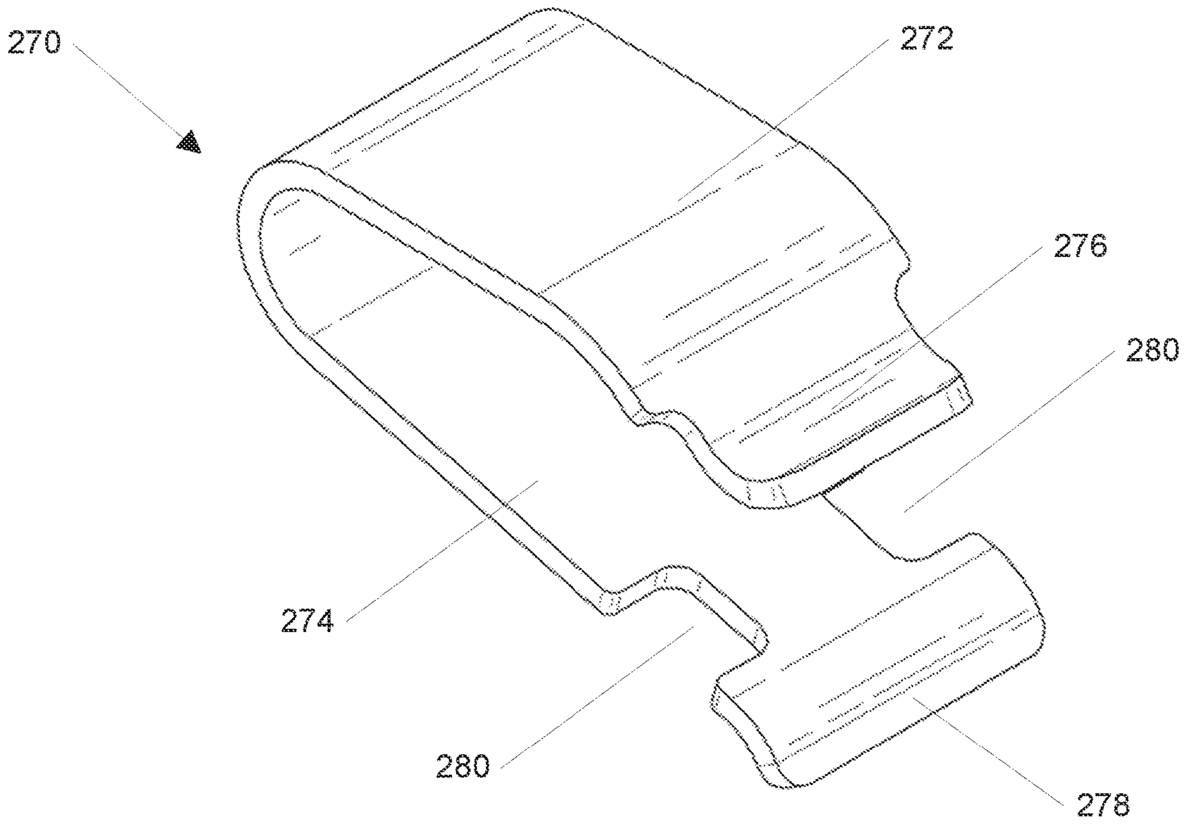
FIGS. 17A and 17B show various views of a resilient member from the lever connector from FIGS. 9A-9D and 10A-10D in accordance with an embodiment.
Figure 17B:
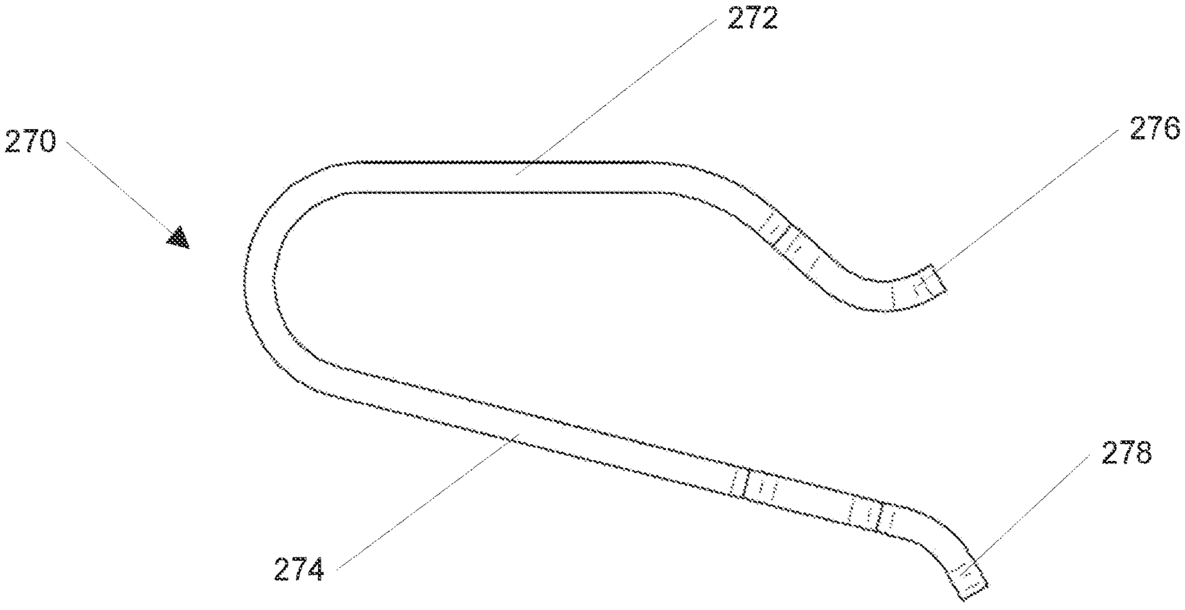
Figure 18A:
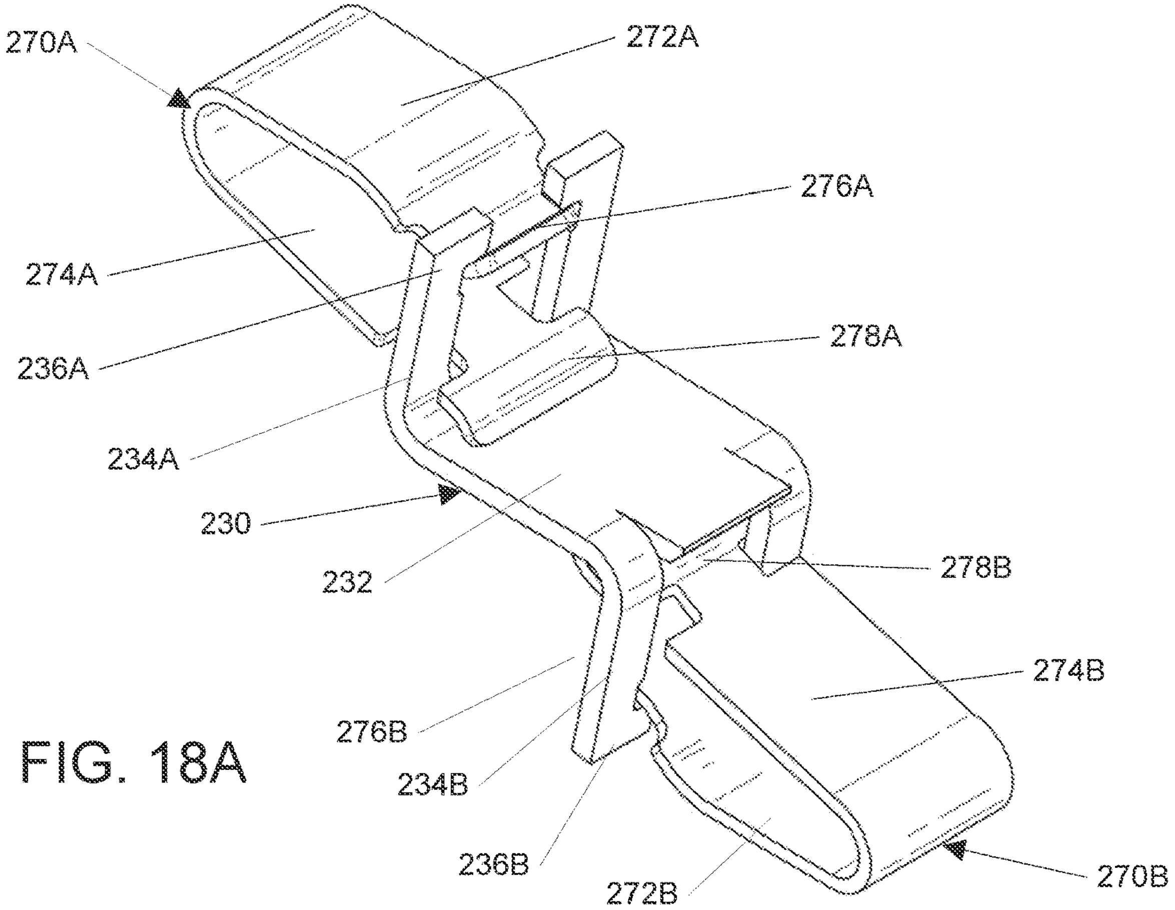
FIGS. 18A and 18B show various views of the busbar and resilient member from the lever connector from FIGS. 9A-9D and 10A-10D in accordance with an embodiment.
Figure 18B:
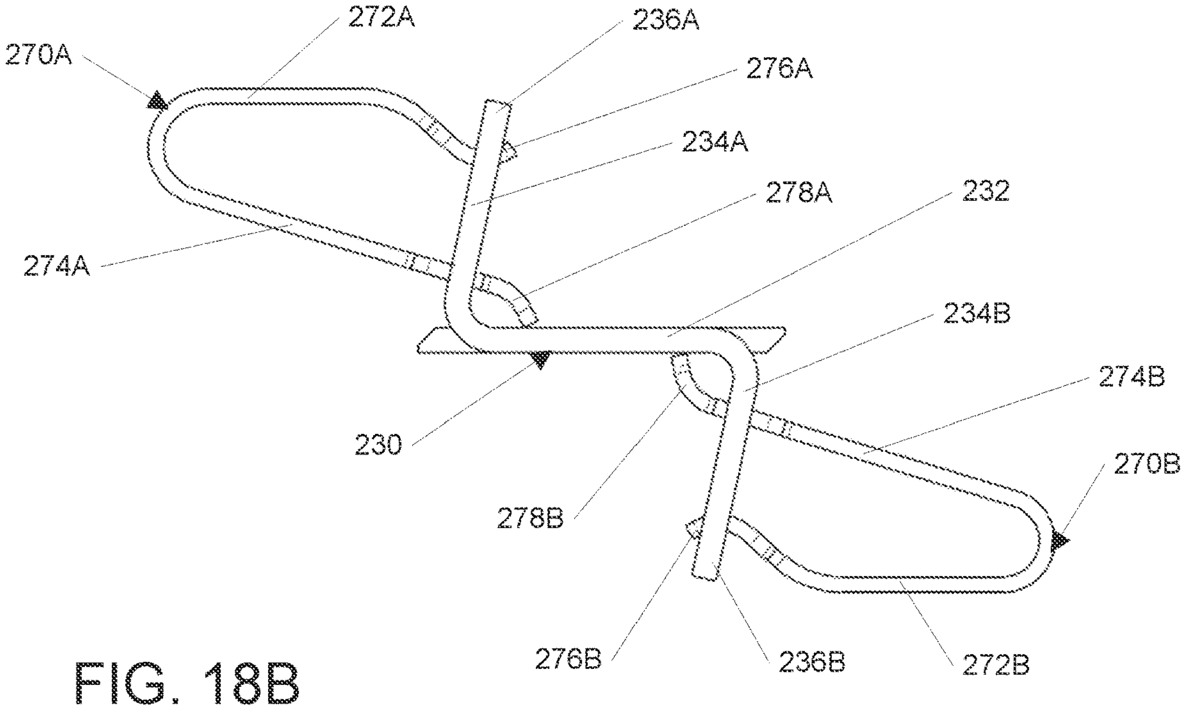

As illustrated in FIGS. 9A-9D and 10A-10D, the lever connector 200 may include various components. For example, the lever connector 200 may include a housing 210 made up of a first housing section 210A and a second housing section 210B, a busbar 230 located within the housing 210, two lever mechanisms 250A, 250B, and two resilient members 270A, 270B located within the housing 210 that connects the lever mechanisms 250A, 250B to the busbar 230. FIGS. 11A-11D illustrate cross-sectional views of the lever connector 200 in various configurations, from a fully open configuration in FIG. 11A to a fully closed configuration in FIG. 11D. FIGS. 12A-12F, 14A-14D, 15A-15B, 16A-16B, 17A-17B, and 18A-18B illustrate various views and embodiments of these components of the lever connector 200. Specifically, FIGS. 12A-12C show various views of the first housing section 210A from the lever connector 200. FIGS. 12D-12F show various views of the second housing section 210B from the lever connector 200. FIG. 13 shows the first housing section 210A and the second housing section 210B forming the housing 210 of the lever connector 200. FIGS. 14A-14D show various views of the lever mechanism 250 from the lever connector 200. FIGS. 15A and 15B show various views of a first embodiment of a busbar 230A for the lever connector 200. FIGS. 16A and 16B show various views of a second embodiment of a busbar 230B for the lever connector 200. FIGS. 17A and 17B show various views of the resilient member 270 from the lever connector 200. FIGS. 18A and 18B show various views of the busbar 230 and the resilient member 270 from the lever connector 200.

For the embodiment of FIGS. 9A-18B, the features and components of the lever connector 200 are referred to using similar reference numbers under the "2XX" series of reference numerals, rather than "1XX" as used for the lever connector 100 in the embodiments of FIGS. 1-8D. A "1XX" feature may be similar to a "2XX" feature. Accordingly, certain features of the lever connector 200 that were already described above with respect to the lever connector 100 of FIGS. 1-8D may be described in lesser detail, or may not be described at all. Further, any combination of the features of the lever connector 100 may be utilized with the lever connector 200. Vice versa, any combination of the features of the lever connector 200 may be utilized with the lever connector 100.

Figure 9A:
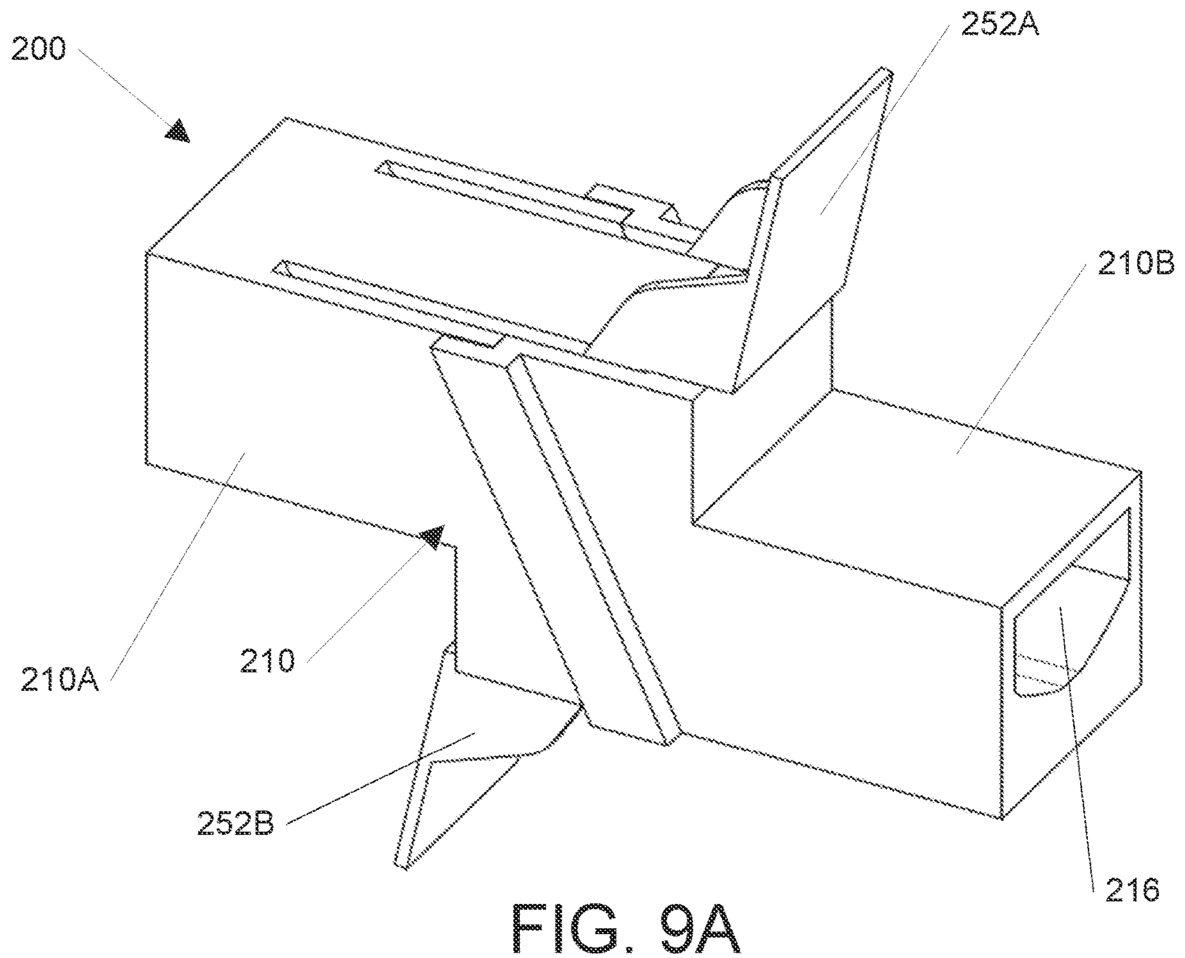
FIGS. 9A-9D show various views of another lever connector in an open configuration in accordance with an embodiment.
Figure 9B:
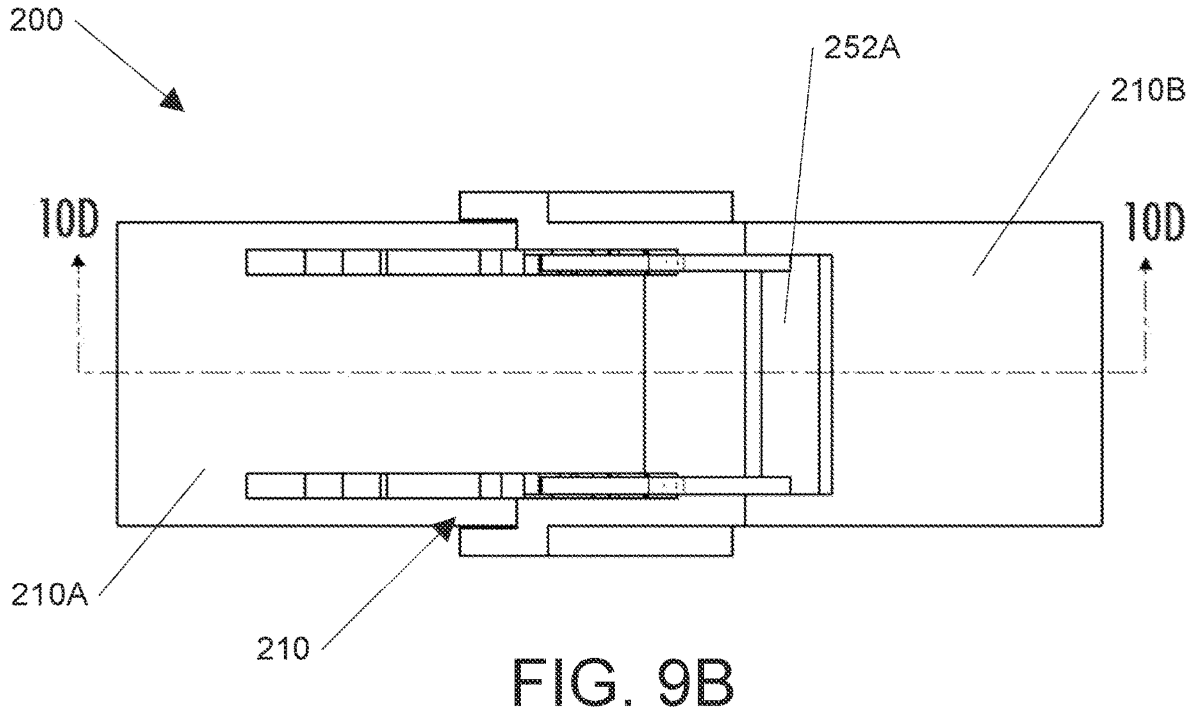
Figure 9C:
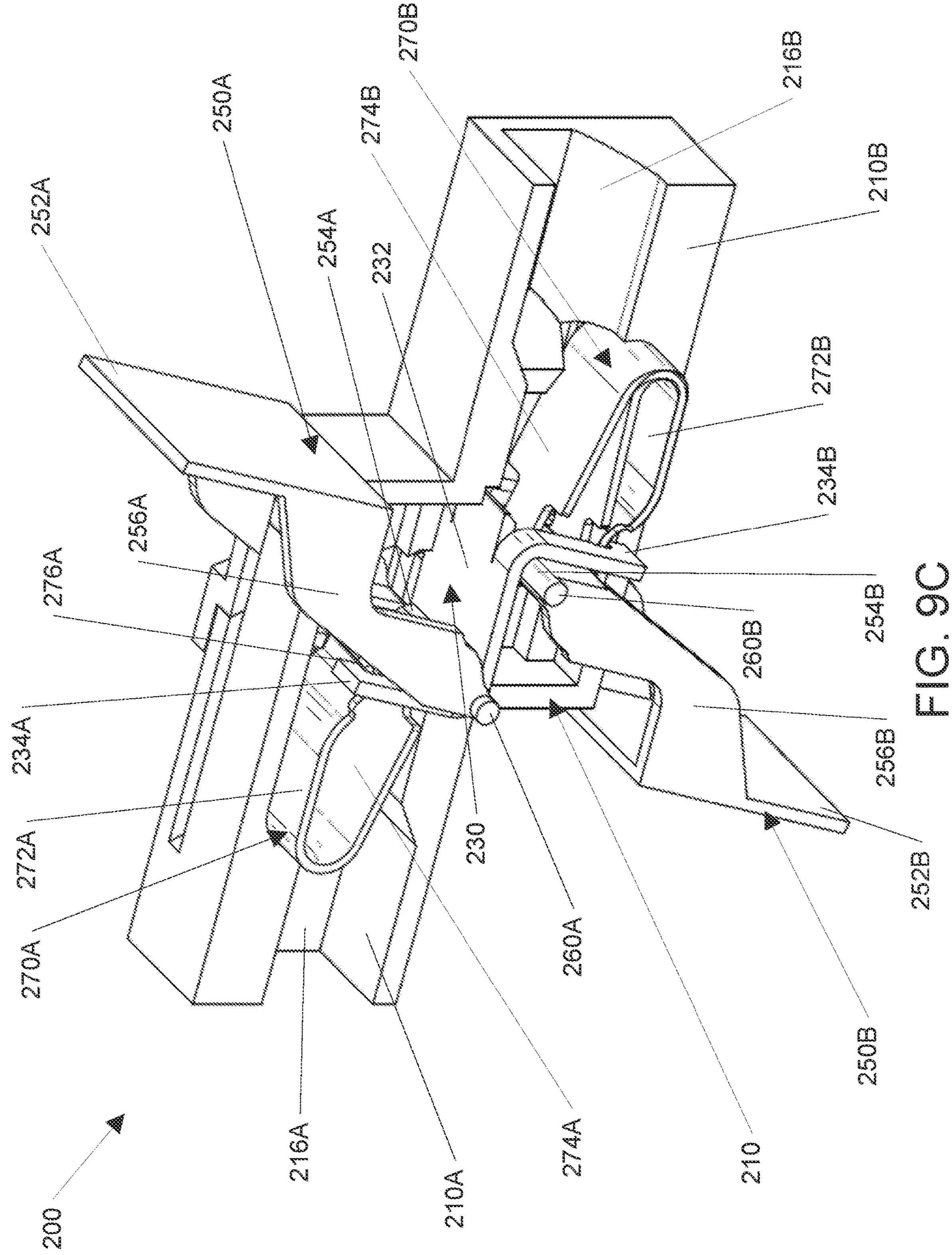
Figure 9D:
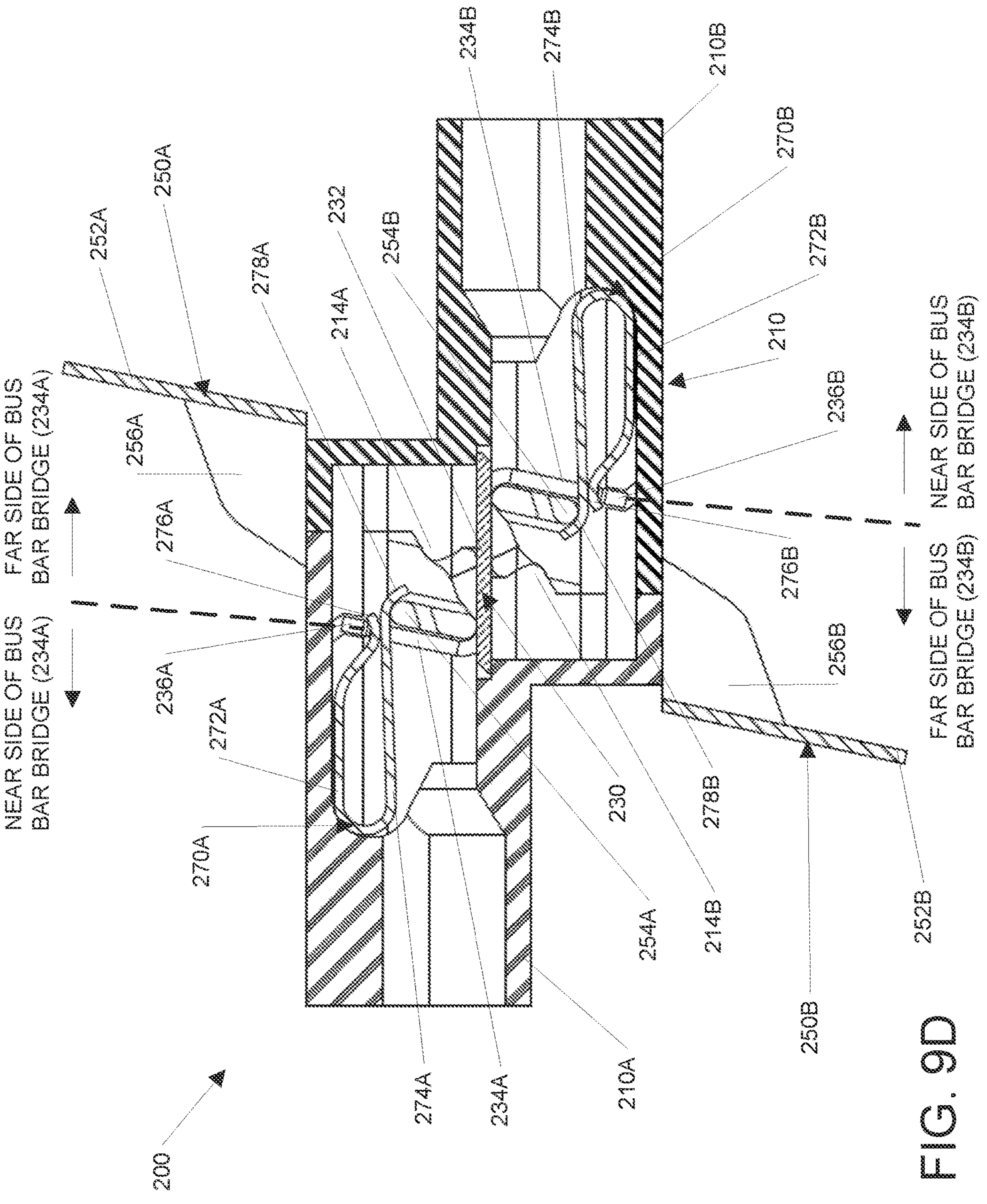
Figure 10A:
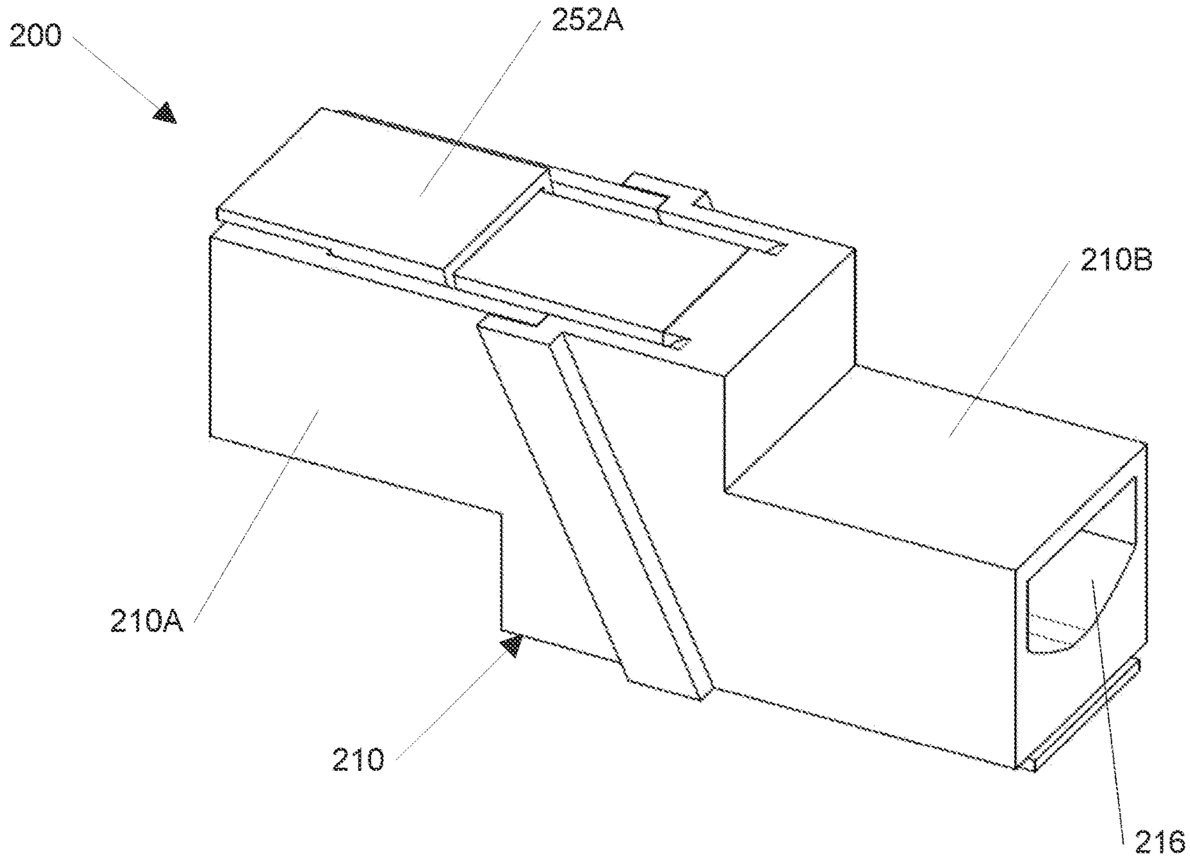
FIGS. 10A-10D show various views of the lever connector from FIGS. 9A-9D in a closed configuration in accordance with an embodiment.
Figure 10B:
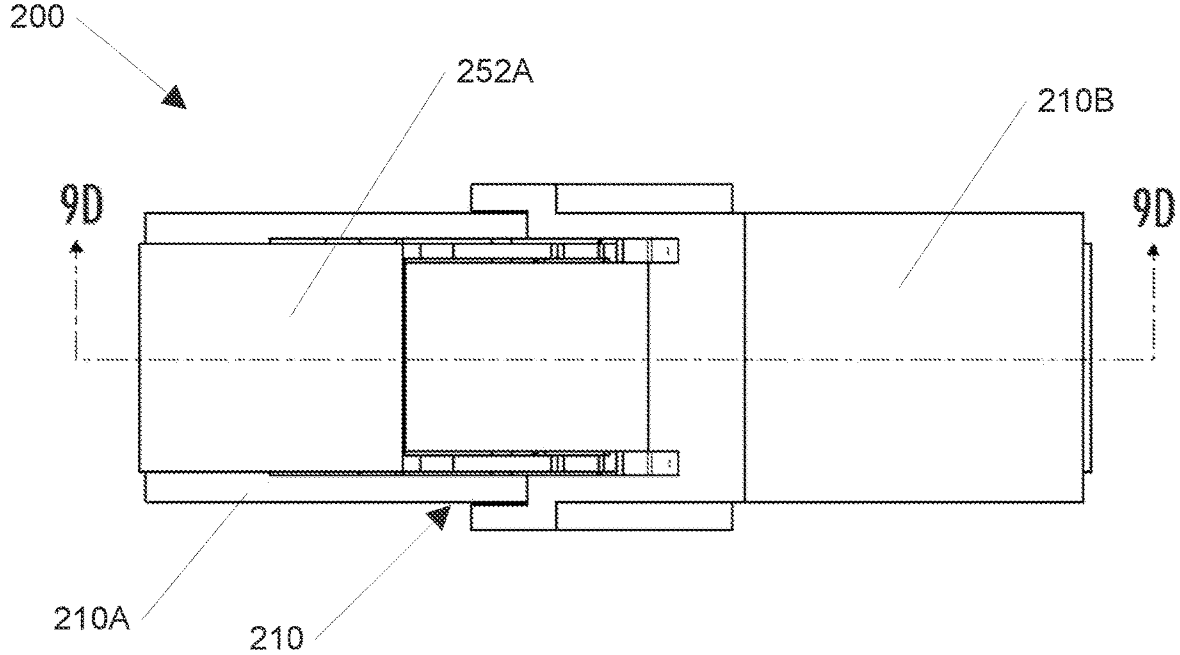
Figure 10C:
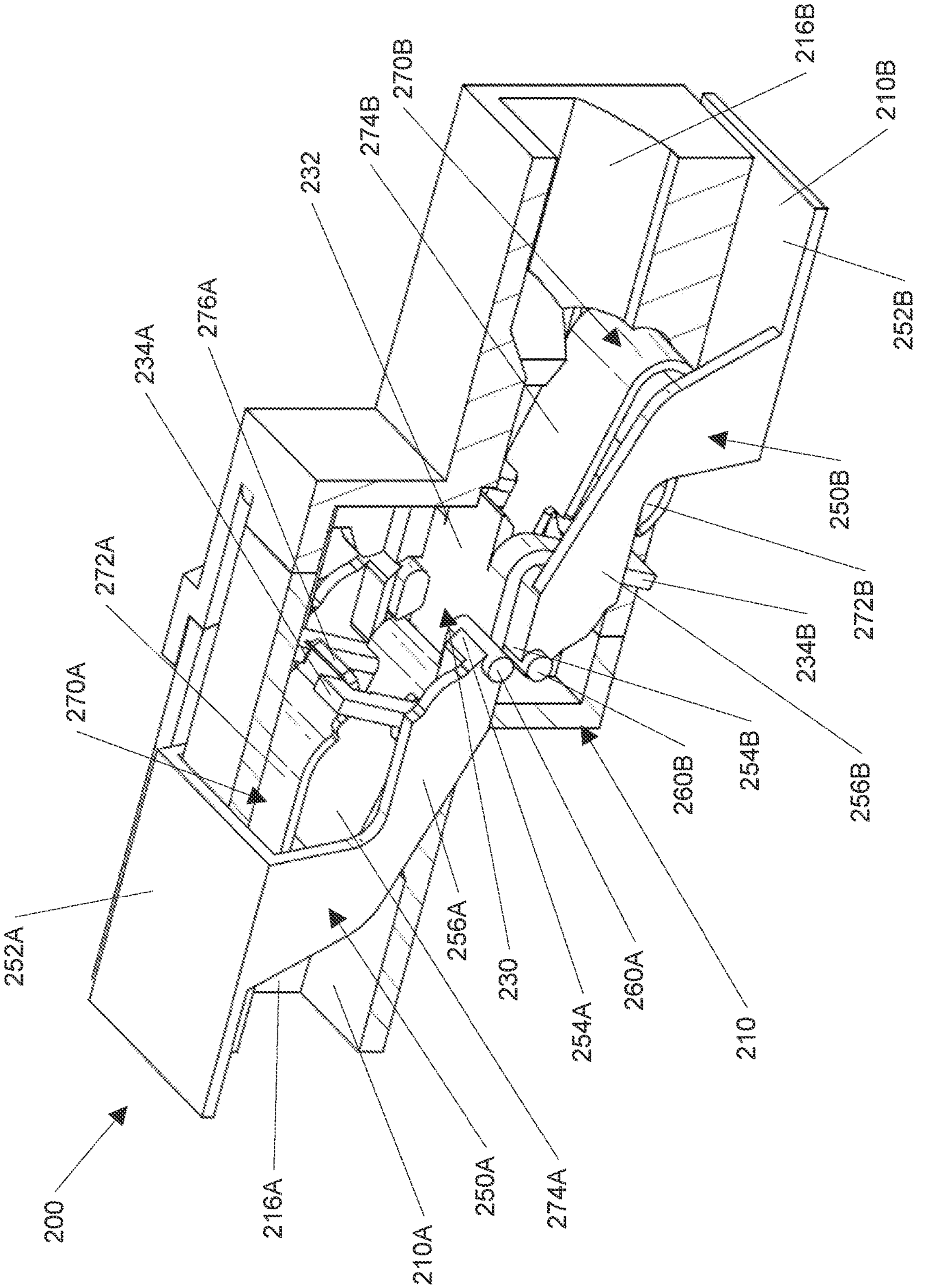
Figure 10D:
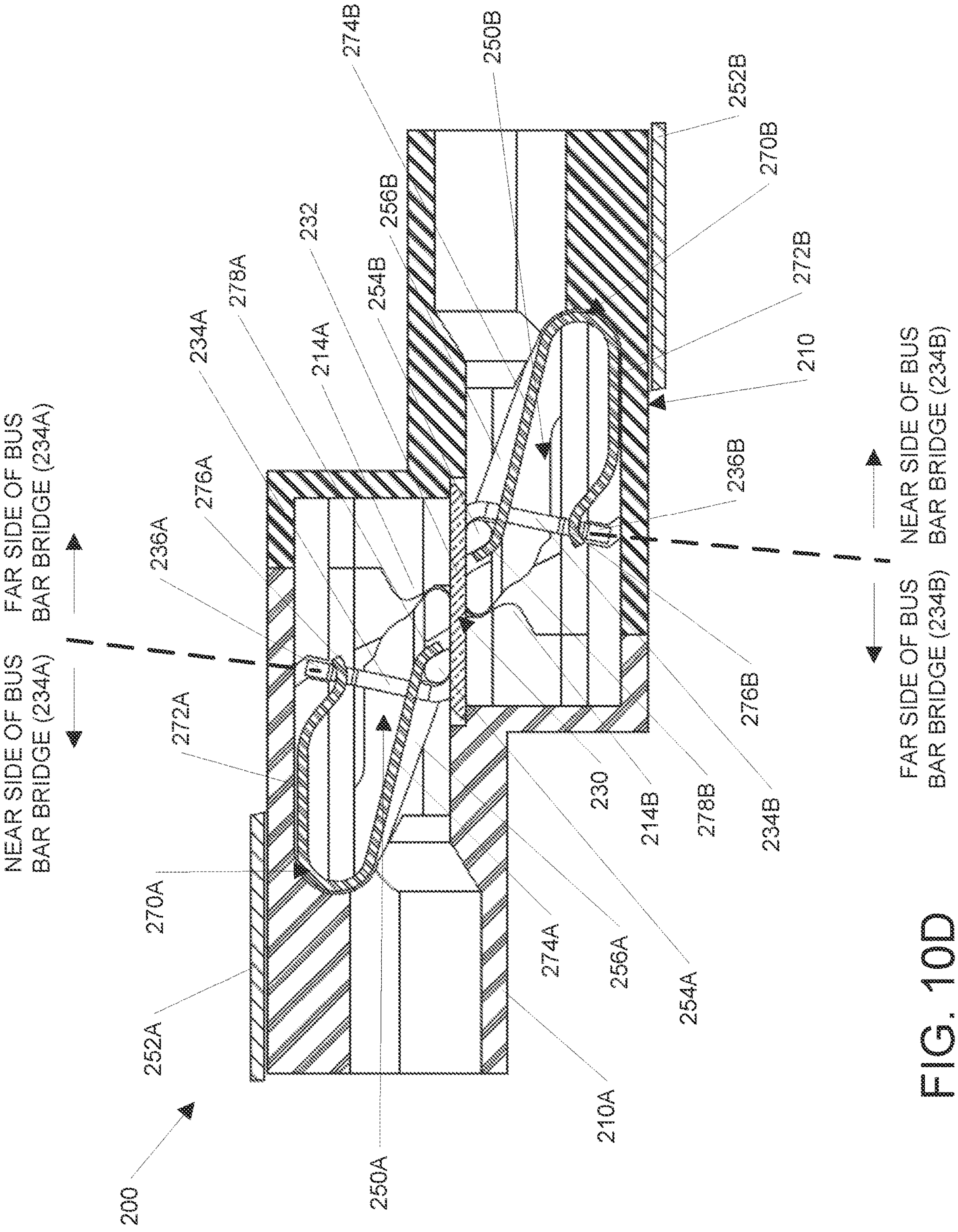

Referring to FIGS. 9A-9D, the lever connector 200 may be in a fully open configuration. Referring to FIGS. 10A-10D, the lever connector 200 may be in a fully closed configuration. FIG. 9C illustrates a cross-sectional view of the lever connector 200 from FIG. 9A and FIG. 9D illustrates a cross-sectional view of the lever connector 200 from FIG. 9B with the lever connector 200 in the open configuration. FIG. 10C illustrates a cross-sectional view of the lever connector 200 from FIG. 10A and FIG. 10D illustrates a cross-sectional view of the lever connector 200 from FIG. 10B with the lever connector in the closed configuration. As illustrated, the lever connector 200 includes a housing 210. The housing 210 may be made of an insulating material to insulate the electrical connections within the housing 210 and the lever connector 200. The housing 210 may include various components. The housing 210 may include various housing sections, such as a top side portion 210A and a bottom side portion 210B. There may be multiple housing sections as part of the housing 210 without departing from this invention. The housing portions 210A, 210B may be mechanically connected together by various methods known and used in the art, such as snapping, welding, gluing, fastening, etc. In another embodiment, the housing portions 210A, 210B may be welded together. The housing 210 may also include conductor openings 216A, 216B where the electrical wires 10 can be placed to electrically connect the electrical wires 10. The housing 210 may also include housing support surfaces 214A, 214B. The housing support surfaces 214A, 214B may interface with a portion of the lever mechanisms 250A, 250B. As will be explained in more detail below, the housing support surfaces 214A, 214B may help guide the lever mechanisms 250A, 250B along the busbar 230 to ensure that the lever mechanisms 250A, 250B follow a path along the busbar 230 when levers 252A, 252B on the lever mechanisms 250A, 250B are actuated.

The busbar 230 may be located within the housing 210. The busbar 230 may include a base surface 232 and two busbar bridges 234A, 234B. The first busbar bridge 234A may be located on a first end of the base surface 232 and the second busbar bridge 234B may be located on a second end opposite the first end of the base surface 232. The first busbar bridge 234A may extend towards the top side portion 210A of the housing 210 and away from the base surface 232. The second busbar bridge 234B may extend towards the bottom side portion 210B of the housing 210 and away from the base surface 232. Additionally, the busbar bridges 234A, 234B may include two arms 236 that extend from the base surface 232.

A first lever mechanism 250A may be located at least partially within the top side portion 210A of the housing 210. A second lever mechanism 250B may be located at least partially within the bottom side portion 210B of the housing 210. The lever mechanisms 250A, 250B may include a lever 252A, 252B and a lifting mechanism 254A, 254B. As illustrated in FIGS. 9C and 9D, the first lever 252A may be fully raised from the top side portion 210A of the housing 210 when the first lever mechanism 250A is in an open configuration. As illustrated in FIGS. 9C and 9D, the second lever 252B may be fully raised from the bottom side portion 210B of the housing 210 when the second lever mechanism 250B is in the open configuration. The levers 252A, 252B may be actuated and pushed downward and towards the housing 210 to move the lever mechanisms 250A, 250B to the closed configuration, as illustrated in FIGS. 10C and 10D. The first lever 252A may be located on a near side of the first busbar bridge 234A and the first lifting mechanism 254A may be located on a far side of the first busbar bridge 234A on an opposite side of the first busbar bridge 234A. The second lever 252B may be located on a near side of the second busbar bridge 234B and the second lifting mechanism 254B may be located on a far side of the second busbar bridge 234B on an opposite side of the second busbar bridge 234B. The lifting mechanisms 254A, 254B may also include one or more sliding pins 260. The sliding pin 260 may protrude outward in an opposite direction from the lifting mechanism 254A, 254B. The sliding pin 260 may be a horizontal sliding pin. The sliding pin 260 may connect to and slide within the housing 210. The sliding pin 260 may slide within the housing 210 while the lever mechanisms 250A, 250B are actuated. The sliding pin 260 may slide within a channel 218A, 218B within the housing 210 for interfacing with the sliding pin 260.

Two resilient members 270A, 270B may also be located within the housing 210. The resilient members 270A, 270B may be a spring, such as a leaf spring. The resilient members 270A, 270B may be other resilient structures without departing from the invention. The resilient members 270A, 270B may include a fixed section 272A, 272B and a clamping section 274A, 274B. The fixed sections 272A, 274B may be connected to the busbar bridges 234A, 234B via a curved tab 276A, 276B of the resilient members 270A, 270B. The clamping sections 274A, 274B may be connected to the lifting mechanisms 254A, 254B of the lever mechanisms 250A, 250B via a second end 278A, 278B of the resilient members 270A, 270B. The lifting mechanisms 254A, 254B connected to the clamping sections 274A, 274B of the resilient members 270A, 270B may be located on the far side of the busbar bridges 234A, 234B opposite the near side of the busbar bridges 234A, 234B. When the levers 252A, 252B are actuated and lifted upwards and away from the housing 210, the lifting mechanisms 254A, 254B may move the clamping sections 274A, 274B of the resilient members 270A, 270B to release away from the busbar base surface 232. When the levers 252A, 252B are closed and pushed downward, the clamping sections 274A, 274B of the resilient members 270A, 270B move downward to push the conductors 12 of the wires 10 firmly against the busbar 230, thereby making electrical contact between the conductors 12 of the wires 10 and the busbar 230.

Figure 11A:
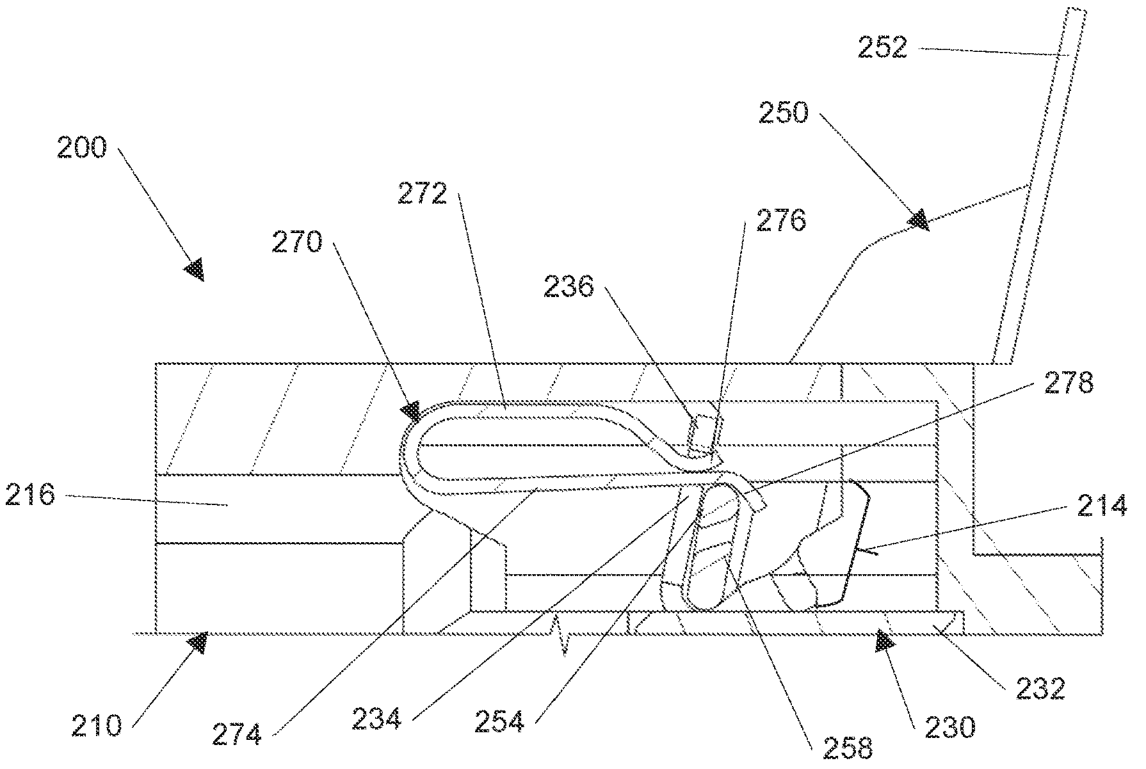
FIGS. 11A-11D show cross-sectional views of the lever connector from FIGS. 9A-9D and 10A-10D in various configurations in accordance with an embodiment.
Figure 11B:
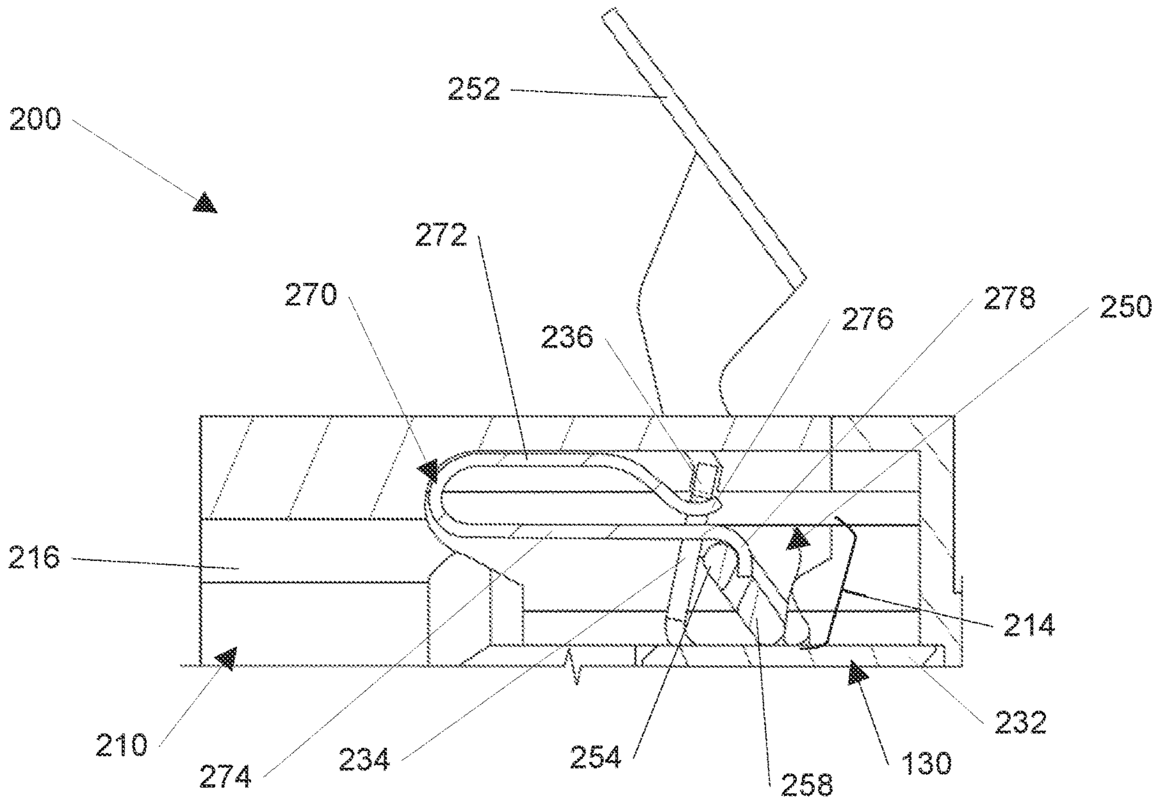
Figure 11C:
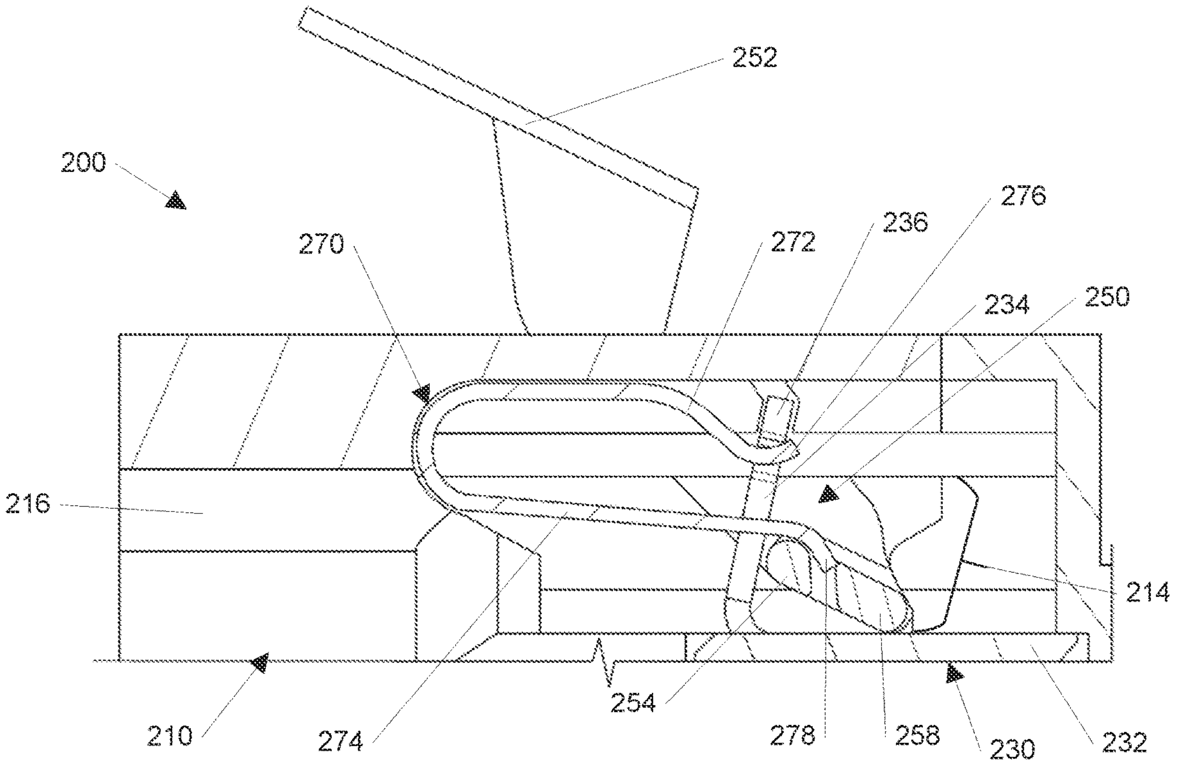
Figure 11D:
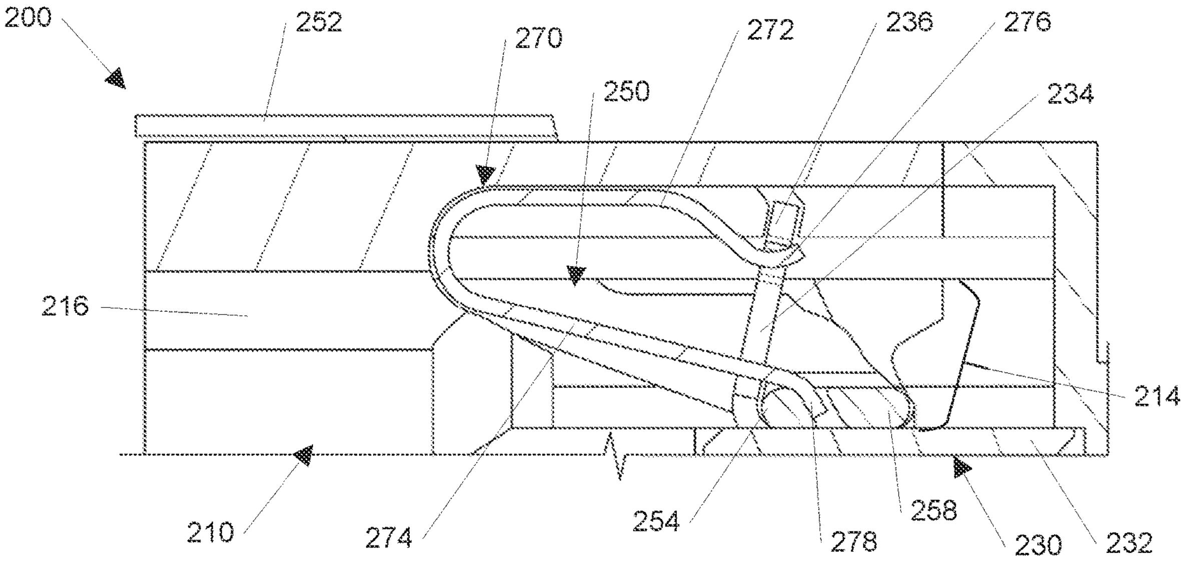

FIGS. 11A-11D illustrate cross-sectional views of the lever connector 200 in various configurations, from a fully open configuration in FIG. 11A to a fully closed configuration in FIG. 11D. FIGS. 11A-11D illustrate the movement of the lever 252 from the fully open configuration in FIG. 11A to the fully closed configuration in FIG. 11D.

As shown in FIG. 11A, the lever connector 200 is in a fully open configuration. The lever 252 may be positioned approximately perpendicular to the housing 210. In the fully open configuration, the lifting mechanism 254 and the clamping section 274 of the resilient member 250 may be located adjacent to the end of the busbar bridge 234. Additionally, in the fully open configuration, the clamping section 274 of the resilient member 270 may be released and away from the base surface 232 of the busbar 230.

FIG. 11B illustrates the lever connector 200 and the lever 252 being pushed toward the fully closed configuration and away from the open configuration. The lever 252 may be actuated downward, pushed downward, and rotated towards the housing 210. As illustrated in FIG. 11B, the lifting mechanism 254 and the clamping section 274 of the resilient member 270 may begin to slide downward and parallel against the busbar bridge 234 toward the base surface 232 of the busbar 230. In FIG. 11B, the back support surface 258 rotates against and adjacent to the housing support surface 214 of the housing 210, guiding the lifting mechanism 254 to ensure the lifting mechanism 254 follows the path along the far side of the busbar bridge 234. As the lifting mechanism 254 moves and slides along the busbar bridge 234, the clamping section 274 of the resilient member 270 moves towards the base surface 232 of the busbar 230.

FIG. 11C illustrates the lever connector 200 and the lever 252 continuing to being pushed toward the fully closed configuration and away from the open configuration. The lever 252 may continue to be actuated downward, pushed downward, and rotated towards the housing 210. As illustrated in FIG. 11C, the lifting mechanism 254 and the clamping section 274 of the resilient member 270 may continue to slide downward and parallel against the busbar bridge 234 closer toward the base surface 232 of the busbar 230. In FIG. 11C, the back support surface 258 continues to rotate and abut against and adjacent to the housing support surface 214 of the housing 210, thereby continuing to guide the lifting mechanism 254 to ensure the lifting mechanism 254 follows a path along the far side of the busbar bridge 234. As the lifting mechanism 254 moves and slides along the busbar bridge 234, the clamping section 274 of the resilient member 270 moves closer to the base surface 232 of the busbar 230.

As shown in FIG. 11D, the lever connector 200 is in a fully closed configuration. The lever 252 may lay flat against the housing 210. In the fully closed configuration, the lifting mechanism 254 and the clamping section 274 of the resilient member 270 may be located adjacent the base surface 232 of the busbar 230. When the lever 252 is closed and pushed downward, the clamping section 274 of the resilient member 270 moves downward to bite, capture, and push the conductors of the wires firmly against the busbar 230, thereby making electrical contact between the conductors 12 of the wires 10 and the busbar 230. A back support surface 258 on the lever mechanism 250 may abut against and adjacent to a housing support surface 214 of the housing 210. Additionally, in the fully closed configuration, the fixed section 272 and the clamping section 274 of the resilient member 270 may be fully separated.

Referring to FIGS. 12A-12F, the lever connector 200 may include a top side housing section 210A and a bottom side housing section 210B. Referring additionally to FIG. 13, the lever connector 200 may include a housing 210 formed from the top side housing section 210A and the bottom side housing section 210B. The housing 210 may include conductor openings 216A, 216B where the electrical wires 10 can be placed to electrically connect the electrical wires 10. The housing 210 may also include housing support surfaces 214A, 214B. The housing support surfaces 214A, 214B may interface with a portion of the lever mechanisms 250A, 250B, such as with the back support surface 258A, 258B thereby guiding the lifting mechanisms 254A, 254B to ensure the lifting mechanisms 254A, 254B follow a path along the far side of the busbar bridges 234A, 234B. Additionally, the housing 210 may include a channel 218A for interfacing with a sliding pin 260A. The sliding pin 260A may slide within the channel 218A while the lever mechanism 250A is being actuated. The channel 218A may be a straight-line channel.

Referring to FIGS. 14A-14D, the lever connector 200 may include two lever mechanisms 250A, 250B. The lever mechanisms 250A, 250B may include a lever 252A, 252B that may be actuated and lifted upwards and away from the housing 210 to make the electrical connection for the lever connector 200. The lever mechanisms 250A, 250B may also include two spring lifting lever arm sections 256A, 256B. The spring lifting lever arm sections 256A, 256B may extend away from the levers 252A, 252B and into the housing 210. At the end of the spring lifting lever arm sections 256A, 256B, the lever mechanisms 250A, 250B includes a lifting mechanisms 254A, 254B. As explained above, the lifting mechanisms 254A, 254B connects to the clamping sections 274A, 274B of the resilient member 270A, 270B. The sliding pins 260A, 260B may be horizontal sliding pins. The sliding pins 260A, 260B may connect to and slide within the housing 210. The sliding pins 260A, 260B may slide within the housing 210 while the lever mechanisms 250A, 250B are actuated. The sliding pins 260A, 260B may slide within channels 218A, 218B within the housing 210 for interfacing with the sliding pins 260A, 260B. Lastly, the lever mechanisms 250A, 250B and the lifting mechanisms 254A, 254B may include back support surfaces 258A, 258B. The back support surfaces 258A, 258B may rest against and abut to the housing support surfaces 214A, 214B in the housing 210 to support the lever mechanisms 250A, 250B and to help ensure the lifting mechanisms 254A, 254B follows a path along the far side of the busbar bridges 234A, 234B.

Referring to FIGS. 15A and 15B, the lever connector 200 may include a busbar 230. The busbar 230 may include a base surface 232. The base surface 232 may lay flat within the housing 210. The base surface 232 may include two busbar bridges 234A, 234B that extend away from the base surface 232. The busbar bridges 234A, 234B may extend perpendicular or approximately perpendicular from the base surface 232. As illustrated in FIGS. 15A and 15B, the busbar 230 includes two busbar bridges 234A, 234B. The first busbar bridge 234A may be located on a first end of the base surface 232 and extend towards the top side portion 210A of the housing 210. The second busbar bridge 234B may be located on a second end of the base surface 232 and extend towards the bottom side portion 210B of the housing. The busbar bridges 234A, 234B may include one or more arms 236A, 236B.

Referring to FIGS. 16A and 16B, the lever connector 200 may include another embodiment of a busbar 230B. The busbar bridges 234A, 234B of the busbar 230B may include one or more arms 236A, 236B separated by gaps 238A, 238B. The curved tabs 276A, 276B of the fixed section 272A, 272B of the resilient members 270A, 270B may hook on the one or more arms 236A, 236B. The gaps 238A, 238B may be sized such that a narrow portion of the clamping section 274A, 274B of the resilient member 270A. 270B may pass through the gaps 238A, 238B.

Referring to FIGS. 17A and 17B, the lever connector 200 may include two resilient members 270A, 270B. As described above, the resilient members 270A, 270B may be a spring, such as a flat spring or a leaf spring. The resilient members 270A, 270B may be one or more strips, bars, or sections of metal (or other resilient materials), or assemblies of such, that are formed to produce a repeatable counterforce when compressed or displaced and used for positioning or contacting. The resilient members 270A, 270B may provide a repeatable counterforce to control motion or load by making contact and applying force. The resilient members 270A, 270B may be various sizes, type, materials, as well as mounting types, or shapes. The resilient members 270A, 270B may include fixed sections 272A, 272B and clamping sections 274A, 274B. The fixed sections 272A, 272B may include curved tabs 276A, 276B that connects to the arms 236A, 236B of the busbar bridges 234A, 234B, The clamping sections 274A, 274B may include curved ends 278A, 278B that connects to the lifting mechanisms 254A, 254B. As illustrated in FIG. 17A, the clamping sections 274A, 274B may also include a pair of gaps 280A, 280B located between clamping sections 274A, 274B and the curved ends 278A, 278B. The gaps 280A, 280B may be sized and shaped to pass through the busbar bridges 234A, 234B. Referring to FIGS. 18A and 18B, the busbar 230 and the resilient members 270A, 270B may connect and interface with each other within the housing 210.

Figure 19A:
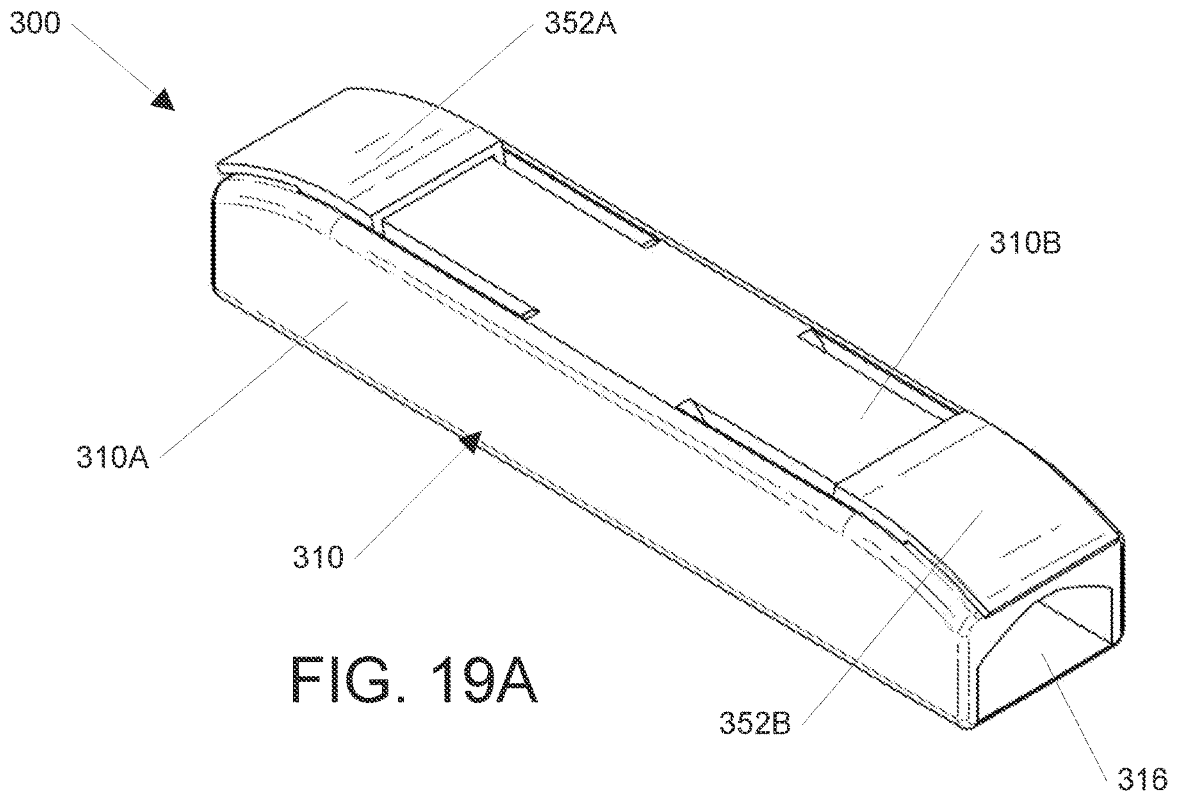
FIGS. 19A-19C show various views of another lever connector in accordance with an embodiment.
Figure 19B:
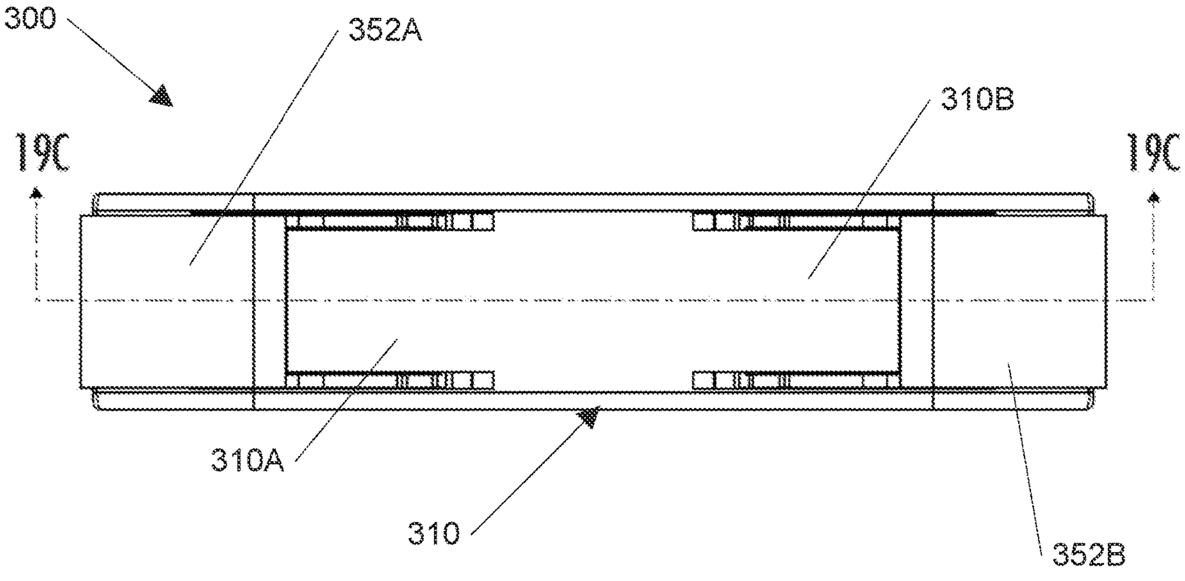
Figure 19C:
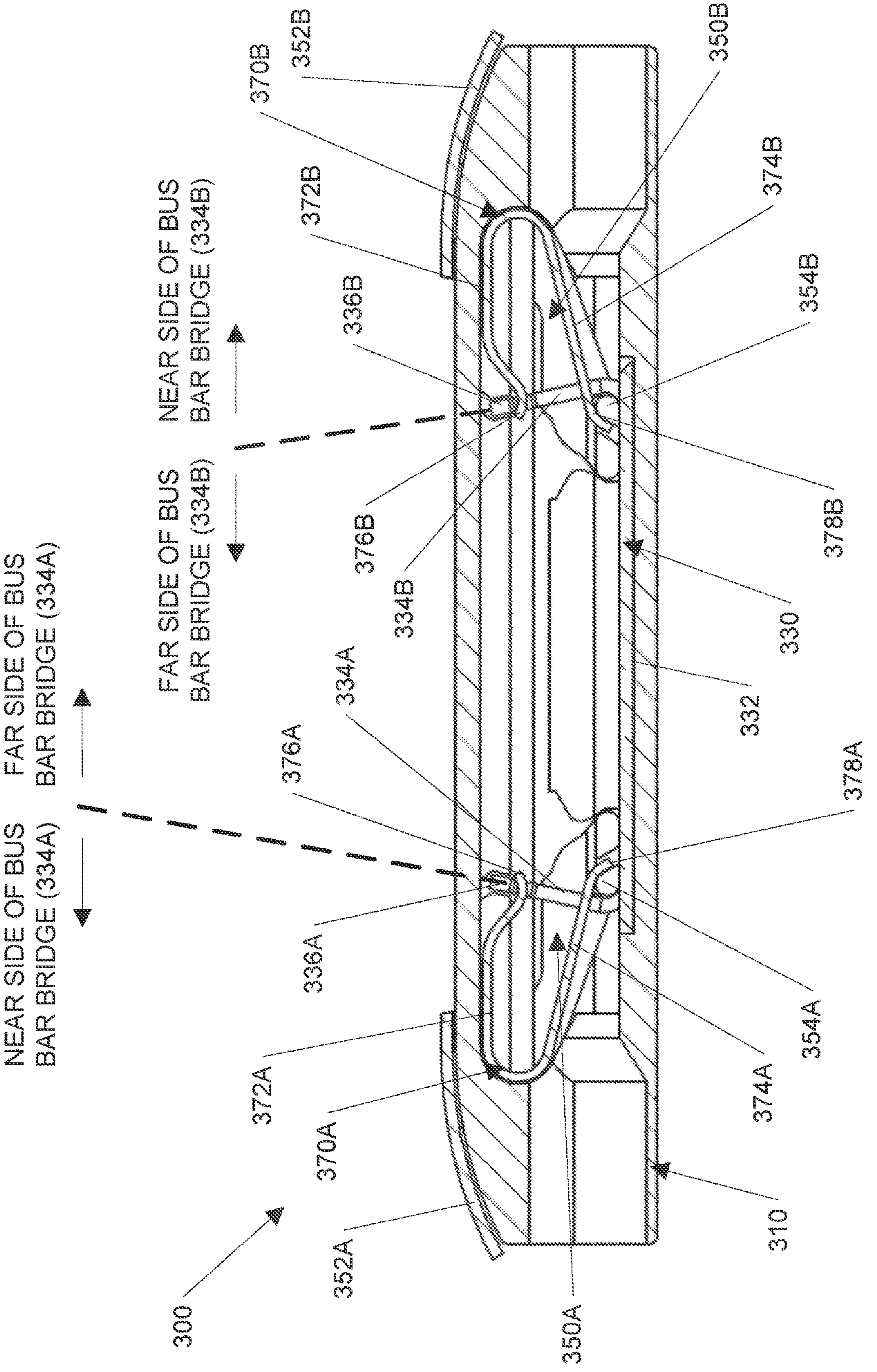

FIGS. 19A-19C illustrate various views of another embodiment of a lever connector 300 configured for contacting electrical conductors and/or electrical terminals. The lever connector 300 from FIGS. 19A-19C may be an inline lever connector, with one or more ports in line with each other, such as one port in line with another port.

Figure 20A:
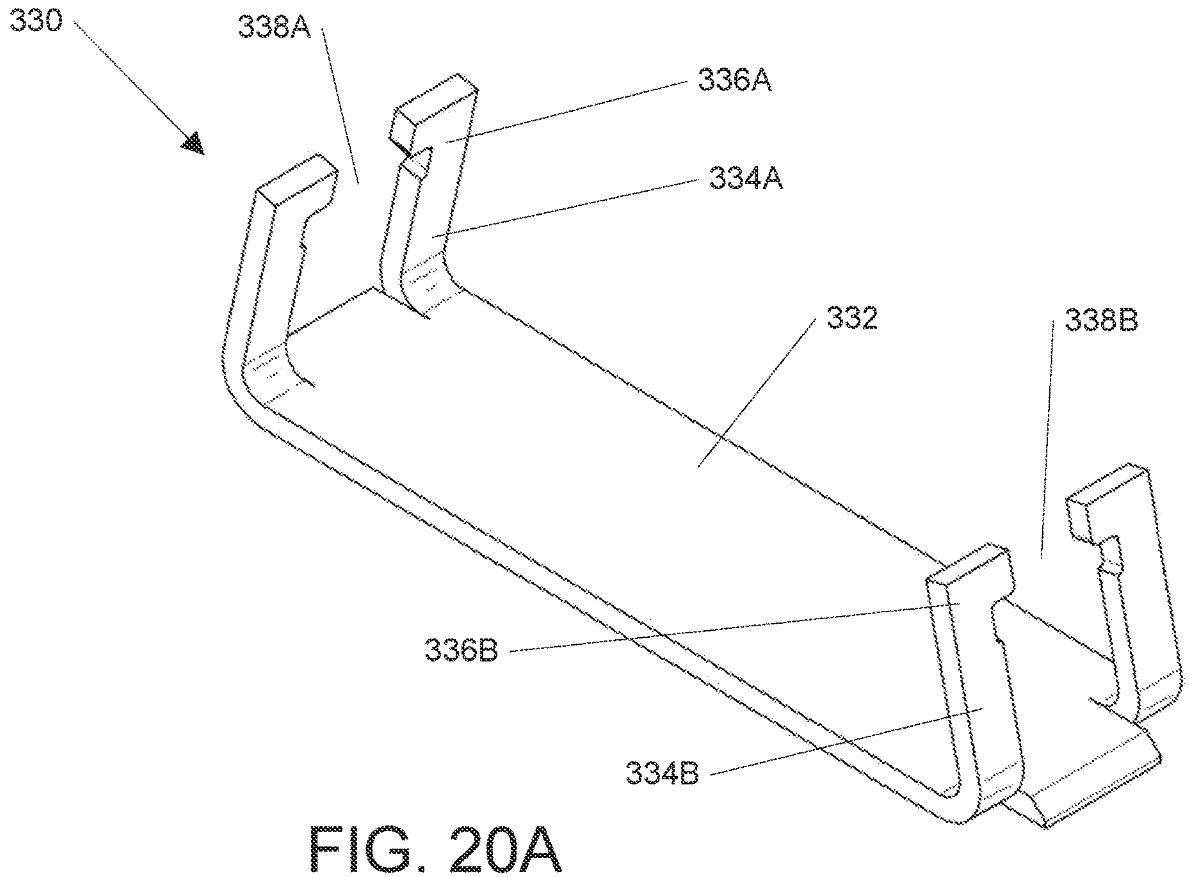
FIGS. 20A and 20B show various views of a busbar for the lever connector from FIGS. 19A-19C in accordance with an embodiment.
Figure 20B:
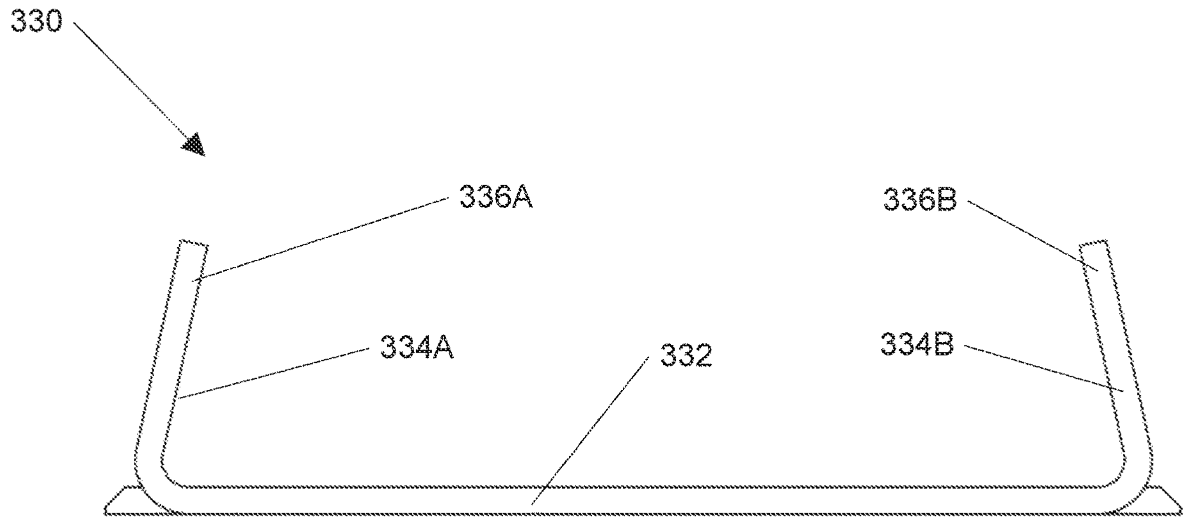
Figure 21A:
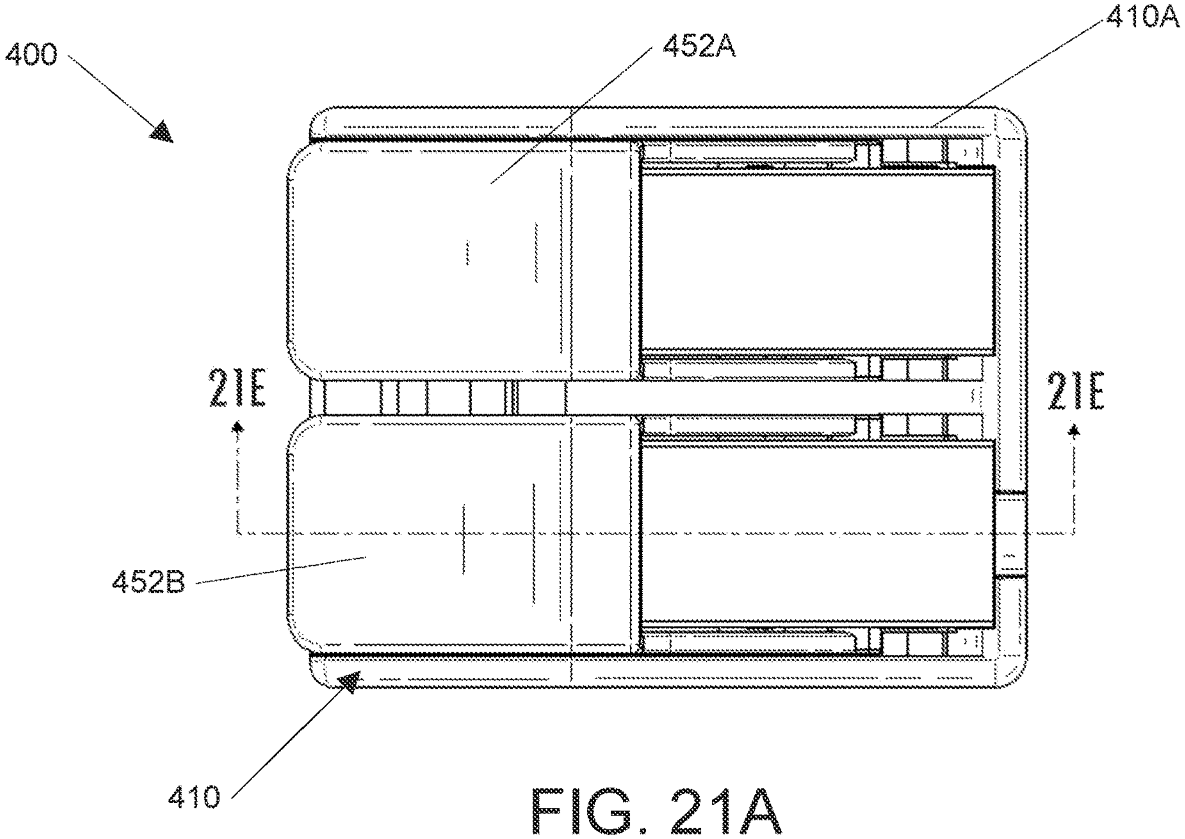
FIGS. 21A-21E show various views of another lever connector in accordance with an embodiment.
Figure 21B:
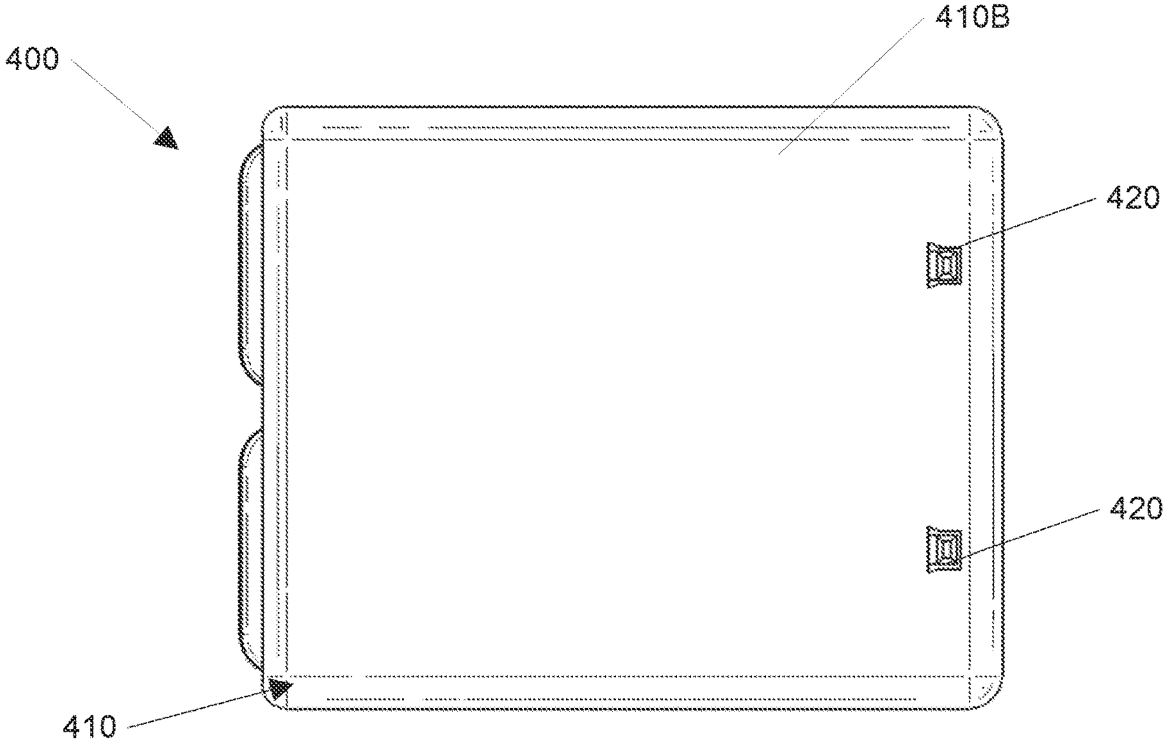
Figure 21C:
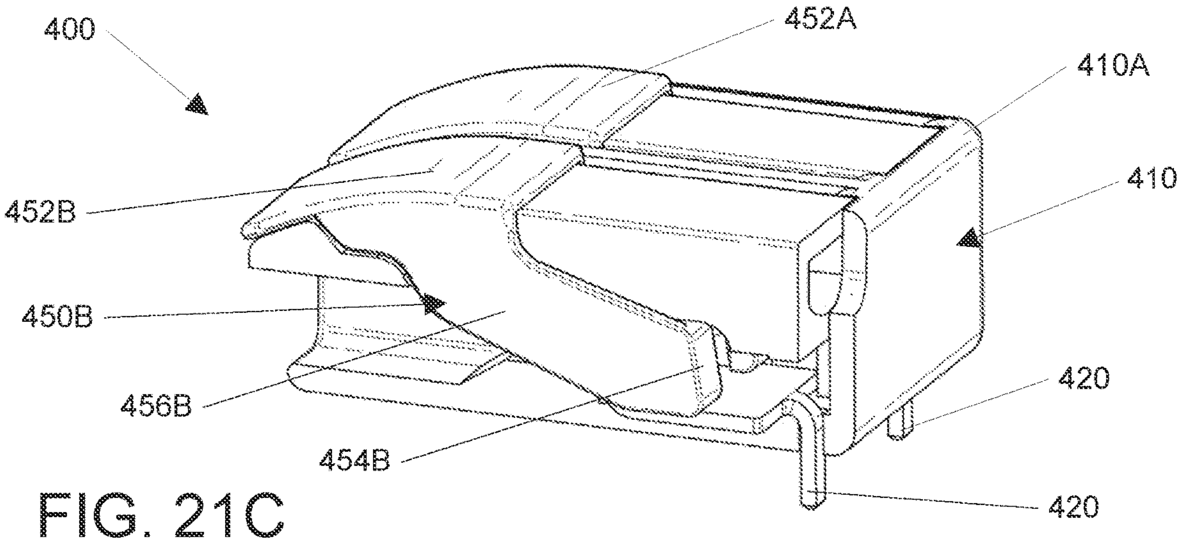
Figure 21D:
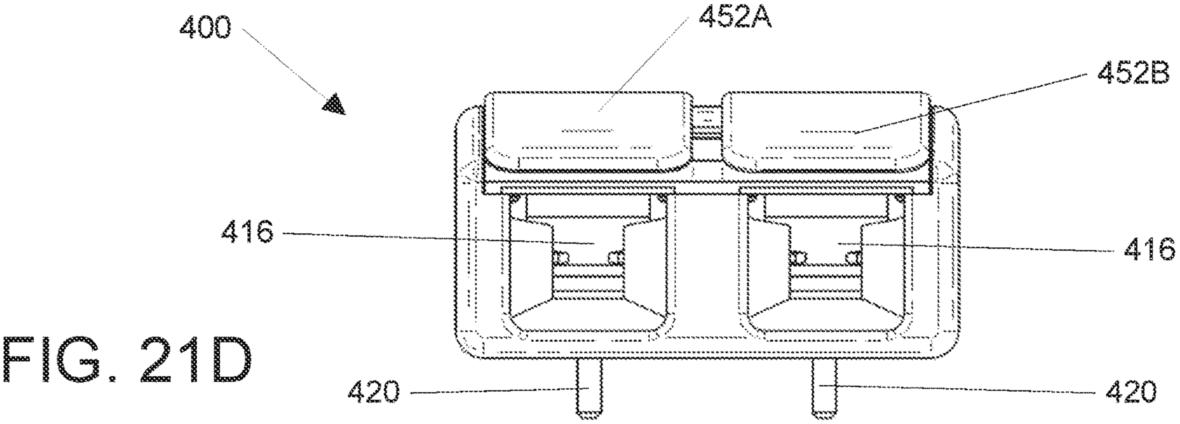
Figure 21E:
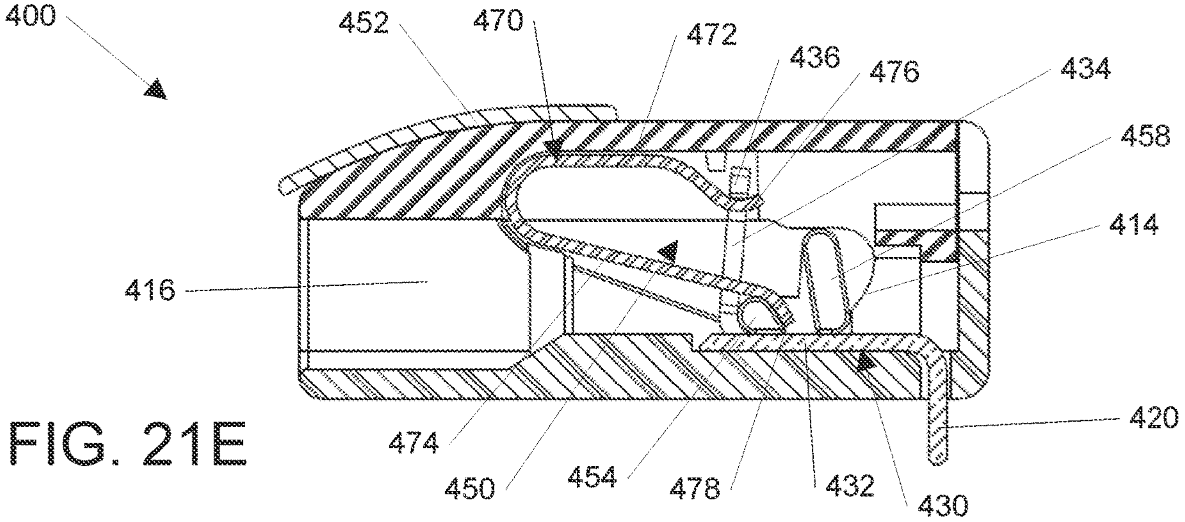

As illustrated in FIGS. 19A-19C, the lever connector 300 may include various components. For example, the lever connector 300 may include a housing 310, a busbar 330 located within the housing 310, a lever mechanism 350, and a resilient member 370 located within the housing 310 that connects the lever mechanism 350 to the busbar 330. FIGS. 20A and 28B illustrate various views of a busbar 330 that may be utilized with the lever connector 300.

For the embodiment of FIGS. 19A-20B, the features and components of the lever connector 300 are referred to using similar reference numbers under the “3XX” series of reference numerals, rather than “1XX” or “2XX” as used for the lever connector 100 in the embodiments of FIGS. 1-8D or the lever connector 200 in the embodiments of FIGS. 9A-18B. A "1XX" or "2XX" feature may be similar to a "3XX" feature. Accordingly, certain features of the lever connector 300 that were already described above with respect to the lever connector 100 from FIGS. 1-8D or the lever connector 200 from FIGS. 9A-18B may be described in lesser detail, or may not be described at all. Further, any combination of the features of the lever connector 100 or lever connector 200 may be utilized with the lever connector 300. Vice versa, any combination of the features of the lever connector 300 may be utilized with the lever connector 100 or the lever connector 200.

Referring to FIGS. 19A-19C, the in-line lever connector 300 may be configured for contacting electrical conductors and/or electrical terminals. The lever connector 300 may include a housing 310 with an insulating material. The housing 310 may include a first portion 310A and a second portion 310B inline with the first portion 310A. A busbar 330 may be located within the housing 310 that includes a base surface 332, a first busbar bridge 334A, and a second busbar bridge 334B. The first busbar bridge 334A may be located on a first end of the base surface 332 and extending away from the base surface 332. The second busbar bridge 334B may be located on a second end of the base surface 332 opposite the first end of the base surface 332 and extending away from the base surface 332 in the same direction as the first busbar bridge 334B.

The lever connector 300 may include a first lever mechanism 350A located on the first portion 310A of the housing 310. The first lever mechanism 350A may include a first lever 352A located on a near side of the first busbar bridge 334A and a first lifting mechanism 354A located on a far side of the first busbar bridge 334A opposite the near side of the first busbar bridge 334A. The first lever mechanism 350A may be connected to a first resilient member 370A located within the first portion 310A of the housing 310 that includes a fixed section 372A connected to the first busbar bridge 334A and a clamping section 374A connected to the first lifting mechanism 354A. When the first lever 352A is actuated and lifted upwards and away from the first portion 310A of the housing 310, the first lifting mechanism 354A moves the clamping section 374A of the first resilient member 370A to release away from the busbar base surface 332. When the lever 352A is closed and pushed downward, the clamping section 374A of the resilient member 370A moves downward to push the conductor 12 of the wire 10 firmly against the busbar 330, thereby making electrical contact between the conductor 12 of the wire 10 and the busbar 330.

The lever connector 300 may also include a second lever mechanism 350B located on the second portion 310B of the housing 310 in an inline position from the first lever mechanism 350A. The second lever mechanism 350B includes a second lever 352B located on a near side of the second busbar bridge 334B and a second lifting mechanism 354B located on a far side of the second busbar bridge 334B opposite the near side of the second busbar bridge 334B. The second lever mechanism 350B may be connected to a second resilient member 370B located within the second portion 310B of the housing 310. The second resilient member 370B includes a fixed section 372B connected to the second busbar bridge 334B and a clamping section 374B connected to the second lifting mechanism 354B. When the second lever 352B is actuated and lifted upwards and away from the second portion 310B of the housing 310, the second lifting mechanism 354B moves the clamping section 374B of the second resilient member 370B to release away from the busbar base surface 332. When the lever 352B is closed and pushed downward, the clamping section 374B of the resilient member 370B moves downward to push the conductor 12 of the wire 10 firmly against the busbar 330, thereby making electrical contact between the conductor 12 of the wire 10 and the busbar 330.

FIGS. 21A-21E illustrate various views of another embodiment of a lever connector 400 for use with a printed circuit board (PCB) and configured for contacting electrical conductors and/or electrical terminals to the PCB. The lever connector 400 may assume different types of devices and configurations including, but not limited to, 1-port connectors, 2-port connectors, 3-port connectors, 5-port connectors, etc. For example, the lever connector 400 may be used to connect wires 10 to a PCB assembly. The lever connector 400 from FIGS. 21A-21E may be a lever connector that will allow a product manufacturer or an OEM, to use lever technology for attaching and removing wires 10 for an OEM application with a PCB assembly.

As illustrated in FIGS. 21A-21E, the lever connector 400 may include various components. For example, the lever connector 400 may include a housing 410, a busbar 430 located within the housing 410, a lever mechanism 450, and a resilient member 470 located within the housing 410 that connects the lever mechanism 450 to the busbar 430. As illustrated in FIGS. 21A-21E, the lever connector 400 and the housing 410 may include one or more PCB connection terminals 420. The PCB connection terminals 420 may be in the form of prongs as illustrated in FIGS. 21A-21E, or other configurations, such as flat, clips, or other connections used with PCB assemblies. The lever connector 400 may be utilized with various PCB connection mechanisms, such as a thru-hole PCB mounting mechanism, a surface-mounted PCB mechanism, a card edge connector PCB mechanism, etc. The PCB connection terminals 420 may protrude from a portion of the housing 410. The PCB connection terminals 420 may be connected to and/or be a portion of the busbar 430. The PCB connection terminals 420 may be utilized to connect wires 10 with the lever connector 400 and then to connect those wires 10 to a PCB assembly using the PCB connection terminals 420.

For the embodiment of FIGS. 21A-21E, the features and components of the lever connector 400 are referred to using similar reference numbers under the "4XX" series of reference numerals, rather than "1XX", "2XX", or "3XX" as used for the lever connector 100 in the embodiments of FIGS. 1-8D, the lever connector 200 in the embodiments of FIGS. 9A-18B, or the lever connector 300 in the embodiments of FIGS. 19A-20B. A "1XX", "2XX", or "3XX" feature may be similar to a "4XX" feature. Accordingly, certain features of the lever connector 400 that were already described above with respect to the lever connector 100 from FIGS. 1-8D, the lever connector 200 from FIGS. 9A-18B, or the lever connector 300 from FIGS. 19A-20B may be described in lesser detail, or may not be described at all. Further, any combination of the features of the lever connector 100, the lever connector 200, or the lever connector 300, may be utilized with the lever connector 400. Vice versa, any combination of the features of the lever connector 400 may be utilized with the lever connector 100, the lever connector 200, or the lever connector 300.

Figure 22:
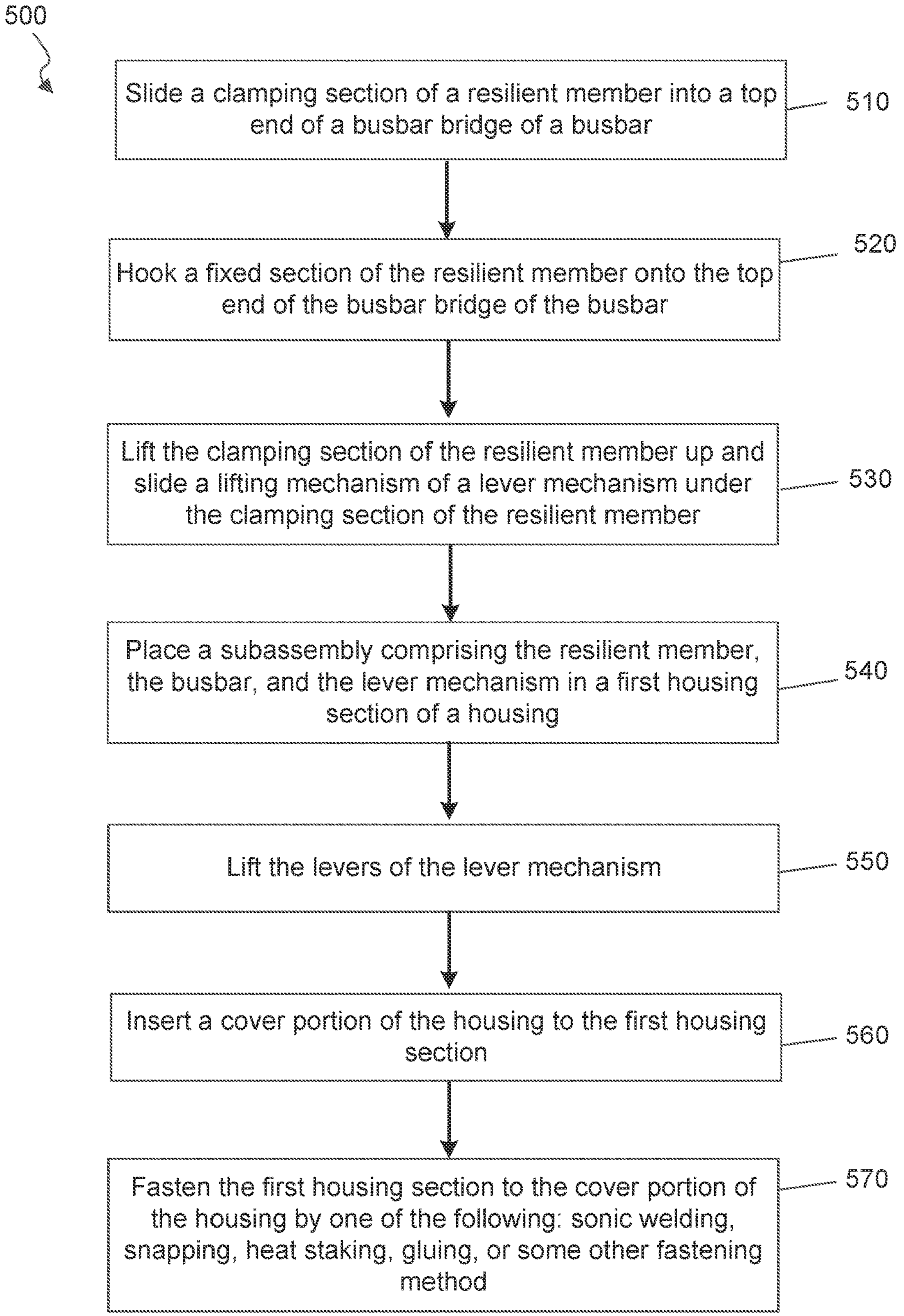
FIG. 22 is a flow chart showing an example method for assembling a lever connector configured for contacting electrical conductor terminals in accordance with an embodiment.
Figure 23A:
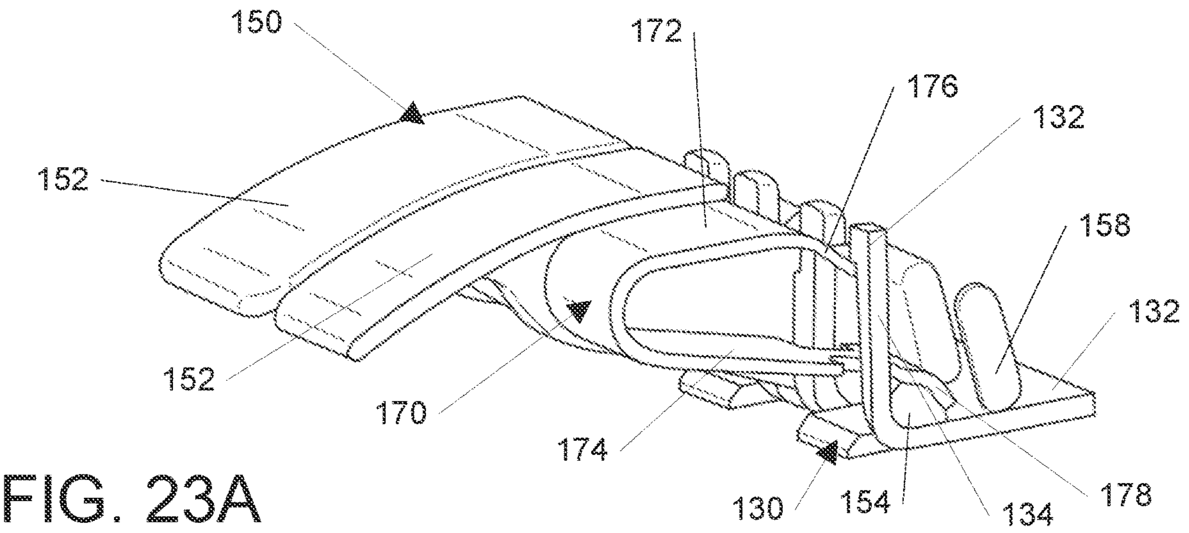
FIGS. 23A-23C show various views of the lever connector for the example method for assembling the lever connector configured for contacting electrical conductor terminals in accordance with an embodiment.
Figure 23B:
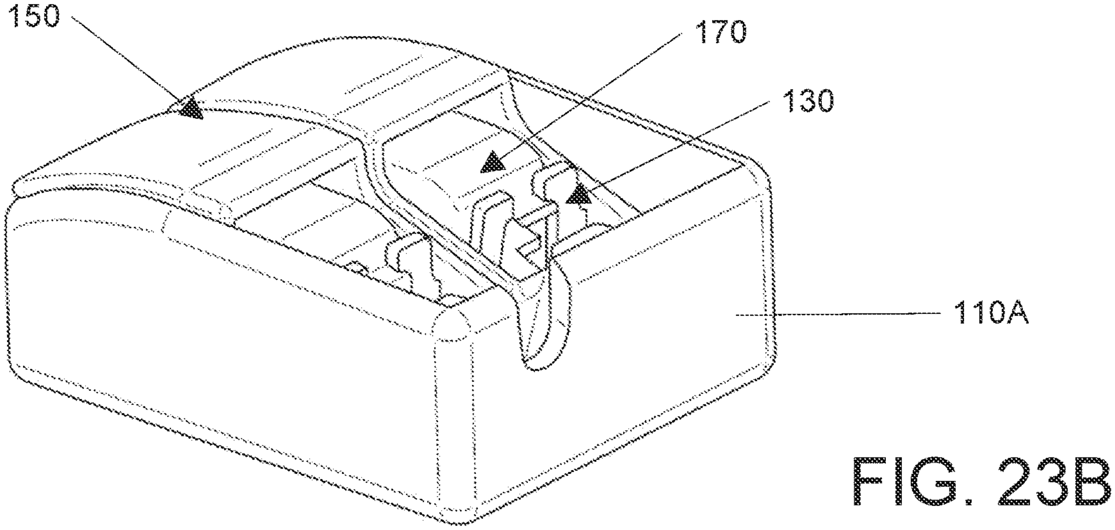
Figure 23C:
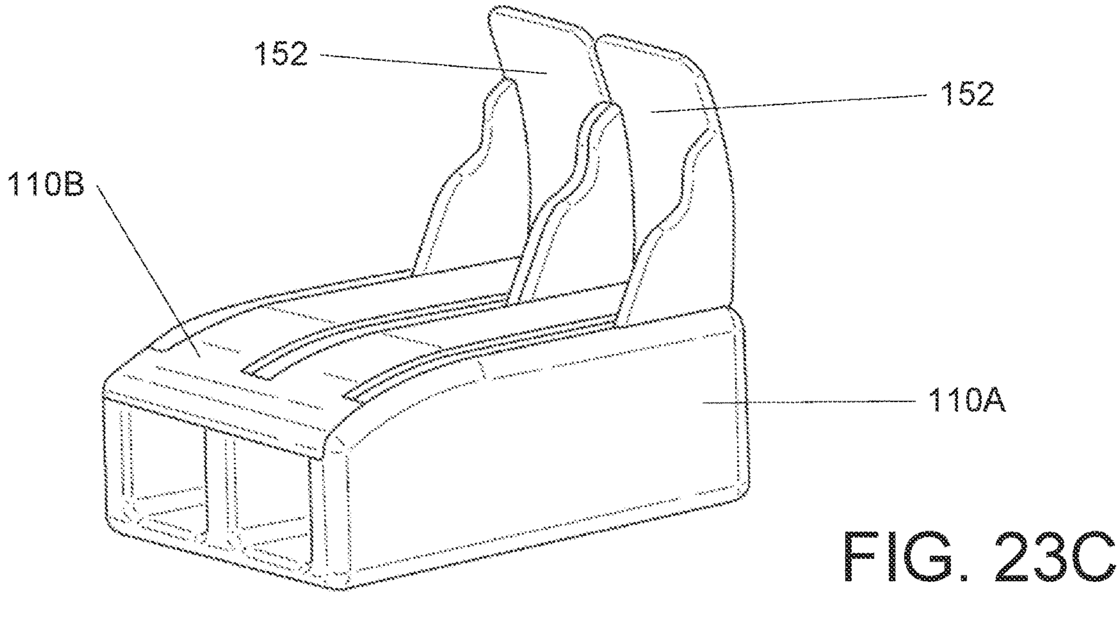

FIG. 22 is a flow chart showing an illustrative method 500 for assembling a lever connector configured for contacting electrical conductors and/or electrical terminals. The method of FIG. 22 may be performed for any of the lever connectors 100, 200, 300, or 400. The steps of the method 500 may comprise, e.g., what is described in connection with the lever connectors 100, 200, 300, or 400 in FIGS. 1-21E. Although various operations shown in FIG. 22 are described as performed for the lever connectors 100, 200, 300, or 400, one, some, or all such operations (or parts thereof) may be performed by one or more additional components and/or systems. The order of steps shown in FIG. 22 may be varied, and/or one or more steps may be omitted, and/or one or more steps may be added. FIGS. 23A-23C illustrate various views of the lever connector during the assembly process.

In step 510, the method of assembling the lever connector may include sliding a clamping section 174 of a resilient member 170 into a top end of a busbar bridge 134 of a busbar 130. In step 520, the method of assembling the lever connector may include hooking a fixed section 172 of the resilient member 170 onto the top end of the busbar bridge 134 of the busbar 130. The fixed section 172 may be hooked through a gap in the busbar bridge 134. In step 530, the method of assembling the lever connector may include lifting the clamping section 174 of the resilient member 170 up and sliding a lifting mechanism 154 of a lever mechanism 150 under the clamping section 174 of the resilient member 170 (as illustrated in FIG. 23A). In step 540, the method of assembling the lever connector may include placing a subassembly comprising the resilient member 170, the busbar 130, and the lever mechanism 150 in a first housing section 110A of a housing (as illustrated in FIG. 23B). In step 550, the method of assembling the lever connector may include lifting the levers 152 of the lever mechanism 150. In step 560, the method of assembling the lever connector may include inserting a cover portion 110B of the housing to the first housing section 110A (as illustrated in FIG. 23C). This step may also include inserting or putting together two different portions of the housing as is described and detailed above.

In step 560, the method of assembling the lever connector may include fastening the first housing section 110A to the cover portion 110B of the housing by one of the following: welding, snapping, heat staking, gluing, or by some other means of fastening known in the industry. This step may also include welding two or more housing portions or housing sections of the housing together as is described and detailed above. Other methods of connecting the two or more housing portions or housing sections of the housing may be used, such as by snapping, heat staking, welding, or gluing, etc.

Many illustrative embodiments are listed below in accordance with one or more aspects disclosed herein. Many of the embodiments listed below are described as depending from various embodiments and the dependencies are not limited and may be depending from any of the embodiments as is described and contemplated by this disclosure. Moreover, that any one or more of the listed embodiments may be incorporated into one or more of the other embodiments is contemplated by this disclosure.

The present technology is disclosed above and in the accompanying drawings with reference to a variety of embodiments. The purpose served by the disclosure, however, is to provide an example of the various features and concepts related to the technology, not to limit its scope. One skilled in the relevant art will recognize that numerous variations and modifications may be made to the embodiments described above without departing from the scope of the present invention, as defined by the appended claims.

The invention claimed is:

1. A lever connector for contacting electrical conductors and/or electrical terminals, the lever connector comprising:

a housing including an insulating material;

a busbar located within the housing that includes a base surface and a busbar arm extending away from the base surface;

a lever mechanism that includes a lever located on a near side of the busbar arm and a lifting mechanism located on a far side of the busbar arm, wherein the far side of the busbar arm is opposite the near side of the busbar arm along a conductor insertion direction, and opposite a lever location; and a resilient member located within the housing that includes a fixed section connected to the busbar arm and a clamping section connected to the lifting mechanism, wherein the lifting mechanism connected to the clamping section of the resilient member is located on the far side of the busbar arm opposite the near side of the busbar arm.

2. The lever connector of claim 1, wherein when the lever is actuated and lifted upwards and away from the housing, the lifting mechanism moves the clamping section of the resilient member to release away from the base surface, and when the lever is closed and pushed downward toward the housing, the lifting mechanism moves the clamping section of the resilient member downward to push the electrical conductor against the base surface, thereby making electrical contact between the electrical conductor and the busbar.

3. The lever connector of claim 1, wherein the lifting mechanism includes a spring lifting lever arm section connected to the clamping section of the resilient member.

4. The lever connector of claim 1, wherein the fixed section of the resilient member includes a tab that connects to the busbar arm and the tab includes a curved portion that hooks and connects to the busbar arm.

5. The lever connector of claim 1, wherein an end of the clamping section of the resilient member includes a curved portion that hooks and connects to the lifting mechanism.

6. The lever connector of claim 1, wherein the busbar arm includes two arms separated by a gap and the fixed section of the resilient member hooks on the two arms in the busbar arm.

7. The lever connector of claim 6, wherein the clamping section of the resilient member passes through the gap in the busbar arm.

8. The lever connector of claim 1, wherein the housing includes a conductor opening configured to receive one or more electrical wires.

9. A lever connector configured for contacting electrical conductors and/or electrical terminals, the lever connector comprising:

a housing including an insulating material;

a busbar located within the housing that includes a base surface, a first busbar arm, and a second busbar arm;

a first lever mechanism located on the housing, wherein the first lever mechanism includes a first lever located on a near side of the first busbar arm and a first lifting mechanism located on a far side of the first busbar arm opposite the near side of the first busbar arm;

a first resilient member located within the housing that includes a fixed section connected to the first busbar arm and a clamping section connected to the first lifting mechanism, wherein the clamping section of the first resilient member includes an end that passes through the first busbar arm and connects to the first lifting mechanism;

a second lever mechanism located on the housing, wherein the second lever mechanism includes a second lever located on a near side of the second busbar arm and a second lifting mechanism located on a far side of the second busbar arm opposite the near side of the second busbar arm; and a second resilient member located within the housing that includes a fixed section connected to the second busbar arm and a clamping section connected to the second lifting mechanism.

10. The lever connector of claim 9, wherein when the first lever is actuated and lifted upwards and away from the housing, the first lifting mechanism moves the clamping section of the first resilient member to release away from the base surface, and when the first lever is closed and pushed downward toward the housing, the first lifting mechanism moves the clamping section of the first resilient member downward to push the electrical conductor against the base surface, thereby making electrical contact between the electrical conductor and the busbar and further;

wherein when the second lever is actuated and lifted upwards and away from the housing, the second lifting mechanism moves the clamping section of the second resilient member to release away from the base surface, and when the second lever is closed and pushed downward toward the housing, the second lifting mechanism moves the clamping section of the second resilient member downward to push the electrical conductor against the base surface, thereby making electrical contact between the electrical conductor and the busbar.

11. The lever connector of claim 9, wherein the first lifting mechanism includes a first back support surface that rest against and abuts to a housing support surface on the housing to support the first lever mechanism and to help ensure the first lifting mechanism follow a path along the far side of the first busbar arm.

12. The lever connector of claim 10, wherein the second lifting mechanism includes a second back support surface that rest against and abuts to a housing support surface on the housing to support the second lever mechanism and to help ensure the first lifting mechanism follow a path along the far side of the second busbar arm.

13. The lever connector of claim 9, wherein the housing includes one or more conductor openings configured to receive one or more electrical wires.

* * * * *